US012608715B2

(12) United States Patent
Ionescu et al.

(10) Patent No.: US 12,608,715 B2
(45) Date of Patent: \*Apr. 21, 2026

(54) GUIDED COMPUTING DEVICE REPAIR SYSTEMS, METHODS, AND APPARATUS

(71) Applicant: ASSURANT, INC., New York, NY (US)

(72) Inventors: Mircea Ionescu, Westlake, OH (US); Patrick Scott Mclaughlin, Westlake, OH (US); Ryan Joseph Turner, Westlake, OH (US); Cameron Messier, Westlake, OH (US); Anthony Glyadchenko, Westlake, OH (US)

(73) Assignee: ASSURANT, INC., New York, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/532,036

(22) Filed: Dec. 7, 2023

(65) Prior Publication Data

US 2024/0177175 A1 May 30, 2024

Related U.S. Application Data

(63) Continuation of application No. 17/169,938, filed on Feb. 8, 2021, now Pat. No. 11,900,393.

(60) Provisional application No. 62/971,413, filed on Feb. 7, 2020.

(51) Int. Cl.
| | |
|---|---|
| *G06F 3/00* | (2006.01) |
| *G06Q 30/016* | (2023.01) |
| *G06F 3/0482* | (2013.01) |
| *G06F 3/0484* | (2022.01) |

(52) U.S. Cl.
CPC ......... *G06Q 30/016* (2013.01); *G06F 3/0482* (2013.01); *G06F 3/0484* (2013.01)

(58) Field of Classification Search
CPC .... G06F 3/0482; G06F 3/0484; G06Q 30/016
See application file for complete search history.

(56) References Cited

U.S. PATENT DOCUMENTS

| | | | |
|---|---|---|---|
| 10,872,022 | B2 | 12/2020 | Brewer et al. |
| 2004/0153409 | A1 | 8/2004 | Shepley et al. |
| 2006/0217115 | A1 | 9/2006 | Cassett et al. |
| 2013/0085778 | A1 | 4/2013 | Guertin et al. |
| 2014/0024348 | A1 | 1/2014 | Hurst et al. |
| 2014/0075380 | A1 | 3/2014 | Milirud et al. |
| 2015/0039176 | A1* | 2/2015 | Fish ...................... G07C 5/008 |
| | | | 701/31.6 |
| 2015/0082097 | A1 | 3/2015 | Brewer et al. |
| 2016/0027019 | A1* | 1/2016 | Michaelangelo ........................... |
| | | | G06Q 10/06316 |
| | | | 705/7.26 |

(Continued)

FOREIGN PATENT DOCUMENTS

| | | | |
|---|---|---|---|
| EP | 2835007 A4 | 12/2015 |
| JP | 2015-519781 A | 7/2015 |

(Continued)

OTHER PUBLICATIONS

European search report Mailed on Nov. 3, 2023 for EP Application No. 21750522, 8 page(s).

(Continued)

*Primary Examiner* — Jessica S Manno
*Assistant Examiner* — Andrew Chung
(74) *Attorney, Agent, or Firm* — Alston & Bird LLP

(57) ABSTRACT

Embodiments of the present disclosure provided herein include methods, computer readable mediums, apparatus, and systems for facilitating diagnosis and repair of one or more performance states associated with a computing device.

22 Claims, 32 Drawing Sheets

(56)        References Cited

U.S. PATENT DOCUMENTS

| | | |
|---|---|---|
| 2016/0174081 A1 | 6/2016 | Lau |
| 2016/0302148 A1 | 10/2016 | Buck et al. |
| 2018/0288632 A1 | 10/2018 | Vadlamudi |
| 2018/0314958 A1 | 11/2018 | Sethi et al. |
| 2018/0367560 A1 | 12/2018 | Mahaffey et al. |
| 2019/0327682 A1 | 10/2019 | Mclellan et al. |
| 2019/0347668 A1 | 11/2019 | Williams et al. |
| 2020/0341066 A1 | 10/2020 | Frigo et al. |
| 2020/0349665 A1 | 11/2020 | Torres et al. |
| 2020/0403458 A1 | 12/2020 | Vedady et al. |

FOREIGN PATENT DOCUMENTS

| | | |
|---|---|---|
| JP | 2016-045557 A | 4/2016 |
| JP | 2016-535371 A | 11/2016 |
| JP | 2019-521427 A | 7/2019 |
| JP | 2019-531427 A | 7/2019 |

OTHER PUBLICATIONS

ISA/US, International Search Report and Written Opinion for PCT/US2021/017038, Jun. 15, 2021, 5, 15, 2021.
English Translation of JP Office Action dated Oct. 22, 2024 for JP Application No. 2022547824, 3 page(s).
JP Office Action Mailed on Oct. 22, 2024 for JP Application No. 2022547824, 3 page(s).
English Translation of JP Office Action dated Jul. 1, 2025 for JP Application No. 2022547824, 2 page(s).
JP Office Action Mailed on Jul. 1, 2025 for JP Application No. 2022547824, 3 page(s).

* cited by examiner

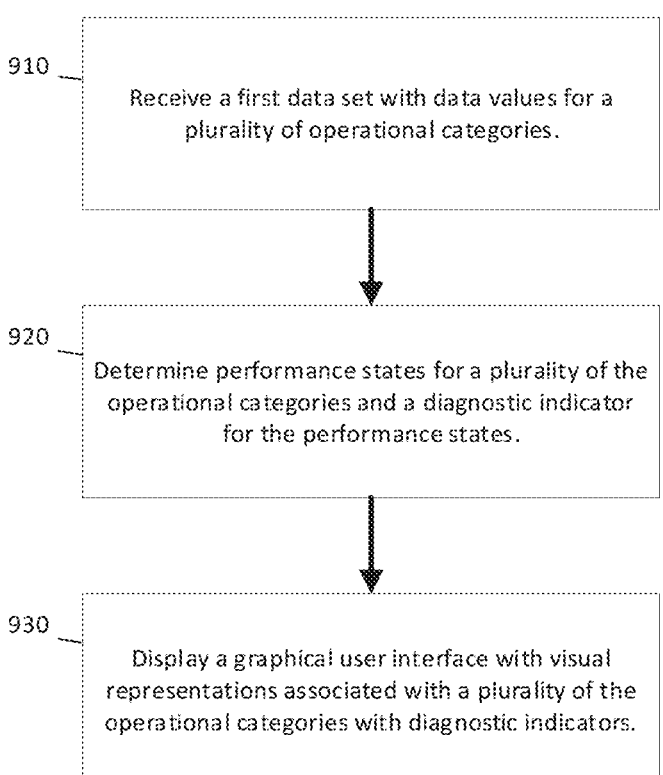

910 Receive a first data set with data values for a plurality of operational categories.

920 Determine performance states for a plurality of the operational categories and a diagnostic indicator for the performance states.

930 Display a graphical user interface with visual representations associated with a plurality of the operational categories with diagnostic indicators.

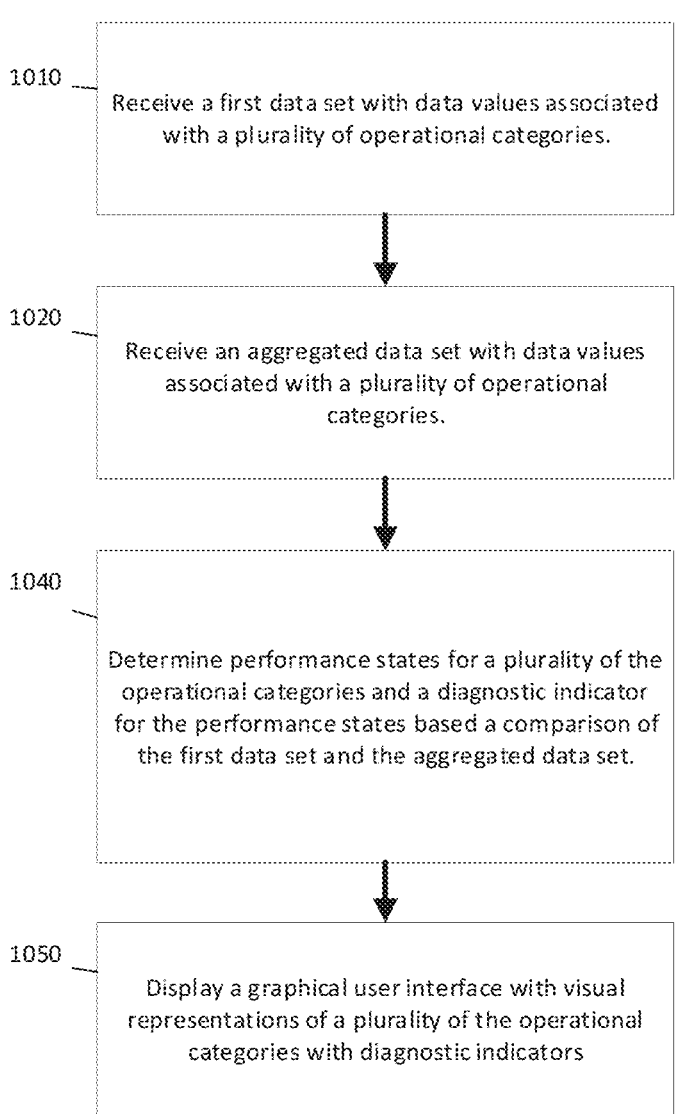

1010 — Receive a first data set with data values associated with a plurality of operational categories.

1020 — Receive an aggregated data set with data values associated with a plurality of operational categories.

1040 — Determine performance states for a plurality of the operational categories and a diagnostic indicator for the performance states based a comparison of the first data set and the aggregated data set.

1050 — Display a graphical user interface with visual representations of a plurality of the operational categories with diagnostic indicators

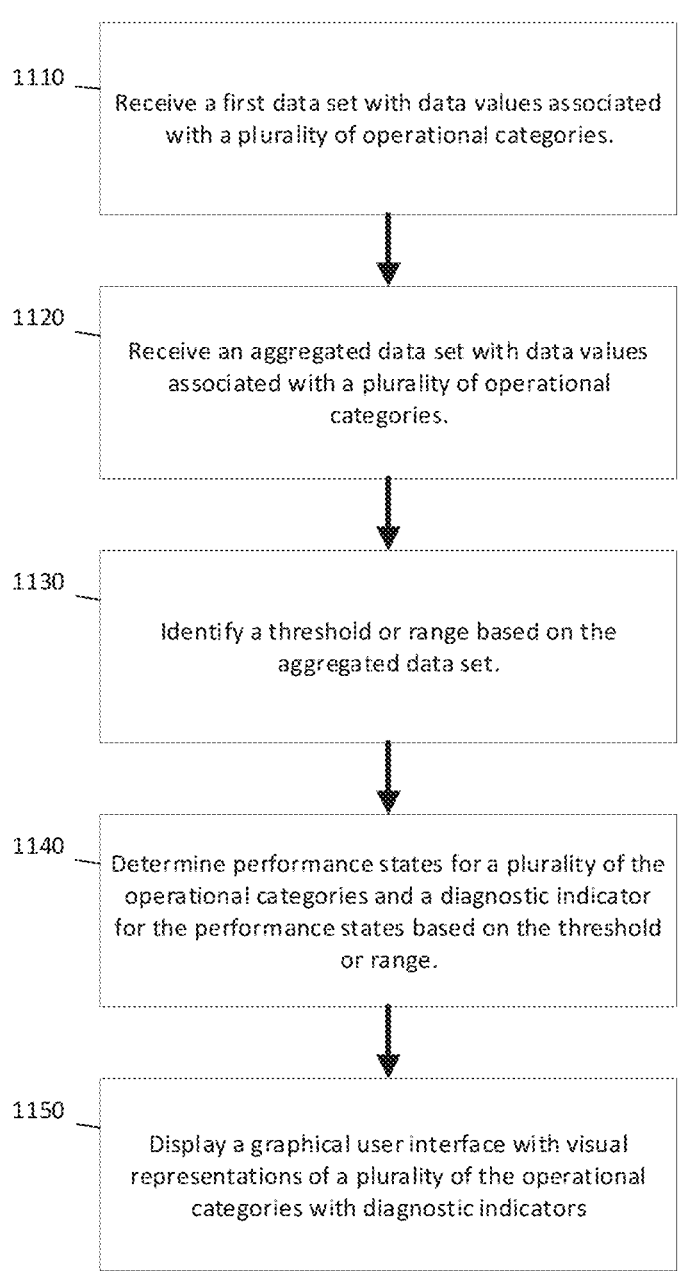

1110 — Receive a first data set with data values associated with a plurality of operational categories.

1120 — Receive an aggregated data set with data values associated with a plurality of operational categories.

1130 — Identify a threshold or range based on the aggregated data set.

1140 — Determine performance states for a plurality of the operational categories and a diagnostic indicator for the performance states based on the threshold or range.

1150 — Display a graphical user interface with visual representations of a plurality of the operational categories with diagnostic indicators

FIG. 11

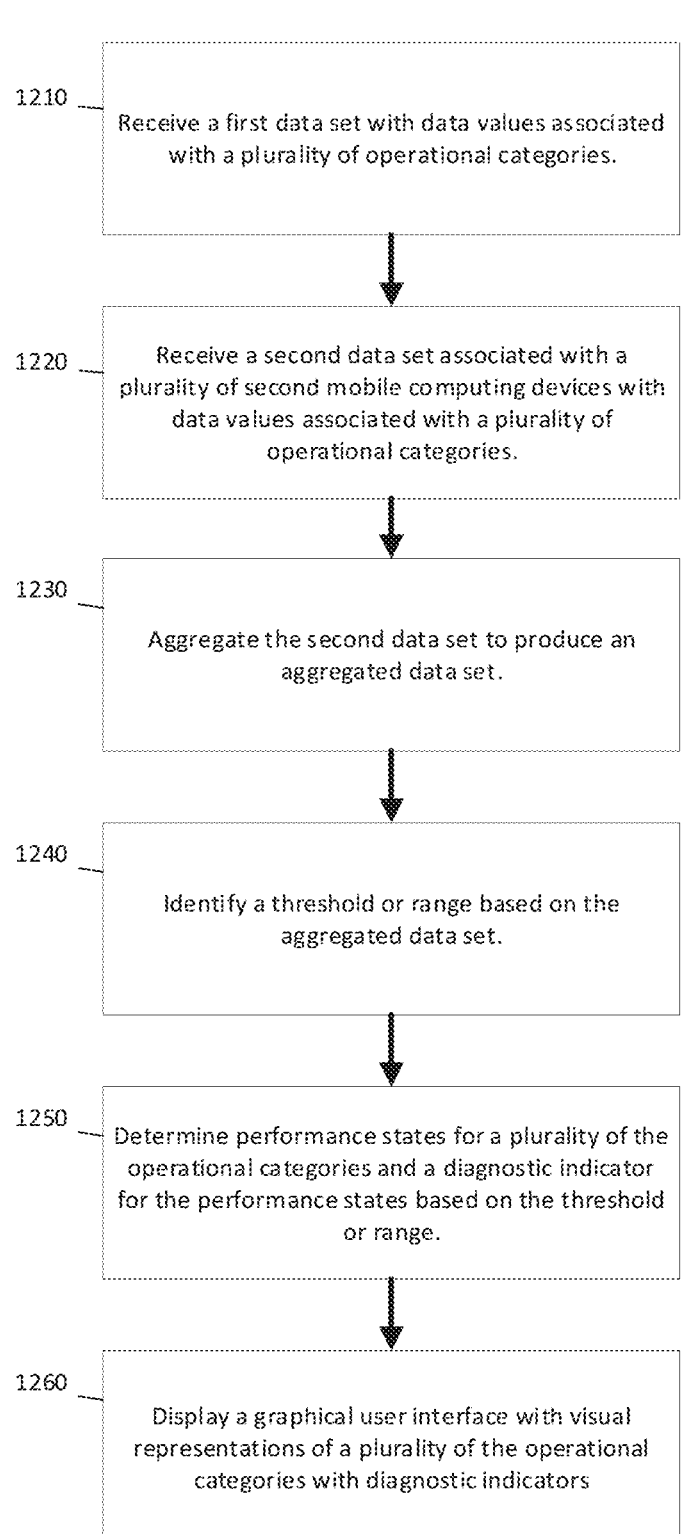

1200

1210 — Receive a first data set with data values associated with a plurality of operational categories.

1220 — Receive a second data set associated with a plurality of second mobile computing devices with data values associated with a plurality of operational categories.

1230 — Aggregate the second data set to produce an aggregated data set.

1240 — Identify a threshold or range based on the aggregated data set.

1250 — Determine performance states for a plurality of the operational categories and a diagnostic indicator for the performance states based on the threshold or range.

1260 — Display a graphical user interface with visual representations of a plurality of the operational categories with diagnostic indicators

FIG. 12

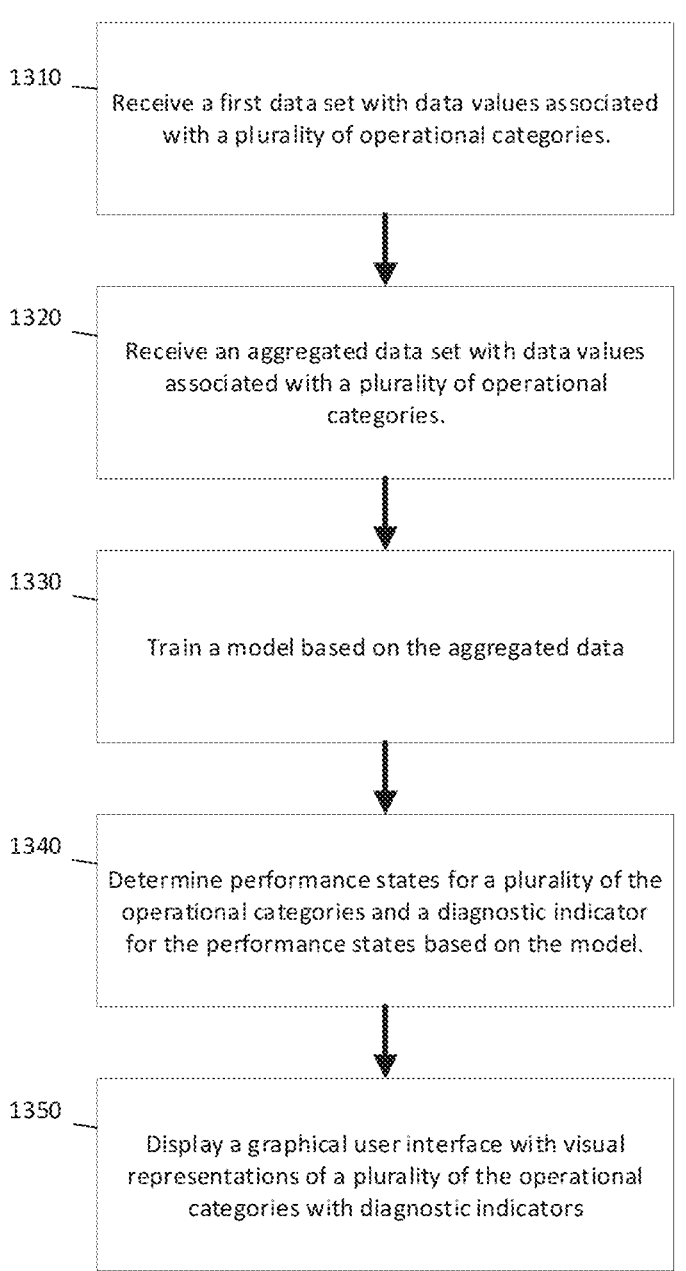

1300

1310 — Receive a first data set with data values associated with a plurality of operational categories.

1320 — Receive an aggregated data set with data values associated with a plurality of operational categories.

1330 — Train a model based on the aggregated data

1340 — Determine performance states for a plurality of the operational categories and a diagnostic indicator for the performance states based on the model.

1350 — Display a graphical user interface with visual representations of a plurality of the operational categories with diagnostic indicators

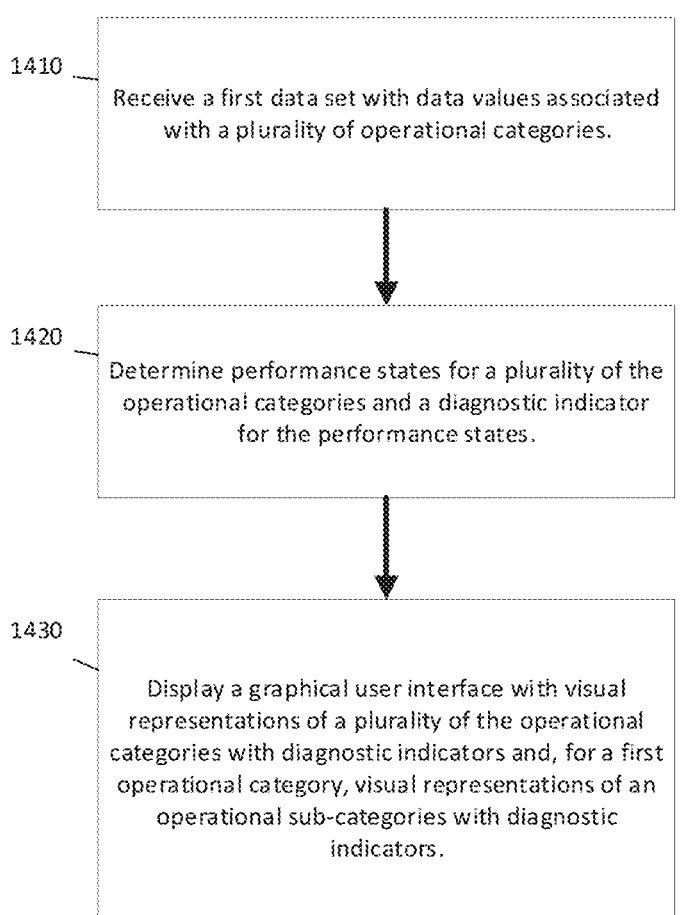

1410 — Receive a first data set with data values associated with a plurality of operational categories.

1420 — Determine performance states for a plurality of the operational categories and a diagnostic indicator for the performance states.

1430 — Display a graphical user interface with visual representations of a plurality of the operational categories with diagnostic indicators and, for a first operational category, visual representations of an operational sub-categories with diagnostic indicators.

1510 — Receive selection of an operational category display on the graphical user interface.

1520 — Display a second graphical user interface with information associated with the selected operational category and visual representations of a plurality of operational sub-categories with diagnostic indicators for the selection operational category.

1600

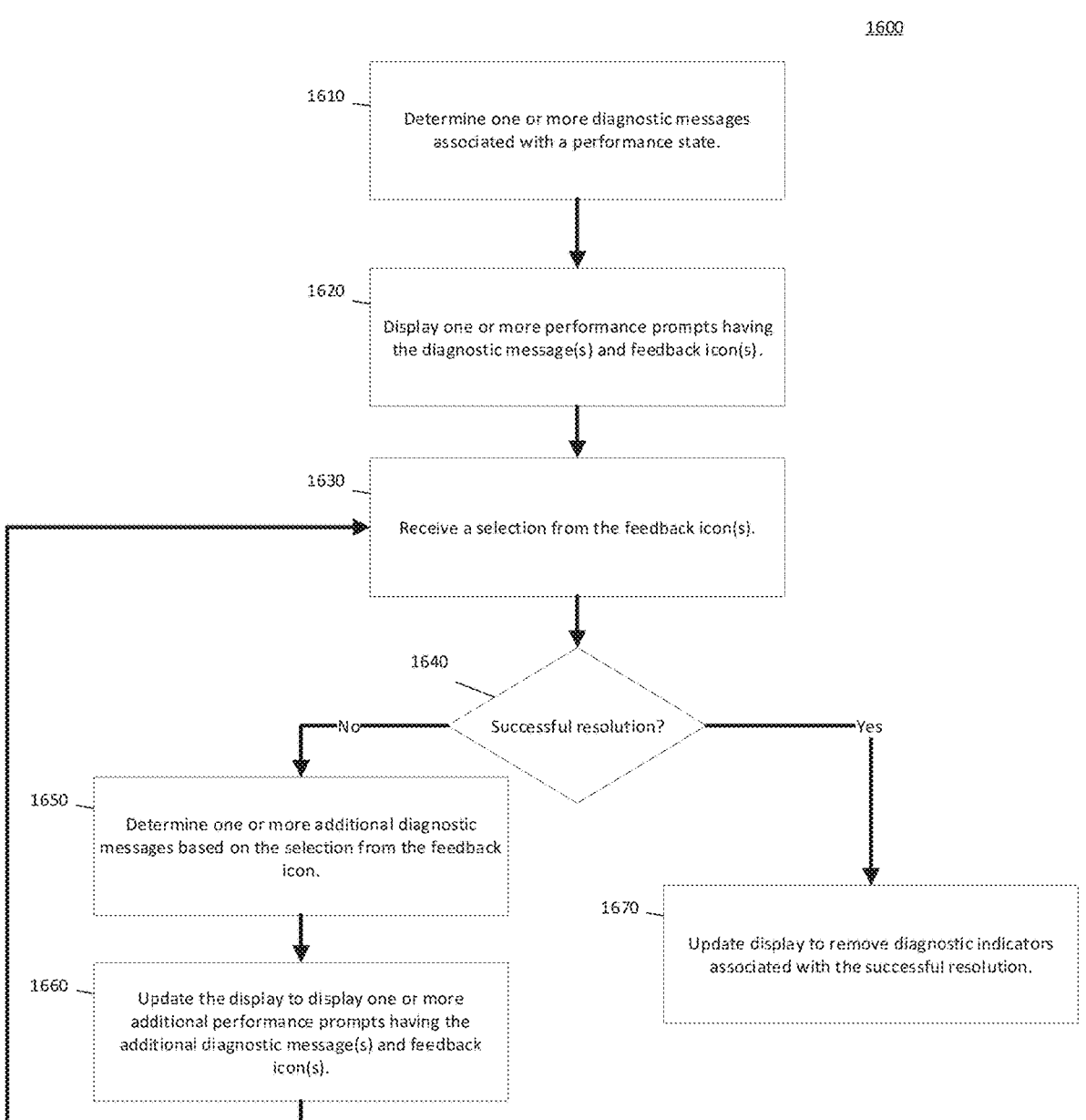

1610 — Determine one or more diagnostic messages associated with a performance state.

1620 — Display one or more performance prompts having the diagnostic message(s) and feedback icon(s).

1630 — Receive a selection from the feedback icon(s).

1640 — Successful resolution?

No

1650 — Determine one or more additional diagnostic messages based on the selection from the feedback icon.

1660 — Update the display to display one or more additional performance prompts having the additional diagnostic message(s) and feedback icon(s).

Yes

1670 — Update display to remove diagnostic indicators associated with the successful resolution.

1710 — Determine a plurality of diagnostic messages associated with a performance state.

1720 — Determine a resolution value for the diagnostic messages.

1730 — Display one or more performance prompts having the diagnostic message(s) with the highest value(s) and feedback icon(s).

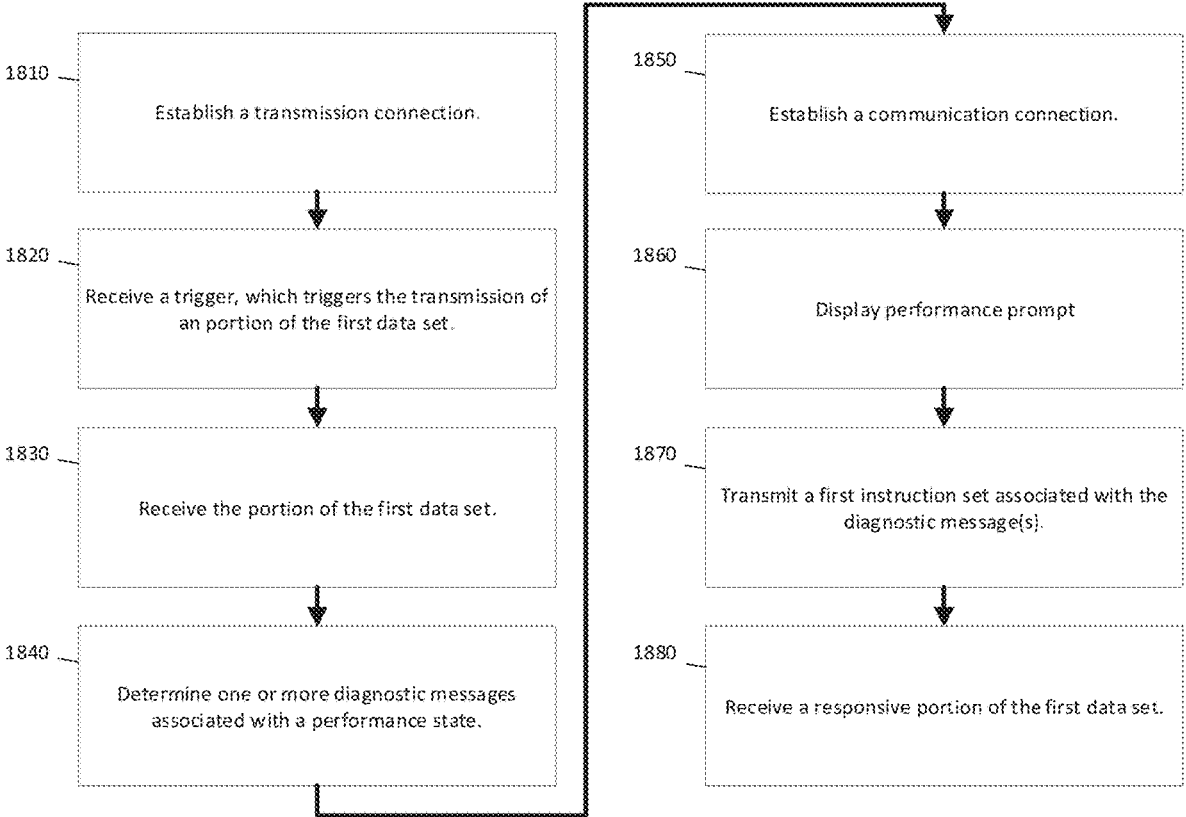

1800

1810 — Establish a transmission connection.

1820 — Receive a trigger, which triggers the transmission of an portion of the first data set.

1830 — Receive the portion of the first data set.

1840 — Determine one or more diagnostic messages associated with a performance state.

1850 — Establish a communication connection.

1860 — Display performance prompt

1870 — Transmit a first instruction set associated with the diagnostic message(s).

1880 — Receive a responsive portion of the first data set.

FIG. 18

GUIDED COMPUTING DEVICE REPAIR SYSTEMS, METHODS, AND APPARATUS

CROSS-REFERENCE TO RELATED APPLICATION

This application is a continuation of U.S. patent application Ser. No. 17/169,938, filed Feb. 8, 2021, which claims the benefit of U.S. Provisional Application No. 62/971,413 filed on Feb. 7, 2020, which application is hereby incorporated by reference herein in its entirety.

BACKGROUND OF THE INVENTION

Customers typically communicate with customer service representatives to diagnose or determine problems or issues the customer is having, and customer service representatives typically communicate with customers to serve the customers, often from a remote location and with limited knowledge of the problem or issue the customer wants to resolve. There is not an effective diagnostic system that can connect the customer's experience to the diagnostic data received from the customer device. Applicant has identified a number of additional deficiencies and problems associated with conventional customer service representative systems. Through applied effort, ingenuity, and innovation, many of these identified problems have been solved by developing solutions that are included in embodiments of the present invention, many examples of which are described in detail herein.

BRIEF SUMMARY

In general, embodiments of the present disclosure provided herein include methods, systems, apparatus, and computer program products for facilitating diagnosis and repair related to one or more performance states of a computing device, such as a mobile computing device. Embodiments of the present disclosure may include a guided customer service interface to improve the diagnosis and determination of a customer's problems or issues.

In general, embodiments of the present invention provided herein include methods, computer readable mediums, apparatus, and systems for providing customer service.

In some example embodiments, a method is provided including receiving a first data set associated with a first mobile computing device over a first network. The first data set may comprise one or more data values associated with the first mobile computing device. In some embodiments, the method may include determining a plurality of performance states for the first mobile computing device. The plurality of performance states may comprise at least one performance state for one or more of a plurality of operational categories. At least a first performance state may be associated with a first operational category, which may be a first diagnostic indicator associated with the first mobile computing device. In some embodiments, the method may include displaying a first graphical user interface on a screen. The first graphical user interface may comprise visual representations associated with two or more of the plurality of operational categories including the first operational category. The visual representation may be associated with the first operational category comprises a first visual representation of the first diagnostic indicator. The first visual representation of the first diagnostic indicator may cause the visual representation associated with the first operational category to be visually distinct from a visual representation associated with a second operational category.

In some example embodiments, determining of the first performance state associated with the first operational category includes identifying a threshold associated with the first operational category. In some embodiments, the method may include determining the first performance state based on a comparison of the one or more data values to the threshold.

In some example embodiments, identifying the threshold associated with the first operational category includes receiving an aggregated data set associated with a plurality of other mobile computing devices. The aggregated data set may include one or more data values associated with the plurality of mobile computing devices from the plurality of operational categories. In some embodiments, the method may include setting the threshold based on a statistical analysis of the aggregated data set for the first operational category.

In some example embodiments, the threshold may be defined below an average or median value of the aggregated data set for the first operational category.

In some example embodiments, the determining of the first performance state associated with the first operational category further may include identifying a range associated with the first operational category. In some embodiments, the method may include determining the first performance state based on a comparison of the one or more data values to the range.

In some example embodiments, the determining of the first performance state associated with the first operational category may include receiving an aggregated data set associated with a plurality of other mobile computing devices. The aggregated data set may include one or more data values associated with the plurality of mobile computing devices from the plurality of operational categories. In some embodiments, the method may include training a model based on the aggregated data set to determine the at least one of the plurality of performance states. In some embodiments, the method may include determining the first performance state associated with the first operational category by applying the first data set to the model.

In some example embodiments, the method may include receiving a second data set associated with a plurality of second mobile computing devices. The second data set comprises one or more data values associated with the plurality of second mobile computing devices from the plurality of operational categories. In some embodiments, the method may include aggregating said second data set to produce an aggregated data set. The determining the first performance state associated with the first operational category may include comparing one or more data values of the first data set associated with the first operational category with one or more data values of the aggregated data set associated with the first operational category.

In some example embodiments, the comparing one or more data values of the first data set for the first operational category with one or more data values of the aggregated data set for the first operational category may include identifying a threshold for the first operational category based on the aggregated data set. In some embodiments, the method may include determining the first performance state based on a comparison of the one or more data values associated with the first mobile computing device to the threshold.

In some example embodiments, identifying the threshold for the first operational category based on the aggregated data set may include determining an average value or a median value for the first operational category based on the aggregated data set.

In some example embodiments, the comparing one or more data values of the first data set associated with the first operational category with one or more data values of the aggregated data set associated with the first operational category may include identifying a range associated with the first operational category based on the aggregated data. In some embodiments, the method may include determining the first performance state based on a comparison of the one or more data values associated with the first mobile computing device to the range.

In some example embodiments, the visual representation associated with the first operational category may include a visual representation of a plurality of operational sub-categories associated with the first operational category.

In some example embodiments, the visual representation associated with the plurality of operational sub-categories may include a visual representation associated with a first operational sub-category. The plurality of performance states may include a performance state associated with the first operational sub-category. The visual representation associated with the first operational sub-category may include a visual representation of a diagnostic indicator associated with the first operational sub-category.

In some example embodiments, the visual representation of a diagnostic indicator associated with the first operational sub-category may be visually represented the same as the first visual representation of the first diagnostic indicator.

In some example embodiments, the visual representation of a diagnostic indicator associated with the first operational sub-category may be visually represented differently than the first visual representation of the first diagnostic indicator.

In some example embodiments, the first visual representation of the first diagnostic indicator may include a symbol.

In some example embodiments, the first visual representation of the first diagnostic indicator may indicate a problem with at least one of the first operational category or the first operational sub-category.

In some example embodiments, the first visual representation of the first diagnostic indicator may indicate there are no problems with the first operational category and the first operational sub-category.

In some example embodiments, the plurality of performance states may include a second performance state associated with a second operational sub-category. The second performance state associated with the second operational sub-category comprises a second diagnostic indicator. In some embodiments, the method may include the visual representation of the plurality of operational sub-categories may include a visual representation of the second operational sub-category. The visual representation of the second operation sub-category may include a visual representation of the second diagnostic indicator. The visual representation of the second diagnostic indicator may indicate a diagnosis different from the diagnosis indicated by the first diagnostic indicator.

In some example embodiments, the method includes displaying, in response to receiving a selection of the first operational category, a second graphical user interface. The second graphical user interface may include a second visual representation associated with the first operational category, and the second visual representation associated with the first operational category may include one or more second diagnostic indicators associated with the first performance state. The one or more second diagnostic indicators associated with the first performance state may provide additional information associated with the first performance state relative to the first diagnostic indicator.

In some example embodiments, the one or more second diagnostic indicators may include a diagnostic message comprising a description of one or more problems associated with the first performance state.

In some example embodiments, the second graphical user interface may include a plurality of historical data from the first data set for the first operational category and a time-stamp associated with the historical data.

In some example embodiments, a portion of the historical data from the first data set may include one of the second diagnostic indicators associated with the first performance state.

In some example embodiments, the second graphical user interface may include a plurality of historical data from the first data set for the first operational category, a timestamp associated with the historical data, and a diagnostic indicator associated with the historical data.

In some example embodiments, the diagnostic indicator associated with the historical data may be associated with only a portion of the plurality of historical data indicating a problem associated with the first mobile computing device.

In some example embodiments, the method includes determining one or more diagnostic messages associated with the first performance state. In some embodiments, the method may include displaying, on the second graphical user interface, one or more performance prompts comprising the one or more of the diagnostic messages.

In some example embodiments, the one or more performance prompts may include one or more programmatically-generated potential solutions to one or more problems of the first computing device associated with the first performance state.

In some example embodiments, the method includes displaying, on the second graphical user interface, a feedback icon associated with each of the performance prompts. In some embodiments, the method may include determining, in response to receiving a selection of one of the feedback icons, one or more additional diagnostic messages. In some embodiments, the method may include updating the display of the second graphical user interface in response to receiving a selection from one of the feedback icons to display the one or more of the additional diagnostic messages.

In some example embodiments, the method may include, in an instance in which the selection of the one of the feedback icons indicates a successful resolution to one or more problems associated with the first performance state, the one or more additional diagnostic messages may indicate a successful resolution of the problem.

In some example embodiments, the method may include, in an instance in which the selection of the one of the feedback icons indicates a successful resolution of one or more problems associated with the first performance state, removing the visual representation of a second diagnostic indicator associated with the one or more problems.

In some example embodiments, the method may include, in an instance in which the selection of the one of the feedback icons indicates a successful resolution of one or more problems associated with the first performance state, updating a database associated with the diagnostic messages.

In some example embodiments, the method may include, in an instance in which the selection of the one of the feedback icons indicates an unsuccessful prompt, displaying a second performance prompt comprising a second diagnostic message.

In some example embodiments, the determining of the first performance state associated with the first operational category may include receiving a second data set associated with a plurality of second mobile computing devices. The second data set may include one or more data values associated with the plurality of second mobile computing devices from the plurality of operational categories. In some embodiments, the method may include aggregating said second data set to produce an aggregated data set. The aggregated data set may include one or more data values associated with the plurality of mobile computing devices from the plurality of operational categories. The determining of the first performance state associated with the first operational category may compare one or more data values of the first data set for the first operational category with one or more data values of the aggregated data set for the first operational category.

In some example embodiments, the determining one or more additional diagnostic messages may determine a first additional diagnostic message and a second additional diagnostic message. The first additional diagnostic message may define a first diagnostic message resolution value and the second additional diagnostic message may define a second diagnostic message resolution value. In some embodiments, the method may include updating the display of the second graphical user interface in response to receiving a selection of one of the feedback icons to display one or more of the additional diagnostic messages may include displaying the first additional diagnostic message if the first diagnostic message resolution value is higher than the second diagnostic message resolution value and displaying the second additional diagnostic message if the second diagnostic message resolution value is higher than the first diagnostic message resolution value.

In some example embodiments, the method may include receiving an aggregated data set associated with a plurality of other mobile computing devices. The aggregated data set may include one or more data values associated with the plurality of other mobile computing devices corresponding to the plurality of operational categories. In some embodiments, the method may include updating the display, in response to receiving a selection of one of the one or more of the plurality of operational categories, to display a second graphical user interface displaying information associated with the selected one of the one or more of the plurality of operational categories.

In some example embodiments, the second graphical user interface may include displaying a plurality of data from the first data set for the first operational category and displaying a plurality of data from the aggregated data set for the first operational category.

In some example embodiments, the method may include determining a plurality of comparative performance states for one or more of the plurality of operational categories. In some embodiments, the method may include at least a first comparative performance state associated with a first operational category which may include a first comparative diagnostic indicator comparing the first mobile computing device with the plurality of other mobile computing devices. In some embodiments, the method may include displaying, on the second graphical user interface, a visual representation of the first comparative diagnostic indicator.

In some example embodiments, the method includes determining one or more comparative diagnostic messages associated with the first comparative performance state and displaying, on the second graphical user interface, one or more performance prompts comprising the one or more of the comparative diagnostic messages.

In some example embodiments, the method includes displaying, on the second graphical user interface, a feedback icon for each of the performance prompts. In some embodiments, the method may include determining, in response to receiving a selection of one of the feedback icons, one or more additional comparative diagnostic messages. In some embodiments, the method may include updating the display of the second graphical user interface in response to receiving a selection from one of the feedback icons to display one or more of the additional comparative diagnostic messages.

In some example embodiments, the determining a plurality of performance states further comprises determining at least one performance state by comparing the most recent data of the first data set in associated with an operational category against historical data from a predetermined period of time prior to a time associated with the most recent data.

In some example embodiments, the first performance state is determined at least in part by a problem identified in the first data set existing for the predetermined period of time. The first diagnostic indicator may define an indication of the problem. In some example embodiments, the period of time may be one of 7 days, 14 days, 21 days, or 30 days.

In some example embodiments, the determining a plurality of performance states may include identifying a threshold for the first operational category based on the historical data and determining the first performance state based on a comparison of the first data set to the threshold.

In some example embodiments, the method includes determining one or more diagnostic messages associated with the first performance state and displaying one or more performance prompts each comprising one of the one or more of the diagnostic messages.

In some example embodiments, the method includes displaying a feedback icon for each of the performance prompts. In some embodiments, the method may include determining, in response to receiving a selection of one or of the feedback icons, one or more additional diagnostic messages. In some embodiments, the method may include updating the display of the graphical user interface in response to receiving a selection from one of the feedback icons to display one or more of the additional diagnostic messages.

In some example embodiments, determining a plurality of performance states for the first mobile computing device may include identifying a range for the first operational category based on the historical data and determining the first performance state based on a comparison of the first data set to the range.

In some example embodiments, the method includes determining one or more diagnostic messages associated with the first performance state and displaying one or more performance prompts each comprising one of the one or more of the diagnostic messages.

In some example embodiments, the method includes displaying a feedback icon for each of the performance prompts. In some embodiments, the method may include determining, in response to receiving a selection of one or of the feedback icons, one or more additional diagnostic messages and updating the display of the graphical user interface in response to receiving a selection from one of the feedback icons to display one or more of the additional diagnostic messages.

In some example embodiments, the method includes establishing, upon a communication request from a customer associated with the first mobile computing device, a transmission connection with the customer. In some embodiments, the method may include receiving at least a portion of the first data set via the transmission connection. In some embodiments, the method may include determining one or more diagnostic messages associated with the first performance state. In some embodiments, the method may include establishing a communication connection with the customer. The establishing of the communication connection may occur in connection with displaying the first graphical user interface. In some embodiments, the method may include displaying one or more performance prompts each comprising one of the one or more of the diagnostic messages. In some embodiments, the method may include transmitting to the first mobile computing device a first instruction set associated with one or more of the one or more diagnostic messages. In some embodiments, the method may include receiving from the first mobile computing device a responsive portion of the first data set via the transmission connection. The responsive portion of the first data set is associated with a response from the first mobile computing device processing the first instruction set.

In some example embodiments, the communication connection may be a phone call or an audio connection.

In some example embodiments, the portion of the first data set may be one of a plurality of portions of the first data set. The portion of the first data set may include data values associated with the first mobile computing device from a plurality of operational categories when the transmission connection is established.

In some example embodiments, the first visual representation of the first diagnostic indicator may be or include a color, a symbol, a status message, and/or shading the visual representation of the first operational category.

In some example embodiments, the method may include determining one or more diagnostic messages associated with the first performance state. The one or more diagnostic messages may be determined based upon an aggregated data set associated with a plurality of other mobile computing devices.

In some example embodiments, the plurality of other mobile computing devices may be of a same classification.

In some example embodiments, the method may include determining one or more diagnostic messages associated with the first performance state. The one or more diagnostic messages may be determined based upon a trained model.

In some example embodiments, the first visual representation of the first diagnostic indicator may include a modification of the visual representation associated with the first operational category.

In some example embodiments, the first visual representation of the first diagnostic indicator may include a first icon defined on an icon representing the first operational category.

In some example embodiments, the method may include a client terminal comprising the screen. The client terminal may be remotely located from the first mobile computing device.

In some example embodiments, a method may be provided for solving one or more problems with a mobile device including receiving a first data set associated with a first mobile computing device over a first network. The first data set may include one or more data values associated with the first mobile computing device. In some embodiments, the method may include determining one or more plurality of performance states for the first mobile computing device. In some embodiments, the method may include generating and displaying one or more performance prompts based on at least one of the performance states. The one or more performance prompts may include a diagnostic message associated with the performance state.

In some example embodiments, the method may include receiving, via a graphical user interface, an indication associated with the performance prompt. The indication may include one of an indication of a successful resolution of a problem associated with the one or more performance states or an indication of an unsuccessful prompt.

In some example embodiments, the one or more performance states may be determined by a model. The model may be: a statistical model; or a trained machine learning model, the trained machine learning model being trained based on an aggregated data set from a plurality of other mobile computing devices.

In some example embodiments, the one or more performance states may be determined based on an aggregated data set from a plurality of other mobile computing devices.

In some example embodiments, the one or more performance prompts may be determined by a model. The model may be: a statistical model; or a trained machine learning model, the trained machine learning model being trained based on an aggregated data set from a plurality of other mobile computing devices.

In some example embodiments, the one or more performance prompts may be determined based on an aggregated data set from a plurality of other mobile computing devices.

In some example embodiments, a method may be provided that includes receiving an input from a user at a first mobile computing device. The input may be an indication of a request to initiate a support session. In some example embodiments, the method may include establishing communication between the first mobile computing device and the customer service system and transmitting a first data set from the mobile computing device to the customer service system. In some example embodiments, the method may include initiating, based upon one or more performance prompts generated in response to the first data set, one or more remedial actions on the first mobile computing device.

In some example embodiments, a method may be provided that includes receiving a first data set associated with a first mobile computing device over a first network. The first data set may comprise one or more data values associated with the first mobile computing device. In some embodiments, the method may include determining a plurality of performance states for the first mobile computing device. The plurality of performance states may comprise at least one performance state for one or more of a plurality of operational categories. In some embodiments, the method may include identifying one or more thresholds associated with the plurality of performance states. In some embodiments, the method may include determining one or more remedial actions based on a comparison of the plurality of performance states with the one or more thresholds associated with the plurality of performance states. In some embodiments, the method may include establishing communication with the first mobile computing device. In some embodiments, the method may include establishing causing transmission of the one or more remedial actions to the first mobile computing device.

In some example embodiments, the one or more remedial actions include one or more changes to a setting of the first mobile device.

In some example embodiments, causing transmission of the one or more remedial actions to the first mobile computing device includes pushing the remedial action to the first mobile device.

BRIEF DESCRIPTION OF THE FIGURES

Reference will now be made to the accompanying drawings, which are not necessarily drawn to scale, and wherein:

FIG. 9 illustrates a flow diagram of an example system in accordance with some embodiments discussed herein;

FIG. 10 illustrates a flow diagram of an example system in accordance with some embodiments discussed herein;

FIG. 11 illustrates a flow diagram of an example system in accordance with some embodiments discussed herein;

FIG. 12 illustrates a flow diagram of an example system in accordance with some embodiments discussed herein;

FIG. 13 illustrates a flow diagram of an example system in accordance with some embodiments discussed herein;

FIG. 14 illustrates a flow diagram of an example system in accordance with some embodiments discussed herein;

FIG. 16 illustrates a flow diagram of an example system in accordance with some embodiments discussed herein;

FIG. 18 illustrates a flow diagram of an example system in accordance with some embodiments discussed herein.

DETAILED DESCRIPTION

Figure 1:
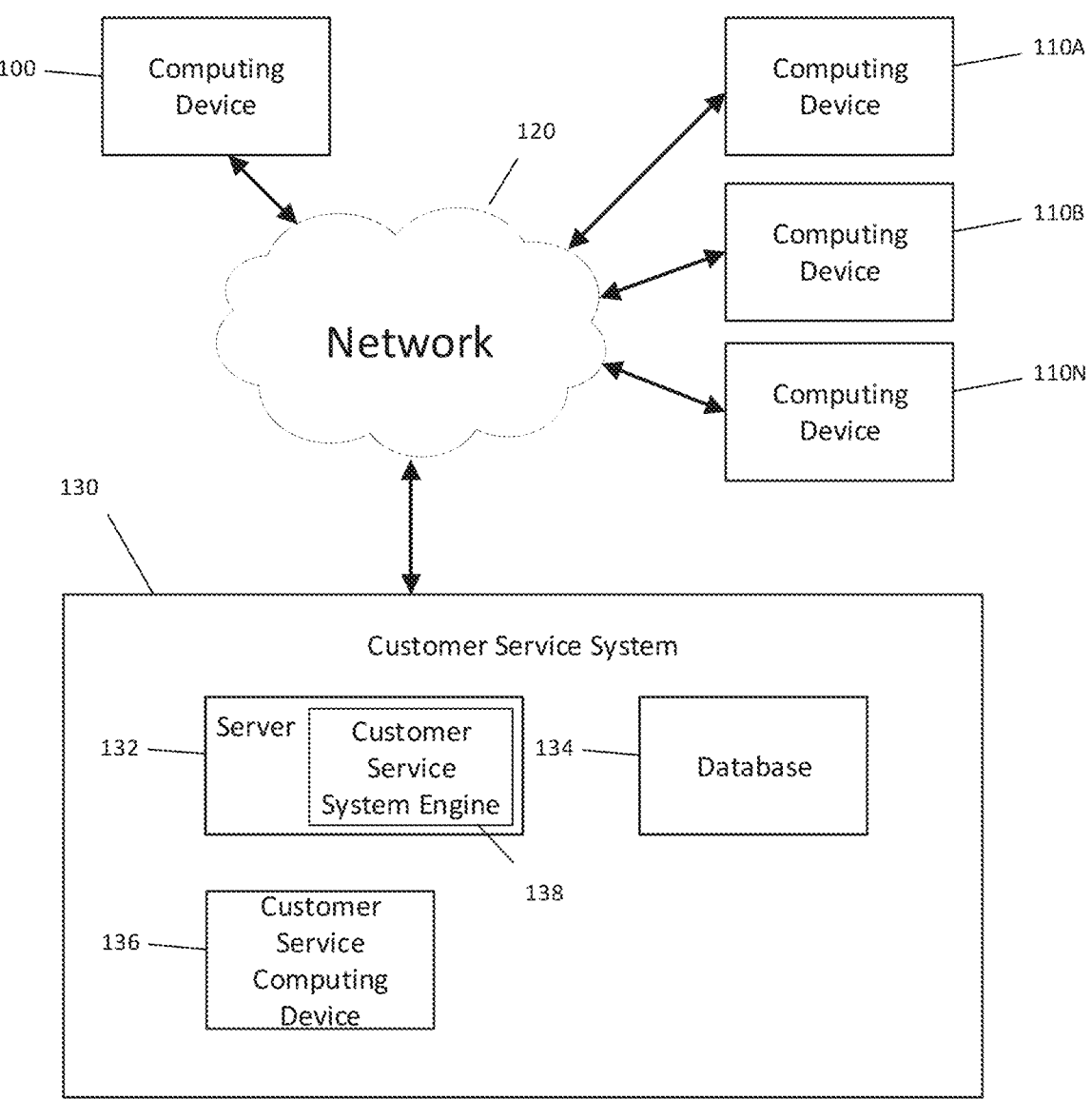
FIG. 1 illustrates an example system in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "data set" refers to any data associated with or otherwise related to a computing device, such as, but not limited to, data associated with identifying a device, with identifying a customer, with identifying hardware of a device, identifying software of a device, with characteristics of a device, with an operational category, or with operational sub-category. A data set may be made one single set of data, or a data set may be comprised of a plurality of portions of data, such as other data sets. A portion of a data set may be associated with an operational category or an operational sub-category. In some embodiments, a data set may be portioned chronologically. For example, a first portion of a data set may be associated with historical data and a second portion of the data set may be associated with current or real-time data. A data set may also include time stamps associated with operational categories of data and/or operational sub-categories of data. A data set may be associated with one computing device or, alternatively, a data set may be aggregated from data sets from multiple devices. Data aggregation may be performed at predetermined intervals (e.g., daily). An aggregated data set may be further portioned. For example, the aggregated data set may be of data from a plurality of computing devices having the same or different classifications, such as classification by device types (e.g., smartphone, laptop), manufacturers, makes, and/or models, and the aggregated data set may have a portion for each computing devices device type, manufacturer, make, or model. The data sets may be collected at certain times and/or intervals based on one or more factors. For example, the data collection rate may be dependent on an operating system associated with the computing device depends on the type of data and platform (e.g., iOS vs Android). In some embodiments, some data is collected on a scheduled basis, some is collected on demand remotely by a request transmitted by a customer circulation. In some embodiments, the user can only disable collection completely and limit the functionality of the guided interface. In some embodiments, the customer service system may transmit a request from the customer service computing device or server to the customer's computing device, which request requests the latest data values of the data at the time of the request. In some embodiments, the customer computing device may also upload some data stored locally on the customer computing device since the last scheduled update (e.g., 24 hours).

As used herein, the term "operational categories" refers to any category of data associated with a computing device, such as, but not limited to, battery, signal, processor, storage, audio, settings, commands, status updates, applications, remote support, or enrollment. In some embodiments, an operational category may refer to a single layer of data associated with a computing device. In some embodiments, an operational category may comprise a layer of data having one or more layers of data within the category (e.g., operational sub-categories).

As used herein, the term "operational sub-categories" refers to any sub-category of data associated with an operational category. An operational sub-category may belong to one operational category, or an operational sub-category may be associated with more than one operational category. In some embodiments, an operational sub-category may include a second layer of information within any operational category. For example, the operational sub-categories for the operational category of audio may be, but are not limited to, music volume, call volume, ringer volume, alarm volume, system volume, Bluetooth, Bluetooth volume, or other volumes of audio. As a further example, the operational sub-categories for the operational category of battery may be, but are not limited to, battery health, battery capacity, firmware health, battery state, performance, consumption, low battery, charging, charging alert, charge rate, discharge rate, battery charging type, battery charging rate, discharge when asleep, discharge when awake, average battery life, current battery life, battery usage, voltage, current, power, temperature, current level, or level drop. As a further example, the operational sub-categories for the operational category of signal may be, but are not limited to, signal strength, noise, signal quality, average signal quality, receive strength signal indicator, reference signal received power, reference signal received quality, reference signal signal-to-noise ratio, cell identity, physical cell ID, tracking area code. Operational categories and operational sub-categories may refer to information at different layers of specificity relative to each other. For example, an operational category may also be an operational sub-category relative to a higher category of information. In an example, an operational sub-category may also be an operational category for one or more sub-categories beneath the operational sub-category.

As used herein, the term "performance states" refers to data indicative of an operation of one or more aspects of a computing device, such as data indicative of an operation of a computing device for an operational category or an operational sub-category, and a performance state may include different data associated with each operational category or operational sub-category. A performance state associated with an operational category may be based on a performance state associated with data values of the mobile device falling under one or more operational sub-categories within the operational category. For example, if there is determined to be a problem associated with a computing device associated with an operational sub-category then there may also be determined to be a problem associated with the computing device for an operational category. A performance state may include one or more data values, such as a numerical value, message, and/or other data value associated with the state (e.g., good, normal, bad, charging, discharging, working, not working). For example, the performance state for the operational sub-category of battery temperature may be "normal" or an equivalent state when a battery temperature is determined to be at a normal temperature. Further, a performance state may include a comparative performance, which may be based on a comparison of data of an operational category or operational sub-category for a first computing device with data of an operational category or operational sub-category for a first computing device from a second computing device or, as further disclosed herein, an aggregated data set. In some embodiments, a performance state may be determined on a gradient or as a degree (e.g., 50% functional). A performance state may comprise one or more diagnostic indicators which represent the data indicative of an operation of one or more aspects of a computing device. In some embodiments, the performance states may comprise one or more "problems" which may then be indicated by a diagnostic indicator. As described herein, terms such as "problem", "issue", or the like refer to any actual, possible, likely, potential, or perceived operational deficiency or abnormality that a user or customer service representative may seek to resolve.

As used herein, the term "diagnostic indicator" refers to an indicator of a diagnosis associated with a computing device that is determined in association with a performance state. A diagnostic indicator may be determined using the various embodiments described herein, and may be visually represented in a graphical user interface, such as by an icon, a color, a diagnostic message, or other representation that conveys information about the performance state to the user. For example, a performance state of normal for a battery temperature may have a diagnostic indicator associated with a normal detected state of the device (e.g., a green hue to the graphic, a checkmark, a thumbs up, a "good" or "normal" message, or another indicator of a normal performance state). For example, diagnostic indicator may be visualized in a graphical user interface by text in green, an icon colored green, or a background shading of an area associated with a battery temperature in a specific color. As a further example, a performance state of below average, unacceptable, or otherwise defective for an average battery life data value may include a diagnostic indicator visually represented with a text in yellow, a yellow icon, and/or a yellow hue to an icon associated with the performance state to indicate that the performance state includes a possible or actual problem. Diagnostic indicators may be generated for different layers of information in a graphical user interface. For example, a performance state for a "battery" operational category that comprises a problem associated with the battery may include a diagnostic indicator indicating a diagnosed problem with the battery. Upon selection of the battery operational category of the interface, one or more second diagnostic indicators may be shown that further refine the diagnosis to, for example, separate sub-categories. Additional examples of visual representations associated with diagnostic indicators may be an icon or text displayed on a graphical user interface that is emphasized (e.g., colored, highlighted, bolded, italicized, enlarged, shaded, flashing, pulsing, or changing in size, etc.). Additional examples of diagnostic indicators include numerous embodiments described herein, and would be understood to include any other indicators of a performance state in light of the present disclosure.

As used herein, the term "diagnostic message" refers to a type of diagnostic indicator which may include a message that may be determined by a customer service system, and a diagnostic message may be displayed on a graphical user interface to describe a performance state and/or diagnostic indicator associated with an operational category or an operational sub-category. For example, if a customer is communicating with a customer service representative about a volume being too low, a diagnostic message may be a current or a past setting of the volume, may also provide an explanation of why this may be the issue, and/or may include a recommendation to provide to the customer.

As used herein, the term "performance prompt" refers to a prompt displayed on a graphical user interface that may include a diagnostic message to prompt a customer service representative to discuss a performance state and/or diagnosis with a customer. The performance prompt may be programmatically generated according to the various embodiments discussed herein. In some embodiments, the performance prompt may be determined based on the performance state and/or diagnostic indicator and may facilitate further data collection and/or repairs of the computing device. In some embodiments, a performance prompt may provide discrete actions for resolving one or more potential or actual problems diagnosed in association with the performance state.

As used herein, the term "feedback icon" refers to an icon displayed on a graphical user interface that allows a user of the graphical user interface (e.g., a customer service representative) to provide feedback. In various embodiments, a feedback icon may be presented to collect data from a customer service representative indicating additional data collection. For example, a feedback icon may be a radio box that allows the user to check to the box, which may indicate that a prompt associated with the message was resolved or, alternatively, not resolved. In some embodiments, a feedback icon may be presented, and, upon selection, trigger transmission of computer program instructions configured to cause a modification of the software associated with a consumer computing device to address one or more performance states. A feedback icon may be dynamic, such as by changing colors, changings shapes, changing images, or, if there is a message in the icon, changing messages.

As used herein, the term "resolution value" refers to a value associated with a diagnostic message that may be a probability, prediction, or estimation that what is addressed in the diagnostic message may diagnose or resolve a customer's problem(s) or issue(s). A resolution value may define a confidence level associated with the performance prompt and/or diagnostic message. In some embodiments, the resolution value may facilitate ranking of the performance prompts and selection by the computing system of a performance prompt to display to the user (e.g., a customer service representative). A resolution value may be determined from analyzing or statistically modeling past data values for the first mobile computing device and/or data sets that are not associated with the mobile computing device. For example, if multiple data sets associated with a specific make and model of mobile computing device indicate issues with an operational sub-category (e.g., battery level low) and that the issue may be, or have a higher percentage change to be, resolved by actions the customer may take (e.g., plug in the mobile computing device), then a diagnostic message associated with these actions a user may take may receive a higher resolution value. As a further example, and in contrast, if multiple data sets associated with a specific make and model of mobile computing device indicate issues with an operational sub-category (e.g., battery level low) and that the issue may not be, or have a lower percentage change to be, resolved by actions the customer may take (e.g., replace the battery), then a diagnostic message associated with these actions a user may take may receive a lower resolution value. Further, resolution values and associated diagnostic messages more be stored in a database, and upon feedback that a diagnostic message guided a customer service representative to address or resolve a customer's problem or issue, the database is updated to reflect the diagnostic message addressed or resolve a customer's problem or issue.

As used herein, the term "customer" may include, but is not limited to, a client, customer, purchaser, shopper, user, or the like, who may be in the position to or does interact with a customer service representative to diagnose or resolve a problem or issue with one or more computing devices.

Overview

As technology progresses, customers buying technology often are not able to keep up with how computing devices operate and are not able to effectively diagnose problems with their computing devices or describe to others with particularity the problems that would allow others (e.g., customer service representatives) to diagnose problems with the computing devices. The widespread adoption of mobile computing devices (e.g., mobile phones, smartphones, tablets) has placed technology in the hands of many customers who bought the technology without understanding many of the details of how these computing devices function. This may lead customers to having problems or issues with a computing device, such as a mobile computing device, without knowing how to diagnose, address, or resolve problems or issues that may arise or to understand the connection between the symptoms they experience and the actual problem with the computing device. In some instances, when problems or issues occur, customers reach out to customer service representatives for help, but customers are unable to adequately describe the problem to the customer service representative or convey the information necessary to resolve the problems with the computing device.

Customer service representatives may assist customers with resolving their problems with their computing devices. A customer service representative may be located at a remote location from a customer, and communication with a customer service representative may be via a phone call, a video call, or a live chat. Further, the only information that a customer service representative may have about a customer's problems or issues is limited to what a customer may provide. With a disparity in technical knowledge among customers, along with variations in languages and dialects, the manner in which a customer may describe a problem or issue may vary widely. For example, when a smartphone's screen may not present information (e.g., be blank), one customer may a describe a problem as the device not turning on while another customer may describe a problem as a battery being dead and another customer may describe the problem as the screen being broke. Further, a customer may not have access to the technical history of operation of a device or the software running on the device and thus may not have access to the relevant portions of the device to attempt to diagnose the problem or issue or describe a problem or issue. Additionally, or alternatively, a customer may have done research on the internet and attempt to address or diagnose a problem or issue, and the customer may present this information to a customer service representative, which is likely to be misleading. In some instances, multiple problems may cause complex symptoms that cannot be effectively diagnosed by outside observation or a typical customer service call. A customer service representative may be requested to address all of these situations. A customer service representative may be able to address a customer's problems or issues by understanding the customer's computing device as well as being informed on the appropriate questions to ask and which remedial steps to take. The knowledge of the computing device and questions to ask may come from a number of sources, such as, for example, a customer service system, which may provide guidance. Traditional solutions to these problems required a user to ship the computing device to a repair facility for in-person diagnosis and repair or replacement.

The customer service representative may not know by themselves if a customer's description is of the actual fault or performance state that is causing a problem or issue with a computing device. For example, a fault may be in the hardware or a software of the computing device, but a customer may be describing a hardware problem or issue when a problem or issue is with a software (or vice versa). Moreover, when a customer describes a problem or issue, a customer may fail to describe if the problem is acute or chronic. Issues with accurately describing problems or issues may make it difficult for a customer service representative to address them. Thus, for example, a customer service system may connect to a customer's computing device remotely to address, diagnose, or resolve the problem or issue. Alternatively, or additionally, a customer service representative may request a customer ship a computing device to a repair location.

Described herein are methods and systems of a mobile device repair system, guided customer service system, and a guided customer service interface that diagnoses one or more performance states associated with a computing device and guides a customer service representative in remotely addressing, diagnosing, and/or resolving a customer's problems or issues by computationally bridging the gap between consumer experiences and performance data from the device. A customer service system may use data received from a customer's computing device (e.g., a data set), which may include historical data, recent data, and/or real-time data, which may be received in one or portions. Additionally, or alternatively, a customer service system may use data received from one or more other computing devices, which may be aggregated, to assist in addressing a customer's problems or issues. The customer service system may establish a connection with a customer's computing device and update a customer's computing device to address a problem or issue, and a computing device may transmit real-time data to a customer service system in response, which may indicate a problem or issue has been resolved or may indicate additional information about a problem or issue. Further, the exchange of data back and forth between the customer service representative and customer service system and a customer and a customer's computing device may take multiple iterations and the system may programmatically determine the most likely resolution to the problem and present guided prompts to direct the resolution of the problem.

Data from a customer's computing device may be collected over time for use with a computing device diagnostic system and guided customer service system and interface. A periodic providing of data from a customer's computing device to a customer service system may allow a customer service system to collect, store, and analyze the data from a customer's device over time to determine performance states that correctly indicate problems and avoid false positives. Further, the analysis may guide a customer service representative when a customer requests assistance, and a customer service system may request only an update as to recent data since the customer's computing device last provided information. Moreover, having a historical data for a customer's computing device may allow for diagnosis or analysis and determine if a component of the customer's computing device is a source of a problem or issue.

In some embodiments, the collection of data from a customer's computing device over time may require permission from a user. The permission may be grant by the customer one time or the customer my be asked to grant, and may grant, permission for each time data is collected. In some embodiments, the customer may grant permission for the collection of data over time such that the data collection would create data logs or collect data from already existing data logs. In some embodiments, additional permission may be requested in addition to those previously granted by a user, such as for a supplemental or additional data collection initiated by a customer service representative. In some embodiments, the asking of a customer to grant permission may be based on what operational category information or operational sub-category information is collected. In some embodiments, the asking of permission may be with a communication to the customer service representative (such as in chat, video, email, etc.), may be generated on a customer's computing device by a customer service representative (such as with a pop-up, notification, etc.), or may be generated automatically (such as with a pop-up, notification, etc.).

For example, in an embodiment, a customer may be having an issue with power, and data may be collected over time related to operational categories and/or operational sub-categories that relate to power or battery usage, such as signal strength, location, volume levels, screen brightness, etc. The data collected over time may be stored on the customer's computing device and/or may be stored on a customer service system. In some embodiments, the data collected over time may be available to access after it has been collected, such as by accessing by the customer, customer service representative, or another on the customer service system or on the customer's computing device.

Customer's computing device may comprise a number of components and may have data for the operation of each component. Operational data may be associated with a number of operational categories, and each category may be comprised of operational sub-categories. Analysis of data may occur at an operational category level or may occur at the more granular at an operational sub-category level. In some embodiments, data may be analyzed together and identified performance states may be assigned to operational categories and/or sub-categories. Further, analyzing data at the most nuanced sub-category level may determine where a problem or issue is occurring when such analysis may not be determined from analyzing data at the category level. Moreover, when a nuance sub-category level of a customer's computing device is compared to the same data of another similar computing device or to the same data from an aggregation of similar computing devices, how the customer's computing device is performing may be determined. This may be particularly helpful due to addressing a customer's problems or issues for a computing device in isolation may be very difficult.

A customer service system may store data received from computing devices in a database, and the data may be analyzed as described herein to diagnose and determine where a customer may be having problems or issues with a computing device.

Figure 3A:
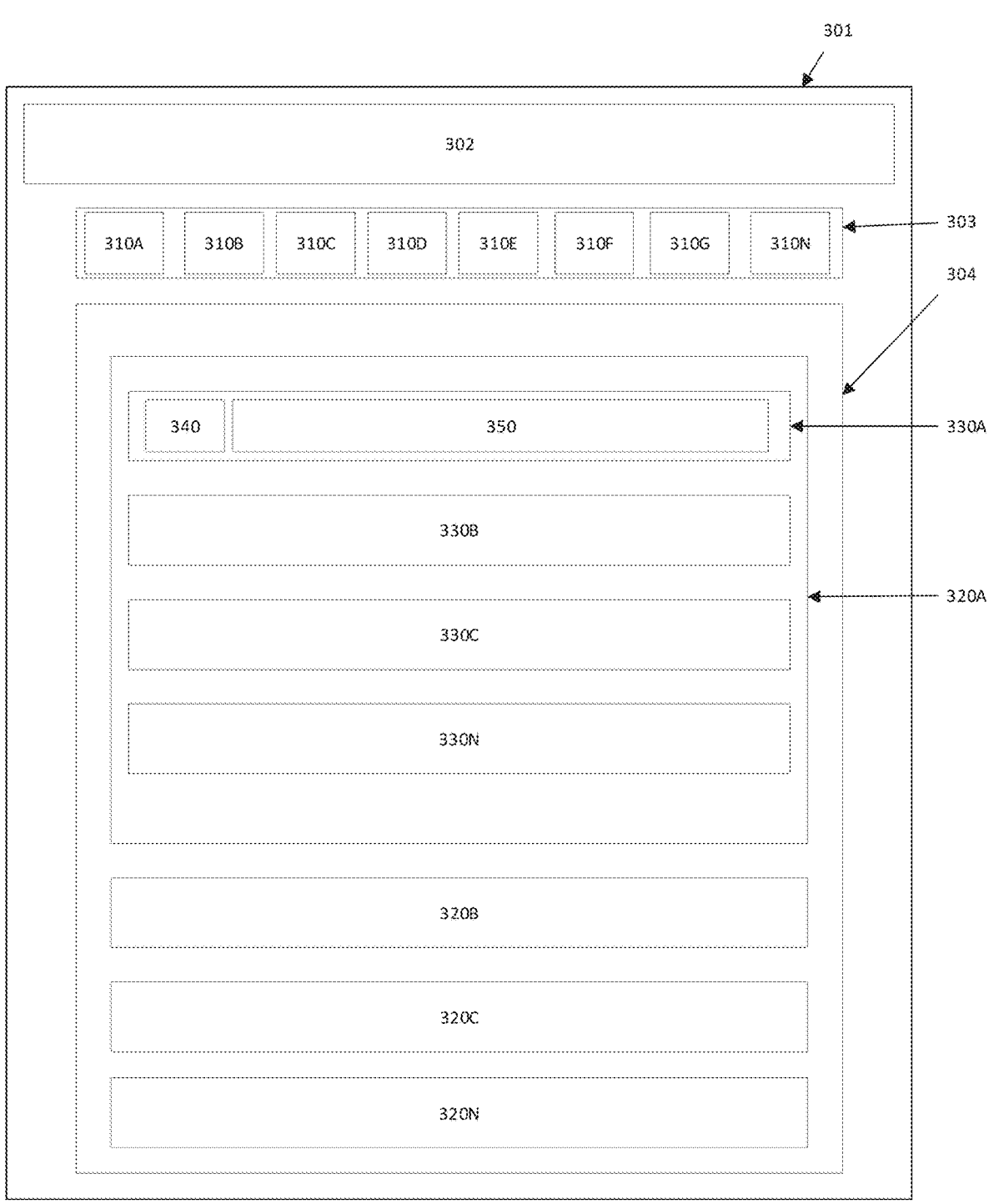
FIG. 3A illustrates an example graphical user interface in accordance with some embodiments discussed herein.

Various embodiments of the invention are directed to a graphical user interface, for example FIG. 3A, that is configured to be adaptive, intuitive, and to guide a customer service representative. With guidance, a customer service representative may efficiently converse with a customer to efficiently get information from the customer and obtain, in some examples, non-signal-data that may be needed to correctly analyze and diagnose the customer's problems or issues and the performance states and underlying analysis may translate the perceived problems of the customer into actual problems for resolution by the systems and methods described herein. Guidance may be determined by the customer service system based on data sets from the customer's computing device, performance states determined by the customer service system, and diagnostic indicators. Additionally, or alternatively, a graphical user interface may display data sets from the customer's computing device, performances states, and diagnostic indicators to a customer service representative. Moreover, a customer service system may use an analysis of data to provide a customer service representative with diagnostic messages to discuss with a customer.

System Architecture

The present disclosure includes various embodiments for a system architecture associated with a customer requesting customer service from a customer service representative via a customer system. FIG. 1 illustrates an example system architecture in accordance with various embodiments of the present disclosure. The system architecture may include a computing device 100, a plurality of computing devices 110A, 110B, . . . 110N (collectively referred to herein as "computing devices 110" or "other computing devices"), network 120, and customer service system 130. Customer service system 130 may be communicably connected with computing device 100 and computing devices 110 via network 104, and customer service system 130 may include server 132, database 134, and customer service computing device 136. While only one server 132, database 134 and customer service computing device 136 are depicted in FIG. 1 for clarity, it will be appreciated that numerous additional of each may be present in customer service system 130.

Customer service computing device 136 may include a display for displaying a graphical user interface.

Computing device 100 may be associated with a customer, such as a customer requesting service with a problem or issue with computing device 100. Although a computing device 100 is shown, any number of customer devices may be associated with and/or used by a customer. Computing device 100 may be a mobile device (i.e., a mobile computing device) and/or a stationary or fixed device. For example, computing device 100 may be a mobile device such as a mobile telephone (such as smartphone), laptop, tablet, and/or the like or similar mobile computing and/or communication devices. Additionally and/or alternatively, computing device 100 may be a customarily stationary device such as a desktop computer, work station, or the like.

Network 120 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, network 120 may include a cellular telephone, mobile broadband, long term evolution (LTE), GSM/EDGE, UMTS/HSPA, IEEE 802.11, IEEE 802.16, IEEE 802.20, WiFi, and/or WiMax network. Furthermore, network 120 may include a public network, such as the Internet, a private network, such as an intranet, or any combinations thereof, and may utilize a variety of networking protocols now available or later developed including, but not limited to TCP/IP based networking protocols.

The customer service system 130 may receive data from, transmit data to, and communicate with computing device 100 and computing devices 110. As depicted in FIG. 1, customer service system 130 engages in machine-to-machine communication with computing device 100 and computing devices 110 via one or more networks 120. Additionally, customer service system 130 may utilize, generate, store, process, request, transmit, modify, and otherwise use and keep track of, among other things, data sets received from computing device 100 and computing devices 110, performance states, diagnostic indicators, etc. A customer service system 130 may include one or more servers 132, one or more databases 134, and one or more customer service computing devices 136. The elements of the customer service system 130 may be connected to each other directly or indirectly (e.g., via network 120). A customer service system 130 is described further herein.

Server 132 may include circuitry, one or more networked processors, or the like configured to perform some or all of the server-based processes described herein and may be any suitable network server and/or other type of processing device. In some embodiments, customer service system 130 may function as a unified "cloud" with respect to computing device 100 and/or computing devices 110. Server 132 may include several servers performing interconnected and/or distributed functions. To avoid unnecessarily overcomplicating the disclosure, server 132 is shown and described herein as a single server; however, one of ordinary skill in the art will appreciate in light of the present disclosure that any number of servers and/or similar computing devices may be used. In some embodiments, with reference to FIG. 2, the server 132 may comprise processing circuitry 210, a user interface 216, and/or a communication interface 218 for facilitating the various functions described herein, which functions may be embodied as hardware, software, or a combination of hardware and software. As described herein, the processing circuitry 210 may comprise one or more processors 212, which may include local, networked, or remote processors or any other processing means known in the art.

Database 134 may be any suitable local or networked storage device configured to store some or all of the information described herein. Database 134 may be configured to store, for example, data sets, performance states, diagnostic messages, and customer representative feedback. As such, database 134 may include, for example, one or more database systems, backend data servers, network databases, cloud storage devices, etc. To avoid unnecessarily overcomplicating the disclosure, database 134 is shown and described herein as a single database device; however, one of ordinary skill in the art will appreciate in light of the present disclosure that any number of databases may be used. In some embodiments, with reference to FIG. 2, the database 134 may comprise processing circuitry 210, a user interface 216, and/or a communication interface 218 for facilitating the various functions described herein, which functions may be embodied as hardware, software, or a combination of hardware and software. As described herein, the processing circuitry 210 may comprise one or more processors 212, which may include local, networked, or remote processors or any other processing means known in the art.

Customer service computing device 136 may have the same components as computing device 100, which is described further herein (e.g., with respect to FIG. 2), such as a user interface 216, which may display a graphical user interface via a screen, such as a guided customer service interface according to various embodiments described herein. The customer service computing device 136 may further comprise processing circuitry 210 and/or a communication interface 218 for facilitating the various functions described herein, which functions may be embodied as hardware, software, or a combination of hardware and software. As described herein, the processing circuitry 210 may comprise one or more processors 212, which may include local, networked, or remote processors or any other processing means known in the art. Alternatively, a customer service computing device 136 may have different components as computing device 100. A customer service computing device 136 may be located remotely from other components of a customer service system 130. Customer service computing device 136 may include, for example, one or more customer service computing devices. To avoid unnecessarily overcomplicating the disclosure, customer service computing device 136 is shown and described herein as a single customer service computing device; however, one of ordinary skill in the art will appreciate in light of the present disclosure that any number of customer service computing devices may be used. In various embodiments, the customer service computing device 136 may define a client terminal accessed by a customer service representative as part of a customer service system.

Customers that request service from a customer service system (e.g., by transmitting a request to initiate a customer support session) may each have one or more computing devices. The computing devices may define a device classification. While a portion of customers may have computing devices with the same or a similar classification (e.g., one or more fields of classification, such as manufacturer, type, etc. in common), another portion will have computing devices having a different classification. There are, for example, many differences in classification of computing devices, such as types, manufacturers, makes, models, and model years. Further, even when the type, manufacturer, make, model, and model year of a computing device may be the same, there may be differences in components used during manufacturing. These classifications may be stored in the customer service system, such as in database 134, and/or transmitted by the respective computing devices for facilitating the diagnosis and resolution of one or more problems associated with the computing devices as described herein.

Figure 2:
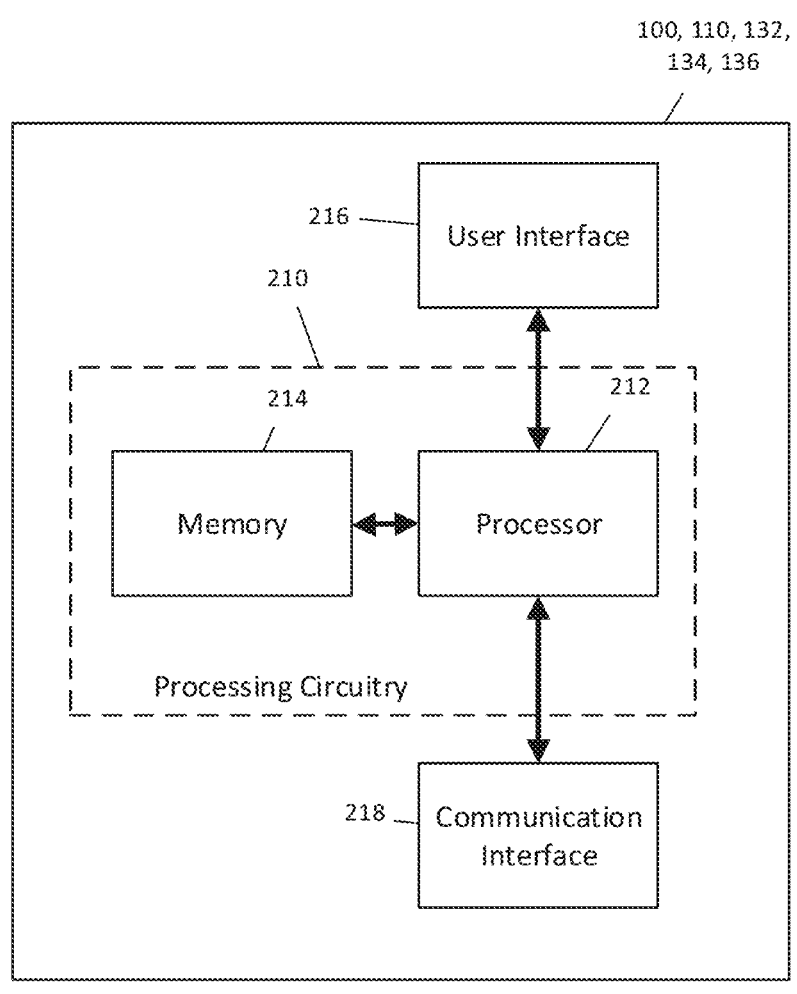
FIG. 2 illustrates an example mobile computing device in accordance with some embodiments discussed herein.

FIG. 2 illustrates an example computing device in accordance with some embodiments discussed herein. FIG. 2, for example, illustrates a computing device 100 and/or each of the plurality of computing devices 110. In some embodiments, any of the devices in the customer service system 130 may also include some or all of the components of the example computing device 100 shown in FIG. 2. The components, devices, or elements illustrated in and described with respect to FIG. 2 below may not be mandatory and thus some may be omitted in certain embodiments. Additionally, some embodiments may include further or different components, devices, or elements beyond those illustrated in and described with respect to FIG. 2.

Referring now to FIG. 2, the example computing device 100, 110, 132, 134, 136 may include or otherwise be in communication with processing circuitry 210 that is configurable to perform actions in accordance with one or more example embodiments disclosed herein. In this regard, a processing circuitry 210 may be configured to perform and/or control performance of one or more functionalities of a computing device 100 in accordance with various example embodiments, and thus may provide means for performing functionalities of a computing device 100 in accordance with various example embodiments. A processing circuitry 210 may be configured to perform data processing, application execution and/or other processing and management services according to one or more example embodiments. In some embodiments, a computing device 100, or a portion(s) of component(s) thereof, such as the processing circuitry 210, may be embodied as or comprise a chip or chip set. In other words, a computing device 100 or a processing circuitry 210 may comprise one or more physical packages (e.g., chips) including materials, components and/or wires on a structural assembly (e.g., a baseboard). A structural assembly may provide physical strength, conservation of size, and/or limitation of electrical interaction for component circuitry included thereon. A computing device 100 or a processing circuitry 210 may therefore, in some cases, be configured to implement an embodiment on a single chip or as a single "system on a chip." As such, in some cases, a chip or chipset may constitute means for performing one or more operations for providing the functionalities described herein.

In some example embodiments, a processing circuitry 210 may include a processor 212 and, in some embodiments, such as that illustrated in FIG. 2, may further include memory 214. A processing circuitry 210 may be in communication with or otherwise control a user interface 216 and/or a communication interface 218. As such, a processing circuitry 210 may be embodied as a circuit chip (e.g., an integrated circuit chip) configured (e.g., with hardware, software or a combination of hardware and software) to perform operations described herein.

A processor 212 may be embodied in a number of different ways. For example, a processor 212 may be embodied as various processing means such as one or more of a microprocessor or other processing element, a coprocessor, a controller or various other computing or processing devices including integrated circuits such as, for example, an ASIC (application specific integrated circuit) or an FPGA (field programmable gate array) or the like, or a combination thereof. Although illustrated as a single processor, it will be appreciated that a processor 212 may comprise a plurality of processors. A plurality of processors may be in operative communication with each other and may be collectively configured to perform one or more functionalities of a computing device 100 as described herein. In some example embodiments, a processor 212 may be configured to execute instructions stored in a memory 214 or otherwise accessible to the processor 212. As such, whether configured by hardware or by a combination of hardware and software, a processor 212 may represent an entity (e.g., physically embodied in circuitry—in the form of processing circuitry 210) capable of performing operations according to embodiments of the present invention while configured accordingly. Thus, for example, when a processor 212 is embodied as an ASIC or FPGA or the like, or a combination thereof, a processor 212 may be specifically configured hardware for conducting the operations described herein. Alternatively, as another example, when a processor 212 is embodied as an executor of software instructions, the instructions may specifically configure the processor 212 to perform one or more operations described herein.

In some example embodiments, a memory 214 may include one or more non-transitory memory devices such as, for example, volatile and/or non-volatile memory that may be either fixed or removable. In this regard, memory 214 may comprise a non-transitory computer-readable storage medium. It will be appreciated that while memory 214 is illustrated as a single memory, memory 214 may comprise a plurality of memories. A memory 214 may be configured to store information, data, applications, instructions and/or the like for enabling a computing device 100 to carry out various functions in accordance with one or more example embodiments. For example, the memory 214 may be configured to buffer input data for processing by the processor 212. Additionally or alternatively, a memory 214 may be configured to store instructions for execution by the processor 212. As yet another alternative, memory 214 may include one or more databases that may store a variety of files, contents or data sets. Among the contents of a memory 214, applications may be stored for execution by a processor 212 in order to carry out the functionality associated with each respective application. In some cases, a memory 214 may be in communication with one or more of a processor 212, user interface 216, and/or communication interface 218 via a bus(es) for passing information among components of computing device 104.

A user interface 216 may be in communication with the processing circuitry 210 to receive an indication of a user input at the user interface 216 and/or to provide an audible, visual, mechanical or other output to the user. As such, the user interface 216 may include, for example, a keyboard, a mouse, a screen, a joystick, a display, a touch screen display, a microphone, a speaker, and/or other input/output mechanisms. As such, the user interface 216 may, in some example embodiments, provide for a user to access and interact with a customer service system and/or a customer service representative in accordance with various example embodiments.

A communication interface 218 may include one or more interface mechanisms for enabling communication with other devices and/or networks. In some cases, a communication interface 218 may be any means such as a device or circuitry embodied in either hardware, or a combination of hardware and software that is configured to receive and/or transmit data from/to a network and/or any other device or module in communication with the processing circuitry 210.

By way of example, a communication interface 218 may be configured to enable the computing device 100 to communicate with a customer service system and/or a customer service representative via the network 120. Accordingly, a communication interface 218 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet, WiFi, Bluetooth, or other methods.

Data Sets, Modeling, and Machine Learning

A customer service system 130 receives and stores multiple types of data, including data sets, and uses the data in multiple ways. A customer service system 130 may receive data sets from computing devices. Data sets may be stored in the customer service system 130 and may be used for diagnosing problems or issues with a customer's computing device. Additionally, or alternatively, data sets may be used in modeling, machine learning, and AI.

Computing device 100 may provide a data set of data for computing device 100 to the customer service system 130 over network 120. Similarly, each of computing devices 110 may also be capable of providing a data set to the customer service system 130 over network 300. Data sets from computing devices 110 may be stored separately in data base 420, and each of the data sets from computing devices 110 may be individually used in diagnosing problems or issues. Additionally, or alternatively, the data sets from computing devices 110 may be aggregated into an aggregated data set. Alternatively, an aggregated data set may be provided to the customer service system. Further, a data set from computing device 100 may, or may not, be included in an aggregated data set. In one example, an aggregated data set may be anonymized so that a computing device provided a data set in the aggregated data set may not be determined. Further, an aggregated data set may include data values from a plurality of operational categories and data values for operational sub-categories. In embodiments in which one or more of the other computing devices 110 is being diagnosed and/or requests customer service, the data transmitted from the computing device 100 may form a portion of an aggregated data set used to diagnose and repair any problems with the one or more other computing devices 110.

In some embodiments, data sets provided to the customer service system may be data sets from third parties or generated from third party applications or websites in addition to or instead of data sets provided by end user computing devices to the customer service system. A third party may provide an entire data set, such as data for a specific manufacturer and/or model of a computing device, and/or the third party may provide one or more subsets of data, including data for individual devices. Third party applications or websites may also contain data about a specific manufacturer and/or model of a computing device, and data may be collected from such third party applications or websites, such as by querying or crawling such applications or websites. In one embodiment, social media (e.g., Facebook) may contain discussion of a specific manufacturer and/or model of a computing device, and those discussions may be crawled for specific data. In some embodiments, such data from third parties or third party applications and websites may be used to recognize or generate trends. The trends may include trends with computing devices, such as the devices for which a customer may seek customer service using the customer service system. The third party data may be indexed by any characteristic of the data, including manufacturer, model, etc. The trends may be recognized or generated by modeling or machine learning. Alternatively, trends may be provided from a third party in the third party data collected.

A customer service engine 138 may be employed in the customer service system to perform the various calculations herein related to calculating a performance state, such as diagnosing one or more problems with a computing device, determining a diagnostic indicator, generating performance prompts using a diagnostic indicator (e.g., a diagnostic message), and otherwise facilitating the diagnosis and resolution of one or more problems associated with the computing device, such as by the guided customer service systems and methods described herein. In an example embodiment, the customer service engine 138 may be embodied, for example, in the server 132, may operate based on data retrieved from the database 134 and/or computing devices 100, 110, and may receive and/or transmit information to the customer service computing device 136. The customer service engine 138 may be embodied as hardware, software, or a combination of hardware and software configured to perform one or more of the functions described herein.

The AI and machine learning systems and methods according to the embodiments described herein will now be described. The AI and machine learning may be performed by a customer service system engine 138, which may be a part of the customer service system and which may calculate information based on various modeling techniques.

Machine learning may be used to develop a particular pattern recognition algorithm (i.e. an algorithm that represents a particular pattern recognition problem) that may be based on statistical inference. In some embodiments, a customer service system 130 receives large quantities of data (e.g., data sets) from a variety of sources (e.g., computing device 100 and computing devices 110) and must determine a diagnosis for a situation. In some embodiments, a "trained model" may be trained based on the algorithms and processes described herein, and trained models described herein may be generated using the processes and methods described herein and known in the art.

For example, a set of clusters may be developed using unsupervised learning, in which the number and respective sizes of the clusters is based on calculations of similarity of features of the patterns within a previously collected training set of patterns. In another example, a classifier representing a particular categorization problem or issue may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In some embodiments, data set analysis includes a source-specific classifier that takes a source-specific representation of the data set received from a particular source as an input and produces an output that categorizes that input as being likely to include a relevant data reference or as being unlikely to include a relevant data reference (e.g., likely or unlikely to meet the required criteria). In some embodiments, the source-specific classifier is a trainable classifier that can be optimized as more instances of data sets for analysis are received from a particular source.

Alternatively or additionally, the trained model may be trained to extract one or more features from historical data using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from data. In some examples, the historical data may comprise data that has been generated using user input, crowd-based input or the like (e.g., user confirmations).

In some embodiments, a training data set may be selected based on computing devices sharing a similar classification to the computing device being diagnosed and repaired (e.g., a training set comprising only mobile devices having a certain operating system, only mobile devices comprising a certain hardware, only mobile devices of a certain make or model, or the like). Using the techniques described herein, the model may then be trained to determine one or more performance states associated with a computing device, to generate one or more diagnostic messages and/or performance prompts associated with the mobile device, including generating a resolution value associated with one or more of the prompts, and to determine any other diagnostic, customer service, or related calculation associated with the methods and embodiments described herein. The training data may also be selected from a predetermined time period, such as a number of days, weeks, or months prior to the present.

In an example embodiment, labeled data sets may be fed into the customer service system engine 138 to train the model. The labeled data sets may comprise operational data associated with a plurality of computing devices and a label including a diagnosis, diagnostic message, prompt, or the like associated with the computing device. The model may then bet trained to identify and classify operational data sets received from a computing device as corresponding to one or more of the labeled criteria.

In some embodiments, analysis ends if the system determines that received data set does not include at least one relevant data reference.

In some embodiments, the system determines whether a referenced relevant data is already known to the system. In some embodiments, this determination is based on whether data representing the referenced relevant data is stored is a data repository (e.g., database 134). In embodiments, analysis ends if the system determines that a referenced relevant data already is known to the system.

In some embodiments, the customer service system may use LSTM Networks to make predictions based on a sequence of diagnostic events. In some embodiments, the AI and models described herein use a "deep learning" module. Deep learning is a subset of machine learning that generates models based on training data sets provided to it. Deep learning networks can be used to pull in large inputs and let the algorithm learn which inputs are relevant in identifying the device issue or no issue. In some embodiments, the training model may use unsupervised learning techniques including clustering, anomaly detection, Hebbian Learning, as well as learning latent variable models such as Expectation-maximization algorithm, method of moments (mean, covariance), and Blind signal separation techniques, which include principal component analysis, independent component analysis, non-negative matrix factorization, and singular value decomposition.

In some embodiments, non-machine learning modeling techniques may be used. For example, an aggregated data set may be compiled and used to statistically compare with the performance of a data set associated with a particular computing device. In some embodiments, the aggregated data set may be filtered to a representative data set (e.g., based on classification as described above with respect to model training). One or more performance states associated with the computing device may then be determined based on a comparison between the data set of the computing device with the aggregated data set associated with the plurality of other computing devices. In an example, data values associated with the data set of the computing device may be directly compared and statistically related to the data sets of the plurality of the other computing devices to determine whether the performance of the computing device falls within an expected performance range. For example, in various embodiments, it may be determined whether the computing device falls within a predetermined criteria relative to the aggregated data set (e.g., a standard deviation, a percentile ranking, etc.) for each of a plurality of operational categories. In various embodiments, it may be determined whether the computing device falls within a predetermined criteria relative to the aggregated data set for each of a plurality of specific data values (e.g., battery life, processor speed, connection strength, and/or any other signal capable of being detected and output from a computing device, such as operating system API outputs). In some embodiments, an operation category may be defined by one or more specific data values. In some embodiments, a performance state may be associated with one or more specific performance parameters. In some embodiments, a performance state may be defined by a plurality of performance parameters (e.g., a performance state identifying a battery discharge issue may be displayed if (1) the screen is off, (2) the device is unplugged, and (3) the discharge rate is greater than a predetermined threshold). In some embodiments, a predetermined time period may be used when performing the modeling technique, such that, for example, a problem is not identified unless the performance state indicative of a problem has persisted for the entire predetermined time period, or a selected portion thereof.

In some embodiments, comparative aggregated data may be used and may be displayed to the user, which shows a comparison between the computing device associated with a customer and a plurality of other computing devices to identify and intuitively convey the similarities and differences between the computing device being analyzed and the aggregated data set.

Diagnosis

The customer service system 130 may diagnose a problem or issue with customer's computing device 100. The diagnosis may be based on a data set provided by the customer's computing device 100, on data sets provided by computing devices 110, on aggregated data sets and analysis thereof, on any other data sources described herein (e.g., third party data, including trend data), and/or modeling, which is described herein.

In one example, a battery temperature of a customer's computing device 100 may be compared to a threshold or range in order to diagnose if there is a problem or issue. Data of a battery temperature may be in a data set from the customer's computing device 100, which may include data values of the current battery temperature and/or historical data values of the battery temperatures. The customer service system 130 may compare a current battery temperature and/or historical battery temperatures to one or more thresholds. In one example, a single threshold is used to determine if the battery is or has gone above a high temperature. In further example, two thresholds may be used as a range (e.g., one a high temperature and one a low temperature), to determine if the battery has gone outside the range of temperatures. A threshold or range may be recommended by the manufacturer of the customer's computing device 100, may be set by a customer, or may be determined by a customer service system 130 (e.g., with modeling). In other examples, a threshold may be an average value, a moving average, or a weighted average, or a median value. If a battery temperature has, in one example, not exceeded the high temperature or, in the other example, not gone outside the temperature range, the customer service system may diagnose the customer's computing device as not having a problem or issue (e.g., a "normal" state). The diagnosis may determine a performance state indicating there is no problem or issue (e.g., normal, good, healthy, etc.). If a battery temperature has, in one example, exceeded a high temperature or, in the other example, gone outside a temperature range, a customer service system may diagnose a customer's computing device as having a problem or issue. A diagnosis may determine a performance state indicating there is a problem or issue (e.g., problem, issue, high, low, abnormal, unhealthy, etc.). While the above example is for an operational sub-category of data for battery temperature, it will be appreciated that the use of thresholds and/or ranges to diagnose if there is a problem or issue may be used with other operational categories of data and/or operational sub-categories of data. In some embodiments, ranges may be determined by the manufacturer as part of the design of the battery. In some embodiments, ranges may be determined based on observation on real deices with the same model. In some embodiments, the range or threshold may be preset, such as determining a problem exists when a data value is 10% outside the mean of the distribution of the aggregated data. Other thresholds and ranges relative to the mean may also be used. In various embodiments, for measures that are one sided (good=1, bad=0) the customer service system may consider the threshold based on the number falling below 10th percentile of their peers.

In another example, a customer's computing device 100's average battery life may be compared to an average battery life of other computing devices, for example, other computing devices of the same make and model from the same manufacturer. A data set from a customer's computing device 100 may include data values for the operational sub-category average battery life. A data set from a customer's computing device 100 may determine average battery life based on a period of time, such as the last 7 days. Alternatively, an average of battery life could be calculated from other periods of time, such as 14 days, 30 days, 3 months, or one year. Similarly, an aggregated data set for computing devices of the same manufacturer, make, and model may include data values for an average battery life. The customer service system 130 may compare the average battery life for the customer's computing device with an average battery life of the aggregated data set. If the customer's computing device 100's average battery life is above the average battery life of the aggregated data set then a customer service system may determine a performance state indicating there is no problem or issue (e.g., normal, good, healthy, etc.). If the customer's computing device 100's average battery life is below the average battery life of the aggregated data set then a customer service system may determine a performance state indicating there is or may be a problem or issue (e.g., problem, issue, low, abnormal, unhealthy, etc.). While the above example is for an operational sub-category of data for average battery life, it will be appreciated that the use of thresholds and/or ranges to diagnose if there is a problem or issue may be used with other operational categories of data and/or operational sub-categories of data.

In another example, a threshold or a range may be determined by statistical modeling or by using machine learning. A statistical model or machine learning may be used with data sets from customer computing device 100 and/or aggregated data sets. In one example, statistical modeling or machine learning be for data values for data from one operational category of data or one operational sub-category of data. Alternatively, statistical modeling or machine learning be for data values for data from a plurality of operational categories of data and/or a plurality of operational sub-categories of data.

The determining of the performance state for a diagnosis may include determining a diagnostic indicator, which may be visually represented on a screen (e.g., a screen of the customer service computing device 136) to indicate the performance state. A diagnostic indicator may vary with performance state and/or each performance state may have a distinct diagnostic indicator. Alternatively, diagnostic indicators may be the same or similar for performance states. For example, if a performance state is associated with a customer's computing device having no problems or issues for an operational category of data or an operational sub-category of data, the associated diagnostic indicator be a green icon indicating that for the operational category of data or operational sub-category of data the computing device is, for example, healthy or good. In some embodiments, a diagnostic indicator may define a level of specificity configured to represent the performance state within the bounds of an icon or screen and within the limits of the scope associated with such icon or screen, such that the amount of information conveyed by the diagnostic indicator may be limited to the amount of space available. For example, a diagnostic indicator may be displayed in association with one or more of a plurality of operational categories displayed on a graphical user interface. Based on the screen and icon space available, the diagnostic indicator may be of a limited specificity (e.g., an "exclamation point" or other indicator noting a problem with the operational category) or of a higher degree of specificity (e.g., a brief description of the problem or a more specific icon noting the type of problem, sub-category that triggered the problem, or the like).

The diagnostic indicator may be determined using the various embodiments described herein, and may be visually represented in a graphical user interface, such as by visually displaying an icon or a color. For example, a performance state of normal for a battery temperature may have a diagnostic indicator associated with a detected issue or state of the device. The diagnostic indicator may be visualized by text in green, an icon colored green, or a background shading of an area associated with the battery temperature in a specific color. As a further example, a performance state of below average for an average battery life may be a diagnostic indicator may be visually represented with a text in yellow and a yellow icon to indicate it has been determined that there may be an issue. Additional examples of visual representations associated with diagnostic indicators may be an icon or text displayed on a graphical user interface that is highlighted, shaded, flashing, pulsing, or changing in size.

Guided Interface

A customer service representative may interface with a customer service system 130 via the customer service computing device 136. The customer service computing device

136 may contain a user interface, including a display (also referred to as a screen), which may display a graphical user interface (referred to herein as "GUI") for the customer service representative. In accordance with various embodiments of the present disclosure, the GUI may display representations of information that may guide the customer service representative through an interaction with a customer to assist the customer with resolving or addressing the problem or issue the customer may have.

In an example, a GUI may be a directed to an overview that a customer service representative may begin with. An overview may display visual representations of data associated with a plurality of operational categories of data and/or a plurality of operational sub-categories of data for a customer's computing device 100. The GUI directed to an overview may also display visual representations of, among other things, diagnostic indicators, and the visual representation of a diagnostic indicator associated with a performance state determined to have a problem or issue may be visually distinct from other diagnostic indicators. The interface elements described herein which relates to a performance state, including conveying information associated with a computing device, may be considered diagnostic indicators. Additionally, the visual representation of a plurality of operational categories of data may be dynamic in that the visual representation of a plurality of operational categories of data may be expanded to provide visual representations of a plurality of operational sub-categories of data associated to the operational category. The example interfaces described herein may operate in conjunction with one another (e.g., selecting one or more icons on a GUI may cause the system to present a second GUI comprising another of the GUIs described herein). An apparatus and system according to the embodiments described herein may use multiple versions of the same GUI (e.g., two different interfaces displaying different information having the same layout as any one of the GUIs shown herein). In other embodiments, the example interfaces disclosed herein may operate any one or more GUIs in isolation.

FIG. 3A illustrates an example graphical user interface in accordance with some embodiments discussed herein. Referring to FIG. 3A, graphical user interface 301 (referred to herein as GUI 301) may be a graphical user interface displaying information associated with a customer and a customer's computing device 100 and displayed to a customer service representative when a customer has contacted the customer service representative to request assistance. Interface 301 may include an account area 302, which may display information associated with a customer's account, such as, for example, the customer's name, the customer's phone number, manufacture of customer's computing device 100, make of customer's computing device 100, model of customer's computing device 100, etc. GUI 301 may further include an operational category icon area 303 having one or more operational category icons 310A, 310B, 310C, 310D, 310E, 310F, 310G, . . . , 310N (collectively referred to herein as "operational category icons 310"). Each of the one or more operational category icons 310 may be associated with a different operational category of data (e.g., overview, battery, signal, storage, audio, settings, commands, status updates, applications, remote support, enrollment, or the like). Operational category icons 310 may each be dynamic, such as changing emphasis (e.g., shading, brightness, etc.) depending on a selection by a customer service representative or the information displayed on GUI 301. Interface 301 may further include a computing device information area 304 having one or more operational category information area 320A, 320B, 320C, . . . , 320N (collectively referred to herein as "operational category information area 320"). Each operational category information area 320 may include a visual representation of the associated operational category and/or one or more diagnostic indicators for an associated operational category. In one example, a diagnostic indicator for an associated category may be the same as a diagnostic indicator for an operational sub-category associated with the operational category (e.g., an "exclamation point", "checkmark", or the like). An operational category information area 320 may further include an operational sub-category information area 330A, 330B, 330C, . . . , 330N (collectively referred to herein as "operational sub-category information areas 330"). Each operational sub-category information area 330 may include a visual representation of one or more diagnostic indicators, including diagnostic indicators for an associated operational sub-category 340, and/or an operational sub-category diagnostic message 350. An operational sub-category diagnostic message 350 may include a name of the operational sub-category, a description of the operational sub-category, data values associated with the operational sub-category, and/or a performance state of the operational sub-category. As described herein, the GUI may display a visual representation associated with the operational categories, which may include the operational category icons 310A, 310B, 310C, 310D, 310E, 310F, 310G, . . . , 310N; operational category information areas 320A, 320B, 320C, . . . , 320N; operational sub-category information area 330A, 330B, 330C, . . . , 330N; and/or any other visual representations associated with one or more of the operational categories.

Figure 3B:
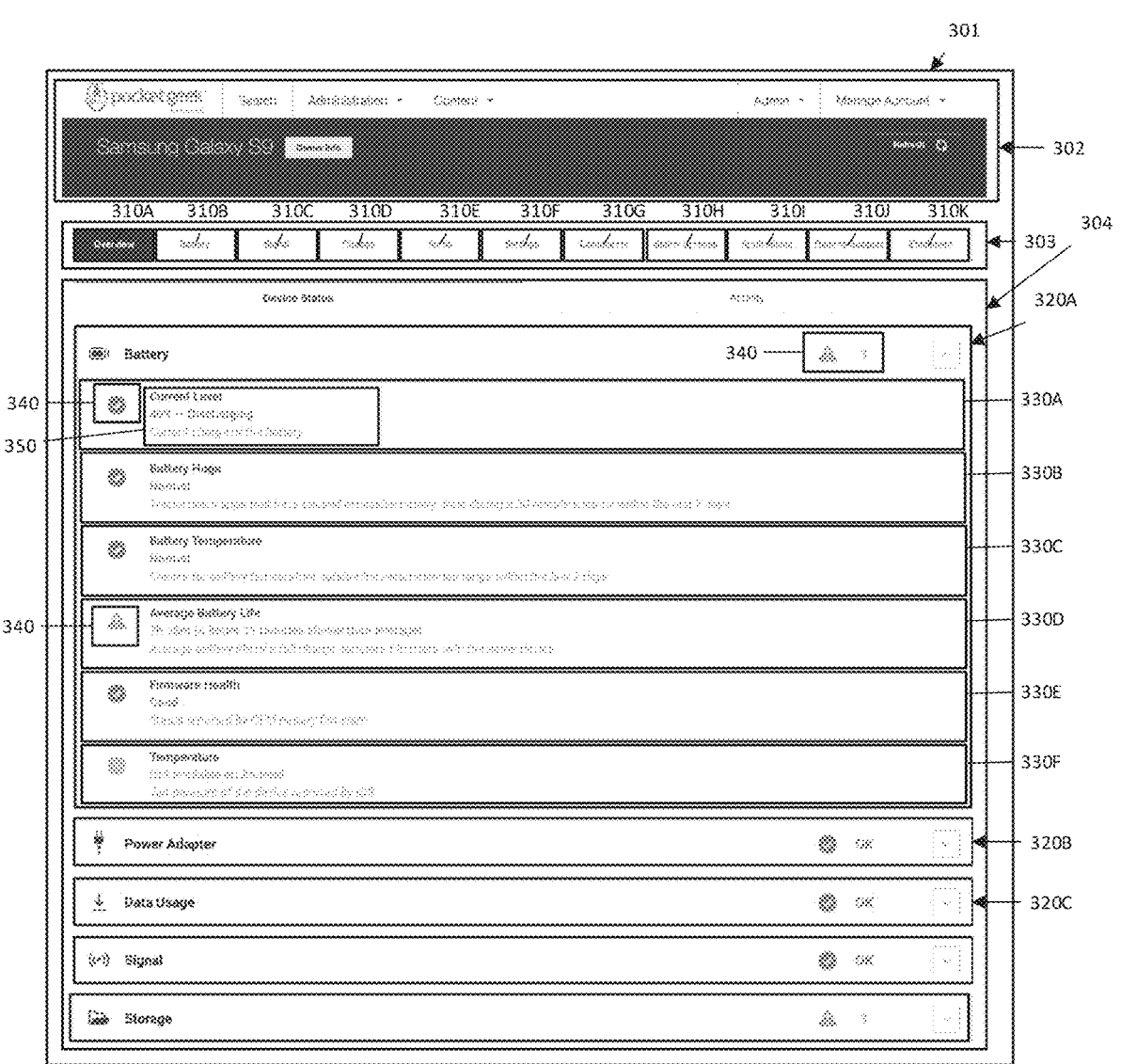
FIG. 3B illustrates an example of the graphical user interface of FIG. 3A for an operational category of "Overview" in accordance with some embodiments discussed herein.

FIG. 3B illustrates an example embodiment of the graphical user interface of FIG. 3A, wherein an operational category of "Overview" has been selected in accordance with some embodiments discussed herein. Referring to FIG. 3B, GUI 301 displays information for the operational category of "Overview," which is indicated as selection by an emphasized operational category icon 310A in an operational category icon area 303. In the depicted Overview operational category, information corresponding to each of a plurality of other operational categories is shown. In FIG. 3B, computing device account area 302 displays the manufacturer and model of a computing device 301 (e.g., "Samsung Galaxy S9"). Operational category icon area 303 displays 11 operational category icons 310 associated with 11 different operational categories of data (e.g., "Overview" at 310A, "Battery" at 310B, "Signal" at 310C, "Storage" at 310D, "Audio" at 310E, "Settings" at 310F, "Commands" at 310G, "Status Updates" at 310H, "Applications" at 310I, "Remote Support" at 310J, and "Enrollment" at 310K). Settings 310F may define one or more preferences or app/service related settings for the user to control, such as music volume, in call volume, WiFi on/off, and the like. In some embodiments, commands 310G are commands to change these settings or open the settings screen when is not possible to change them directly. In some embodiments, there are commands to initiate a remote support 310J via screen sharing or camera sharing. Computing device information area 304 displays operational category information area 320 associated with, for example, five different operational categories of data (e.g., "Battery" at 320A, "Power Adapter" at 320B, "Data Usage" at 320C, "Signal" at 320D, and "Storage" at 320E). The operation category information area 320A for "Battery" is displayed as expanded to display operational sub-category information areas 330 (e.g., "Current Level" at 330A, "Battery Hogs" at 330B, "Battery Temperature" at 330C, "Average Battery Life" at 330D, "Firmware Health" at 330E, and "Temperature" at 330F). In the example of FIG. 3B, the operational sub-category of "Battery Hogs" refers to applications that use a larger amount of the battery compared to other applications, and this is described further herein. In FIG. 3B, each operational sub-category information area 330 includes a visual representation of a diagnostic indicator 340 and an operational sub-category diagnostic message 350. For example, visual representation of a diagnostic indicator 340 for operational sub-category information area 330A is a green circle with a white check. Additionally, operational sub-category diagnostic message 350 for operational sub-category information area 330A includes a name of the operational sub-category (e.g., "Current Level," which is the current charge level for an operational category of battery), a description of the operational sub-category (e.g., "current charge of the battery"), a data value associated with the operational sub-category (e.g., "40%"), and/or a performance state of the operational sub-category (e.g., "40%—Discharging"). FIG. 3B additionally illustrates an operational sub-category of "Average Battery Life" have a diagnostic indicator 340, 350 indicating a problem or issue (e.g., a yellow triangle with an exclamation point inside).

In the depicted embodiment, each operational category information area 320 is expandable to show diagnostic indicators associated with one or more sub-categories therein. Upon selection of an "expand" icon (e.g., the arrow depicted to the right of each area 320), the additional sub-category information may be displayed, and based on the space available, more detailed diagnostic indicators, such as the diagnostic messages 350, may be shown. When collapsed, five operational categories are depicted showing low-detail diagnostic indicators 340 at the right side of each information area 320. In some embodiments, the diagnostic indicators may include a performance prompt as described herein. The depicted embodiment may thus intuitively direct the customer service representative to the diagnosis of the customer's problem. When operated in connection with a customer support session, the layered operational categories may quickly facilitate diagnosis and triage of the problem with the described intuitive system and interface.

In some embodiments, the customer service system 130 may provide additional information to a customer service representative for an operational category, which may be triggered in an instance in which further detail is required to diagnose and/or repair the computing device. The customer service representative may, for example, select one of operational category icons 310 and, in response, GUI 301 may be updated to display a second embodiment of the guided customer service interface. A customer service representative may select one of the operational category icons 310, for example, if a performance state and/or diagnostic indicator visually represented an indication that there may be a problem with a customer's computing device. Selection of one of the operational category icons 310 may cause a second GUI to be displayed comprising information associated with the selected operational category. In some embodiments, the second GUI may retain one or more features of the first GUI from which the operational category was selected. In an example, the GUI 301 may guide the customer service representative through GUI 301 to determine what may be the problem or issue. Further examples of how the customer service representative may be guided are disclosed herein, such as, for example, how the customer's computing device 100 may compare to other computing devices 110 of the same manufacturer and model.

With continued reference to FIG. 3B, in some embodiments, sub-menus or additional diagnostic indicator options may be available. For example, the GUI 301 shown in FIG. 3B comprises a "Device Status" interface which comprises the operational category information areas 320, 330 described above, and the GUI 301 comprises an "Activity" interface, which may show one or more additional visual representations of the performance states, diagnostic indicators, and any data related thereto. For example, the Activity interface may describe a chronological list of the activities performed by the customer computing device.

Figure 4A:
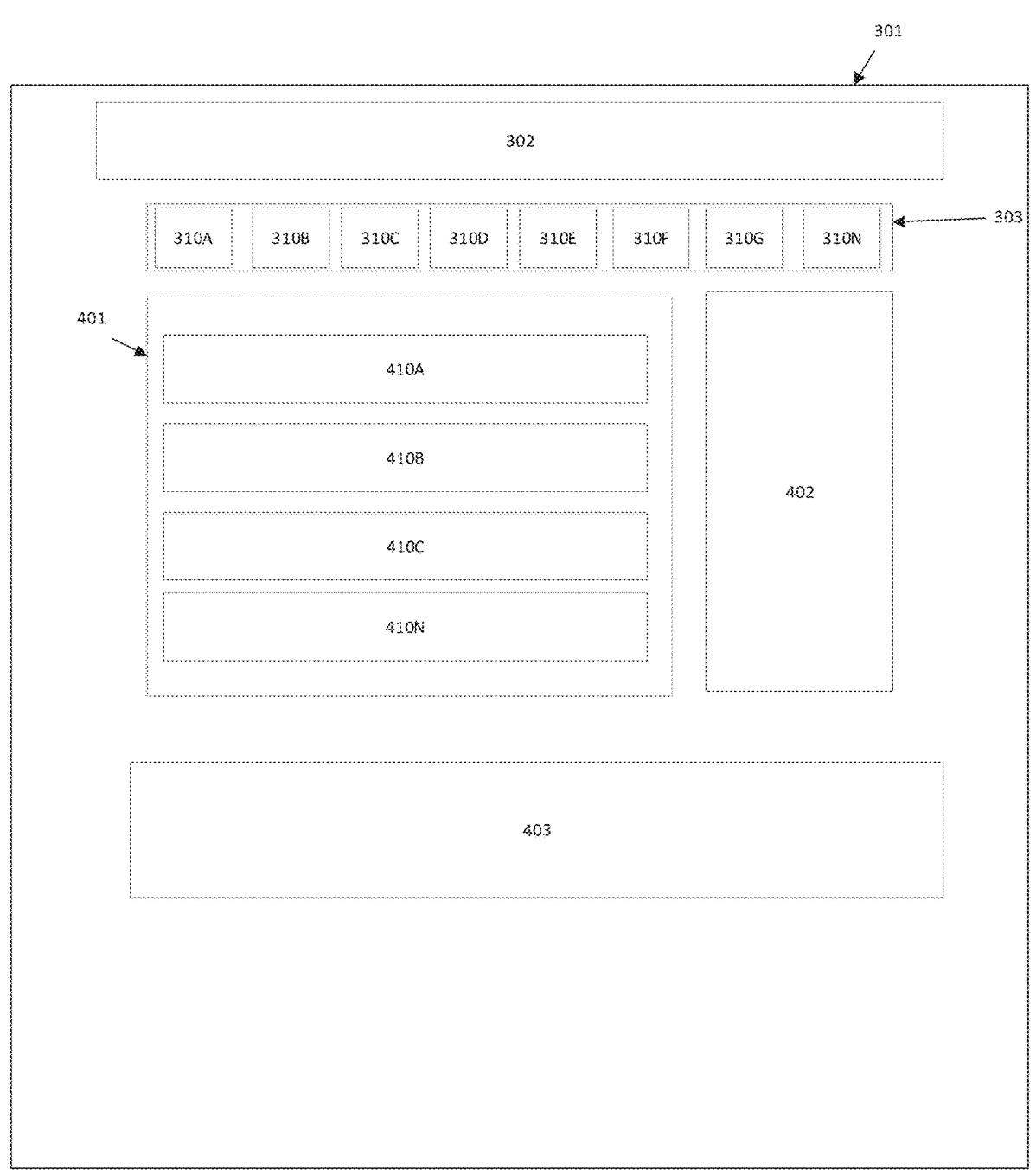
FIG. 4A illustrates an example graphical user interface in accordance with some embodiments discussed herein.

FIG. 4A illustrates an example graphical user interface in accordance with some embodiments discussed herein. Referring to FIG. 4A, GUI 301 may display account area 302, operational category icon area 303 including operational category icons 310 that may operate as described above with respect to the embodiment of FIGS. 3A-3B, operational category information area 401, operational sub-category data visualization area 402, and operational sub-category data comparative visualization area 403. Operational category information area 401 may have one or more operational sub-category information areas 410A, 410B, 410C, . . . , 410N (collectively referred to herein as "operational sub-category information areas 410"). Each of the one or more operational sub-category area 410 may be associated with a different operational sub-category of data, which is described above. Each operational sub-category information areas 410 may include an operational sub-category diagnostic indicator, such as a diagnostic message. An operational sub-category diagnostic message may include a name of the operational sub-category, a description of the operational sub-category, data values associated with the operational sub-category, a performance state of the operational sub-category, and/or any other visual representation of a diagnostic indicator. Operational sub-category data visualization area 402 may include a visualization, such as a graph or chart, that provides a visualization of the data for the associated operational sub-category. Operational sub-category data comparative visualization area 403 may include a comparative visualization, such as a graph or chart, that provides a comparative visualization that compares the data for the associated operational sub-category from the customer's computing device 100 with, for example, data for the associated operational sub-category from an aggregated data set. As described herein, the GUI may display a visual representation associated with the operational categories, which may include sub-categories, and which may include the operational category icons 310A, 310B, 310C, 310D, 310E, 310F, 310G, . . . , 310N; operational category information area 401; one or more operational sub-category information areas 410A, 410B, 410C, . . . , 410N; and/or any other visual representations associated with one or more of the operational categories, including one or more sub-categories.

Figure 4B:
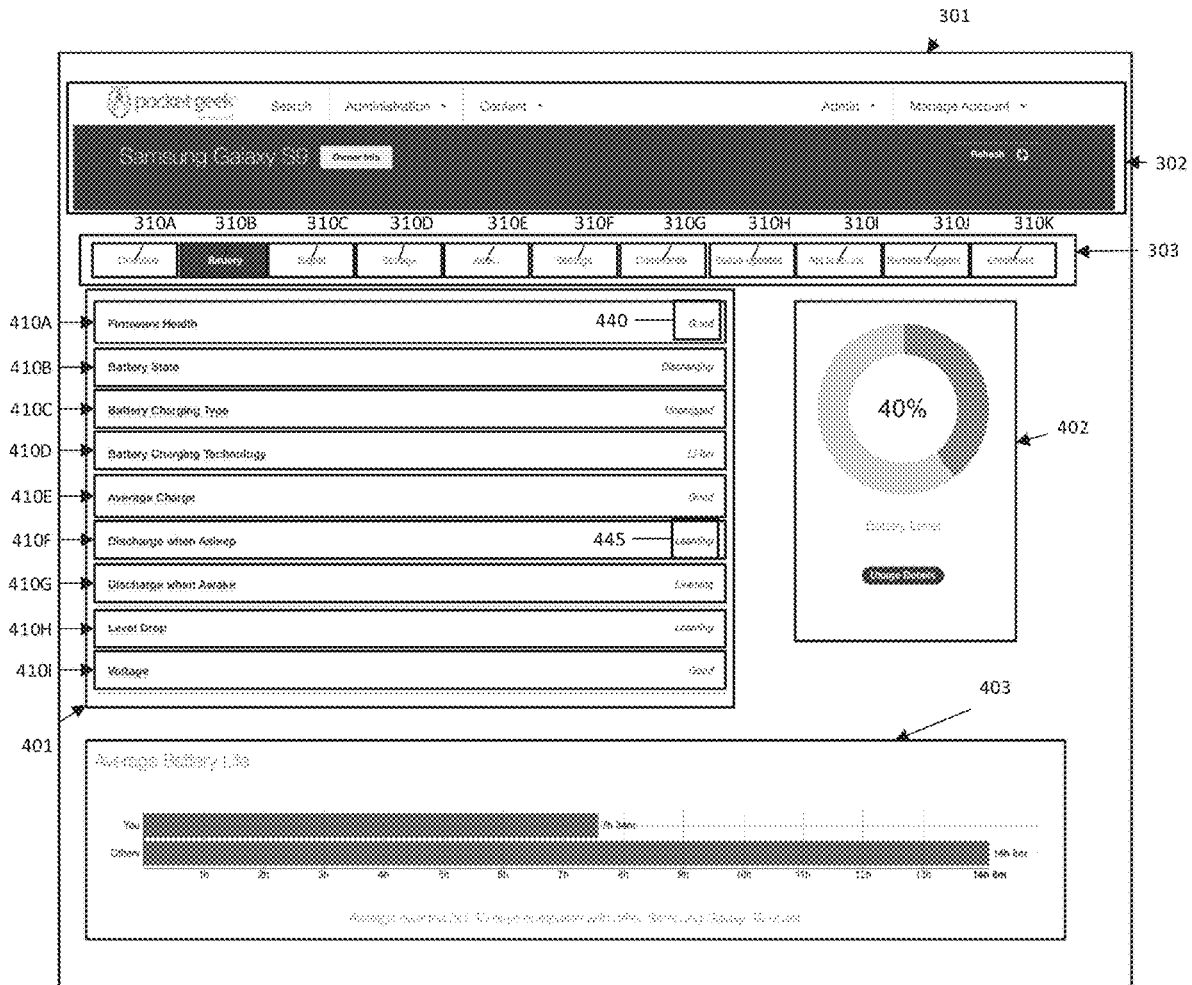
FIG. 4B illustrates an example of the graphical user interface of FIG. 4A for an operational category of "Battery" in accordance with some embodiments discussed herein.

FIG. 4B illustrates an example of one embodiment of the graphical user interface of FIG. 4A, wherein an operational category of "Battery" has been selected in accordance with some embodiments discussed herein. Referring to FIG. 4B, GUI 301 displays information for the operational category of "Battery," which is indicated as selection by the emphasized operational category icon 310B in the operational category icon area 303. In FIG. 4B, operational category information area 401 displays nine operational sub-category information areas 410 (e.g., "Firmware Health" at 410A, "Battery State" at 410B, "Battery Charging Type" at 410C, "Battery Charging Technology" at 410D, "Average Charge" at 410E, "Discharge when Asleep" at 410F, "Discharge when Awake" at 410 G, "Level Drop" at 410H, "Voltage" at 410I). In FIG. 4B, each operational sub-category information area 410 includes an operational sub-category diagnostic indicator 440 in the form of a diagnostic message (e.g., "Good" for "Firmware Health" at 410A). In some embodiments, the diagnostic message may be a data value (e.g., "Unplugged") or may be a qualitative performance state (e.g., "Good"). Operational sub-category data visualization area 402 displays a visualization of the data value (e.g., 40%) for the operational sub-category of "Battery Level" with a chart. Operational sub-category data comparative visualization area 403 displays a comparison of the computer for the associated operational sub-category of "Average Battery Life" from the customer's computing device 100 with the average battery life of other computing devices 110 with the manufacture and model as the computing device 100 (e.g., "other Samsung Galaxy S9 users").

Similar to FIGS. 3A-3B, in some embodiments, selection of one or more of the operational sub-category information areas 410 may cause additional information and/or additional diagnostic indicators to be displayed for the selected sub-category. For example, sub-sub-categories based on the selected sub-category may be displayed. In some embodiments one or more performance prompts may be displayed in association with one or more of the sub-categories.

With continued reference to FIG. 4B, in various embodiments, the system may require a certain amount of data before a performance state can be generated. This data may be required to allow the modeling or other diagnostic systems described herein to acquire a suitable sample size to facilitate determination of a performance state. For example, for models that statistically analyze the data over a predetermined time period, the predetermined time period must pass before the system can determine if the problem has persisted for the entire time period. In such examples, the system may not indicate a problem until the predetermined time period has passed and may display a temporary diagnostic indicator 445, such as the text "Learning", to indicate that a performance state cannot yet be determined. Similarly, for embodiments in which sufficient training data has not yet been collected to generate a model for determining one or more performance states, the temporary diagnostic indicator 445 may be displayed.

Figure 4C:
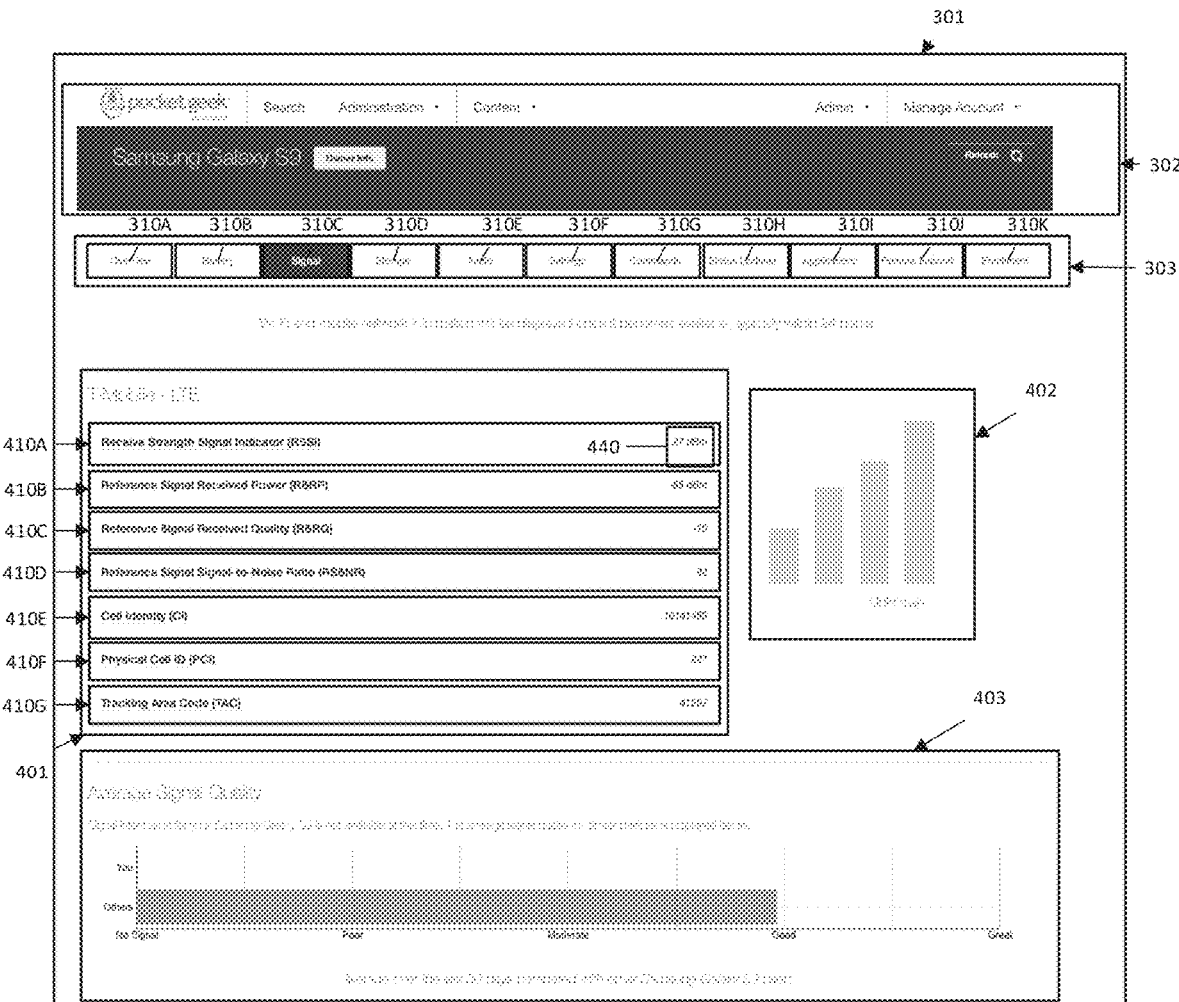
FIG. 4C illustrates an example of the graphical user interface of FIG. 4A for an operational category of "Signal" in accordance with some embodiments discussed herein.

FIG. 4C illustrates another example embodiment of the graphical user interface of FIG. 4A, wherein an operational category of "Signal" has been selected in accordance with some embodiments discussed herein. Referring to FIG. 4C, GUI 301 displays information for the operational category of "Signal," which is indicated as selection by the emphasized operational category icon 310C in the operational category icon area 303. In FIG. 4C, operational category information area 401 displays 7 operational sub-category information areas 410 (e.g., "Receive Strength Signal Indicator (RSSI)" at 410A, "Reference Signal Received Power (RSRP)" at 410B, "Reference Signal Received Quality" at 410C, "Reference Signal Signal-to-Noise Ratio (RSSNR)" at 410D, "Cell Identity (CI)" at 410E, "Physical Cell ID (PCI)" at 410F, and "Tracking Area Code" at 410 G). In FIG. 4C, each operational sub-category information area 410 includes an operational sub-category diagnostic message (e.g., "27 dBm" for "Receive Strength Signal Indicator (RSSI)" at 410A), which may include diagnostic messages indicative of quantitative data values and/or qualitative performance states. Operational sub-category data visualization area 402 does not display a visualization of the data value in an instance in which the signal cannot be found or the data is not received by the system. Operational sub-category data comparative visualization area 403 does not display a comparison of the computer for the associated operational sub-category of "Average Signal Quality" of "an average over the last 30 days" for the customer's computing device 100 with the average signal quality of other computing devices 110 with the manufacture and model as the computing device 100 (e.g., "other Samsung Galaxy S9 users"). Instead, operational sub-category data comparative visualization area 403 displays the average signal quality of other computing devices 110 with the manufacture and model as the computing device 100 while omitting information from the customer's computing device 100, which may occur when data from the customer's computing device 100 for, in this example, the last 30 days has not been received.

The customer service system 130 may provide additional information to a customer service representative for an operational category, which may include diagnostic messages to guide the customer service representative. The customer service representative may, for example, select one of the operational category icons 310 and, in response, GUI 301 may be updated to display a further embodiment of the guided customer service interface. The updated GUI 301 may provide diagnostic messages to a customer service representative that, when a data set may be missing data for an operational category or operational sub-category, guide the customer service representative by displaying messages associated with how the operational sub-category may cause a problem or issue to a customer and a suggestion of what to discuss with a customer.

Figure 5A:
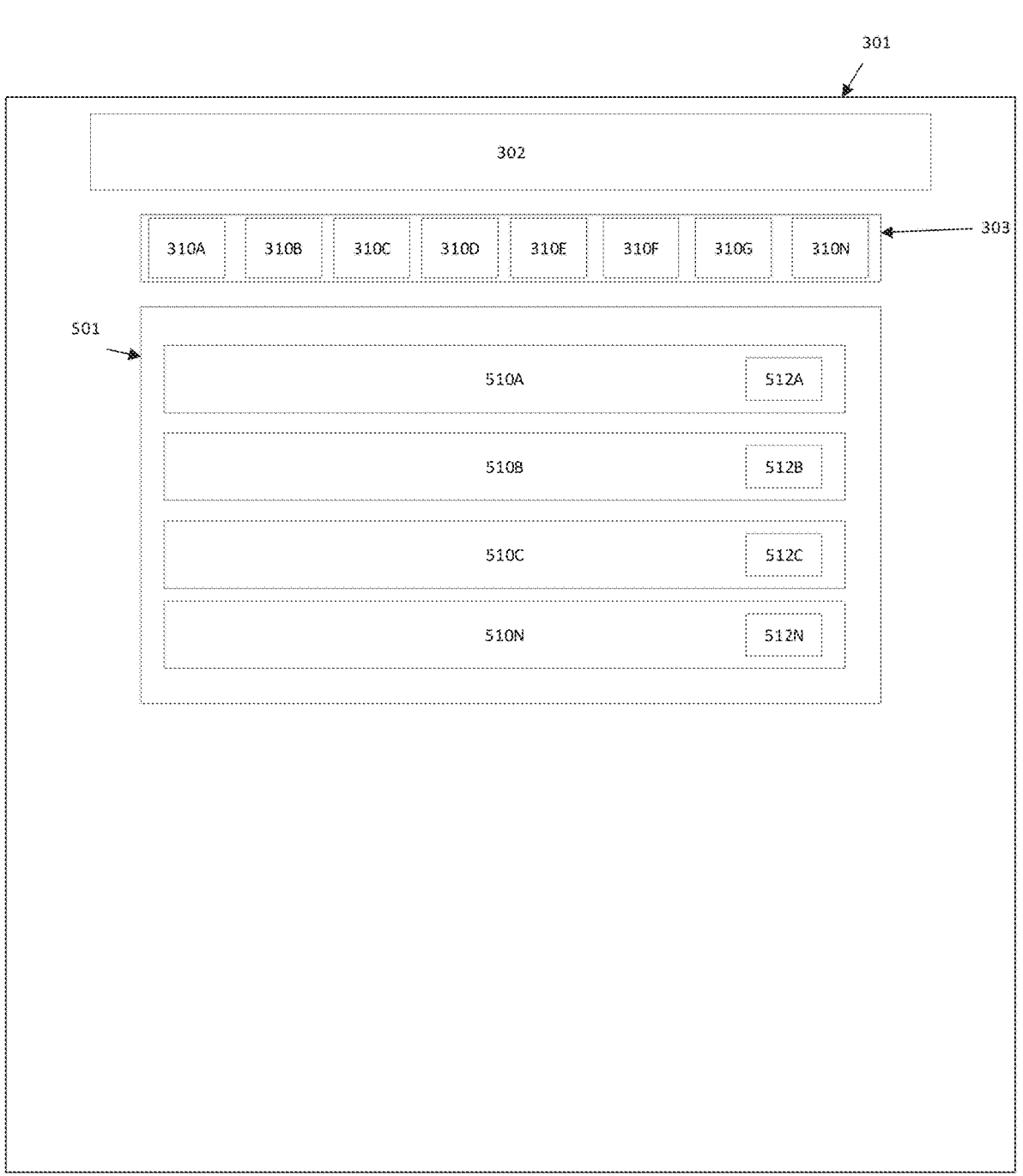
FIG. 5A illustrates an example graphical user interface in accordance with some embodiments discussed herein.

FIG. 5A illustrates an example graphical user interface in accordance with some embodiments discussed herein. Referring to FIG. 5A, GUI 301 may display account area 302, operational category icon area 303, and performance prompt area 501. Performance prompt area 501 may have one or more performance prompts 510A, 510B, 510C, . . . , 510N (collectively referred to herein as "performance prompts 510"). Each of the one or more performance prompts 510 may be associated with a different operational sub-category of data. Each performance prompt 510 may include a diagnostic message, which may include a name of the operational sub-category, a description of the operational sub-category, data values associated with the operational sub-category, a performance state of the operational sub-category, and/or a message associated with how the operational sub-category may cause a problem or issue to a customer and a suggestion of what to discuss with a customer. The performance prompts 510 may further comprise one or more feedback icons 512 (e.g., 512A, 512B, 512C, . . . , 512N) As described herein, the GUI may display a visual representation associated with the operational categories, which may include sub-categories, and which may include the operational category icons 310A, 310B, 310C, 310D, 310E, 310F, 310G, . . . , 310N; performance prompt area 501; one or more performance prompts 510A, 510B, 510C, . . . , 510N; and/or any other visual representations associated with one or more of the operational categories, including one or more sub-categories.

As used herein, the performance prompts may be visualizations of diagnostic messages that are configured to solve one or more problems associated with a performance state. The performance prompts may be stored solutions to problems which are retrieved when the customer service system engine 138 diagnoses a problem or a potential problem. In some embodiments, the performance prompt may be determined based upon the modeling and data analysis described herein by calculating a solution to the diagnosed problem and generating a performance prompt corresponding to the solution. The customer service system engine 138 may further determine a resolution value associated with each performance prompt and may display the resolution value and/or rank the performance prompts based on the likelihood of success for the performance prompt. Such ranking may create a hierarchy of performance prompts, and in some embodiments such a hierarchy may be used to determine which performance prompts may be displayed. In some embodiments, a hierarchy may be determined based upon the modeling and data analysis described herein, which may include, among other things, modeling and analysis of data collected and/or trends in data collected. The hierarchy of performance prompts may be configured to provide the most likely and most relevant information to the customer service representative in an intuitive display that may be quickly considered and referenced by drawing the customer service representative's eye to the most relevant information first (e.g., by displaying the performance prompts top-to-bottom in ranked order). Additional signals considered during the performance prompt generation may include customer computing-device specific data (e.g., what has been successful previously with the customer and/or other customers, which may include trends from the customer service system, such as a number of customers accessing the customer service system for the same issue(s), and/or third party trend data, such as trending issues in social media) and general problem resolution data (e.g., what performance prompt was successful in solving the specific mix of symptoms experienced by the customer computing device without regard to the specific computing device, which may also include trend data). Computing-device specific data may include data relevant to specific makes and models of device as well as broader categories specific to the customer computing device, such as operating system, service provider, manufacturer, processor type, or any other characteristic common to multiple devices.

The various modeling processes and algorithms discussed herein may inform the selection of the one or more performance prompts (e.g., based on a diagnosis, which may include a percent confidence in one or more possible solutions) and/or may inform the hierarchy of performance prompts to optimize the efficacy and efficiency of the customer service support session. In some embodiments in which no customer device data is available, the customer service system may generate default performance prompts based on other data sources (e.g., internal and third party provided trend information).

The performance prompts may be triggered upon selection of and/or visualization of an operational category or operational sub-category for which a performance state identifies a problem. In some embodiments, different performance prompts may be presented for an operational category than for operational sub-categories within the operational category, or the performance prompts may be ordered differently to indicate the resolution value of each performance value relative to the operational category for which it is presented. For example, if restarting a device is frequently successful for problems associated with a "signal" but not for one or more operational sub-categories within the signal operational category, a "restart device" performance prompt may be shown when visualizing a performance prompt for the signal operational category but not for the specific one or more operational sub-categories. In a similar manner, the customer service system engine 138 may determine the performance prompt and/or the resolution value relative to the operational category or sub-category for which the performance prompt may be used, such that different outputs correspond to different categories. In some embodiments, the resolution value may comprise a correlation between the performance prompt and the performance states determined for the computing device and the problems identified therein. In some embodiments, the resolution value may comprise a relevance of each performance prompt from a list of performance prompts to the performance states determined for the computing device and the problems identified therein. The aggregated device data described herein may comprise solution implementation results corresponding to a frequency of success associated with one or more solutions to problems identified in one or more performance states. The solution implementation results may be used to calculate the performance prompts and/or the resolution value.

In various embodiments, multiple performance prompts may be displayed simultaneously to facilitate correlation between the symptoms described by the customer and the data from the phone and selection of the most relevant performance prompt based on feedback from the customer.

In various embodiments, if no or limited data is detected for an operational category such that some or all performance states cannot be calculated, a default list of performance prompts may be generated for the operational category. In some embodiments, the default list may be determined based on the performance prompts having the highest likelihood of success as calculated, for example, based on solution implementation results in the aggregated data set. The customer service system engine 138 may then collect feedback on the success of one or more performance prompts for calculating further performance prompts as described below.

In some embodiments, one or more of the performance prompts may comprise a feedback icon, which may allow the customer service representative to input solution implementation results for the customer computing device and the one or more performance prompts. In some embodiments the feedback icon may allow the customer service representative to enter free text for a given performance prompt and/or problem. For example, notes may be typed when closing a performance prompt. The feedback icon may additionally or alternatively allow the customer service representative to transmit computer-readable instructions to the consumer computing device to cause resolution of the problem. In some embodiments, if the selection of the feedback icon indicates that a problem is fixed (e.g., a successful performance prompt in the solution implementation results), the interface and performance state may be updated to reflect the resolution of the problem. In some embodiments, if the selection of the feedback icon indicates that a problem is not fixed (e.g., an unsuccessful performance prompt in the solution implementation results), the system may remove the performance prompt and may display one or more additional performance prompts. In some embodiments, if the selection of the feedback icon indicates that a problem is not fixed (e.g., an unsuccessful performance prompt in the solution implementation results), the system may add the solution implementation results to the data set associated with the customer computing device and recalculate previously determined performance prompts to determine if the unsuccessful performance prompt affects the resolution value of the other performance prompts (e.g., if plugging a device in does not resolve a problem, the system may determine that a battery fault is also unlikely).

In various embodiments, the feedback icon may enable the customer service representative to input the voice of the customer or manually type the customer's feedback to input new data for determining further performance prompts. In some embodiments, the system may return all the performance prompts (e.g., relevant solutions and troubleshooting articles) determined and/or ranked by relevancy based on the diagnostic tests history on the device, similar issues on other devices with the same model/make, and/or similar issues the users are reporting on other platforms (Twitter, Facebook, etc.).

Figure 5B:
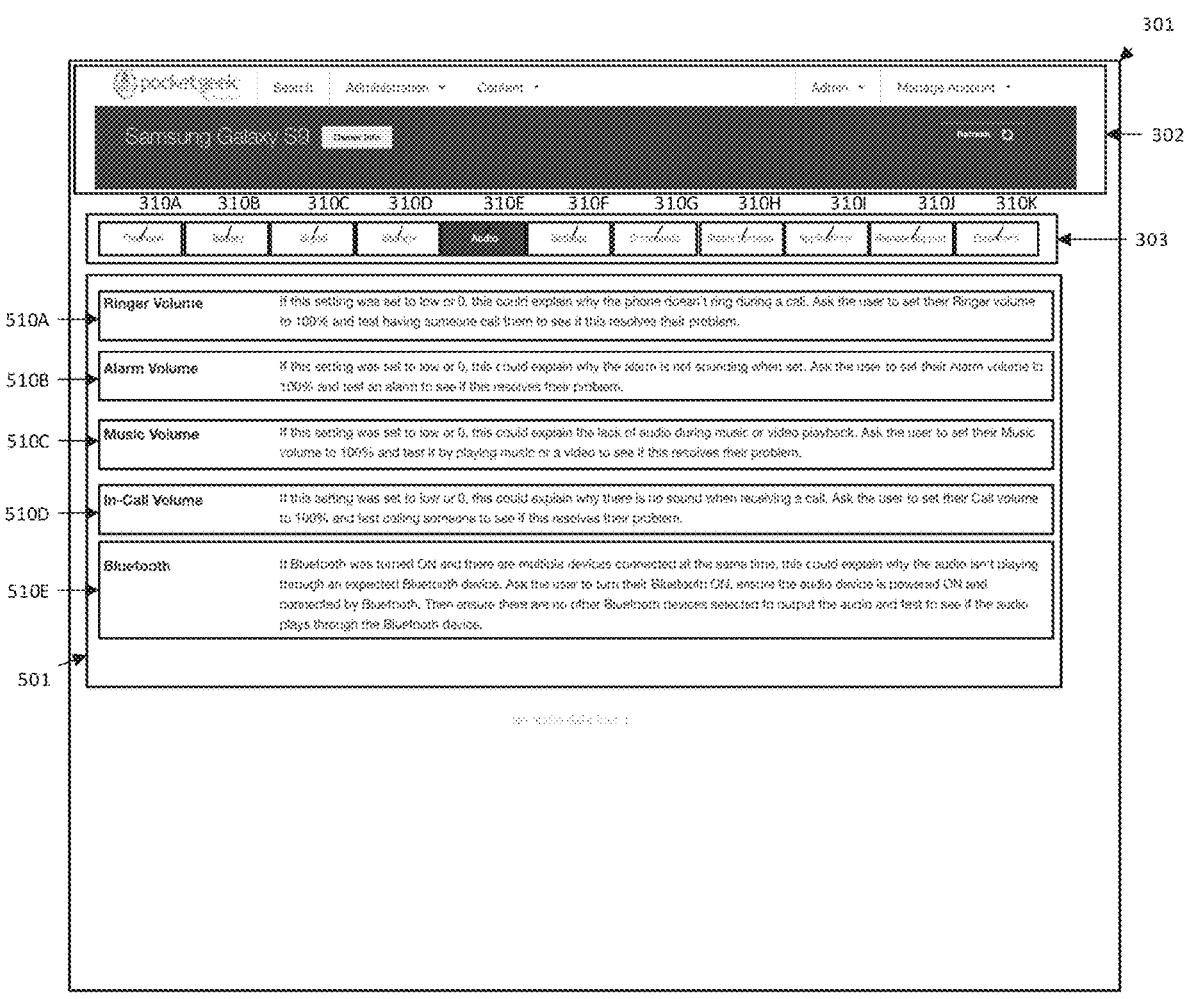
FIG. 5B illustrates an example of the graphical user interface of FIG. 5A for an operational category of "Audio" in accordance with some embodiments discussed herein.

FIG. 5B illustrates an example of the graphical user interface of FIG. 5A, wherein an operational category of "Audio" has been selected in accordance with some embodiments discussed herein. Referring to FIG. 5B, GUI 301 displays information for the operational category of "Audio," which is indicated as selection by the emphasized operational category icon 310E in the operational category icon area 303. In FIG. 5B, performance prompt area 501 displays 5 performance prompts 510 comprising diagnostic messages (e.g., a message associated with "Ringer Volume" (510A), a message associated with "Alarm Volume" (510B), a message associated with "Music Volume" (510C), a message associated with "In-Call Volume" (510D), and a message associated with "Bluetooth" (510E)). In FIG. 5B, each performance prompt 510 includes diagnostic message with a description of the operational sub-category (e.g., "Ringer Volume" (510A")) and a message associated with how the operational sub-category may cause a problem or issue to a customer and a suggestion of what to discuss with a customer (e.g., "If this setting was set to low or 0, this could explain why the phone doesn't ring during a call. Ask the user to set their Ringer volume to 100% and test having someone call them to see if this resolves their problem."). In FIG. 5B, the message associated with how the operational sub-category may cause a problem or issue to a customer and a suggestion of what to discuss with a customer at performance prompt 510A guides the customer service representative to a potential problem or issue (e.g., ringer volume set to low or 0), provides what a customer may request assistance with ("the phone doesn't ring during a call"), guides the customer service representative with how to assist the customer (e.g., "Ask the user to set their Ringer volume to 100% and test having someone call them to see if this resolves their problem."). In the depicted embodiment, a data set from the customer computing device may be missing or deficient in one or more ways, such that a default set of performance prompts is displayed without further performance state information. The GUI may be updated as data is received from the computing device or via the customer service representative and added to the data set for determining the performance state, and the system may update the performance prompts and other diagnostic indicators to reflect the evolving performance states.

The customer service system 130 may provide additional information to a customer service representative for an operational category, which may include displaying performance states for operational sub-categories of data and historical data values for an operational sub-category. The customer service representative may, for example, select one of the operational category icons 310 and, in response, GUI 301 may be updated to display a further embodiment of the guided customer service interface. The updated GUI 301 may display performance states for operational sub-categories of data and historical data values for an operational sub-category.

Figure 6A:
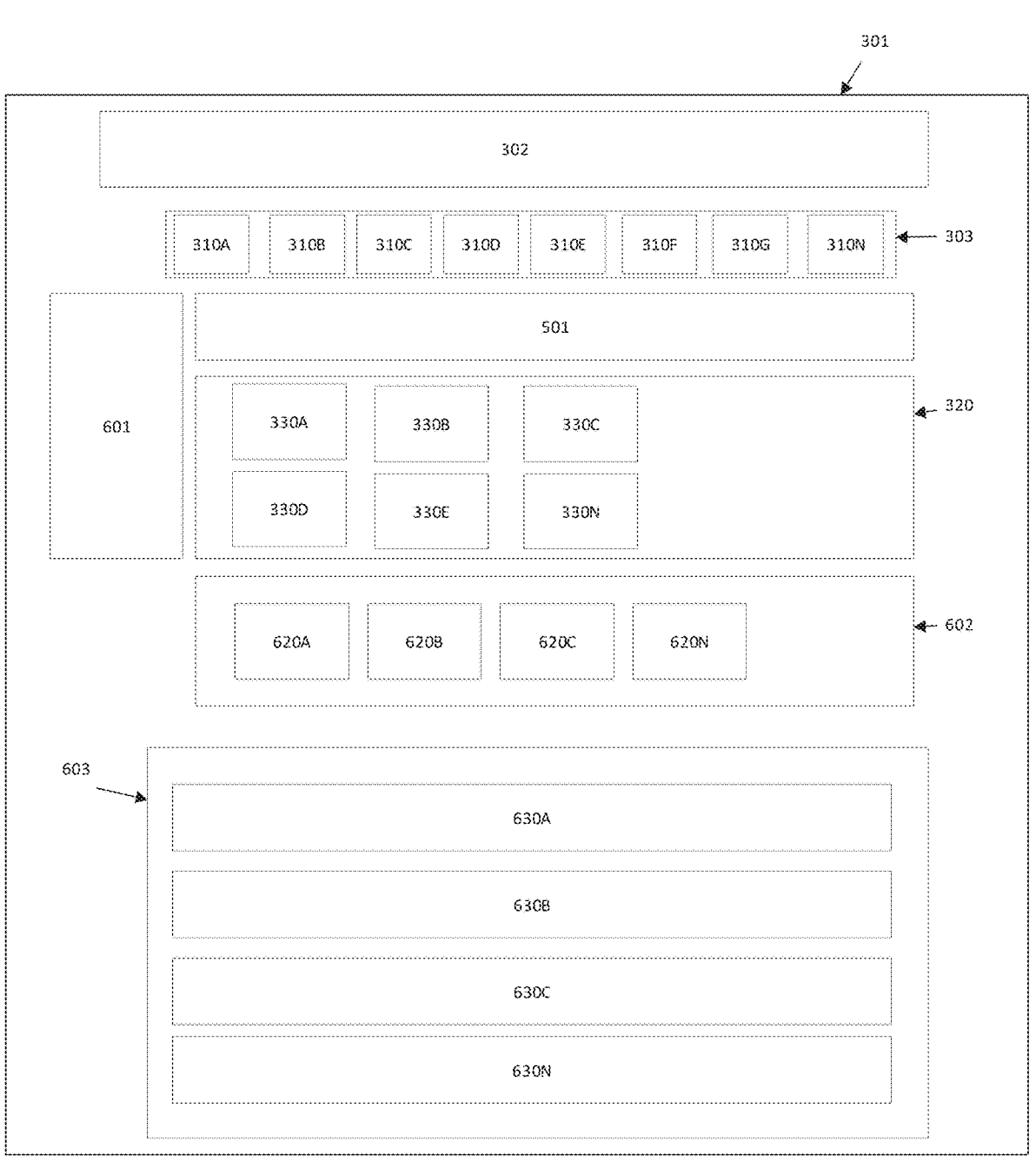
FIG. 6A illustrates an example graphical user interface in accordance with some embodiments discussed herein.

FIG. 6A illustrates an example graphical user interface in accordance with some embodiments discussed herein. Referring to FIG. 6A, GUI 301 may display account area 302, operational category icon area 303, operational category information area 320, operational sub-category information areas 330, performance prompt area 501, computing device information area 601, operational sub-category usage information area 602, and/or operational sub-category history area 603. A display account area 302, operational category icon area 303, operational category information area 320, operational sub-category information areas 330, and performance prompt area 501 are described above. Computing device information area 601 may include data associated with the customer's computing device, such as, for example, manufacturer, model, phone number, customer name, customer email, carrier, storage capacity, color, operating system, and/or unique identifier (e.g., International Mobile Equipment Identity (a.k.a., IMEI)). Operational sub-category usage information area 602 may display one or more representation of what portion of the software and/or hardware of the computing device is using and/or affecting an operational category 610A, 610B, 610C, . . . , 610N (collectively referred to herein as "operational category users 610"). Additionally, or alternatively, the operational category users 610 may be for operational sub-categories. Operational sub-category history area 603 may display time stamps (e.g., dates and times) and details associated with historical data values 630A, 630B, 630C, . . . , 630N (collectively referred to herein as "historical data 630"). As described herein, the GUI may display a visual representation associated with the operational categories, which may include sub-categories, and which may include the operational category icons 310A, 310B, 310C, 310D, 310E, 310F, 310G, . . . , 310N; operational category icon area 303; operational category information area 320; operational sub-category information areas 330; performance prompt area 501; computing device information area 601; operational sub-category usage information area 602; operational sub-category history area 603; display account area 302, and/or any other visual representations associated with one or more of the operational categories, including one or more sub-categories.

Figure 6B:
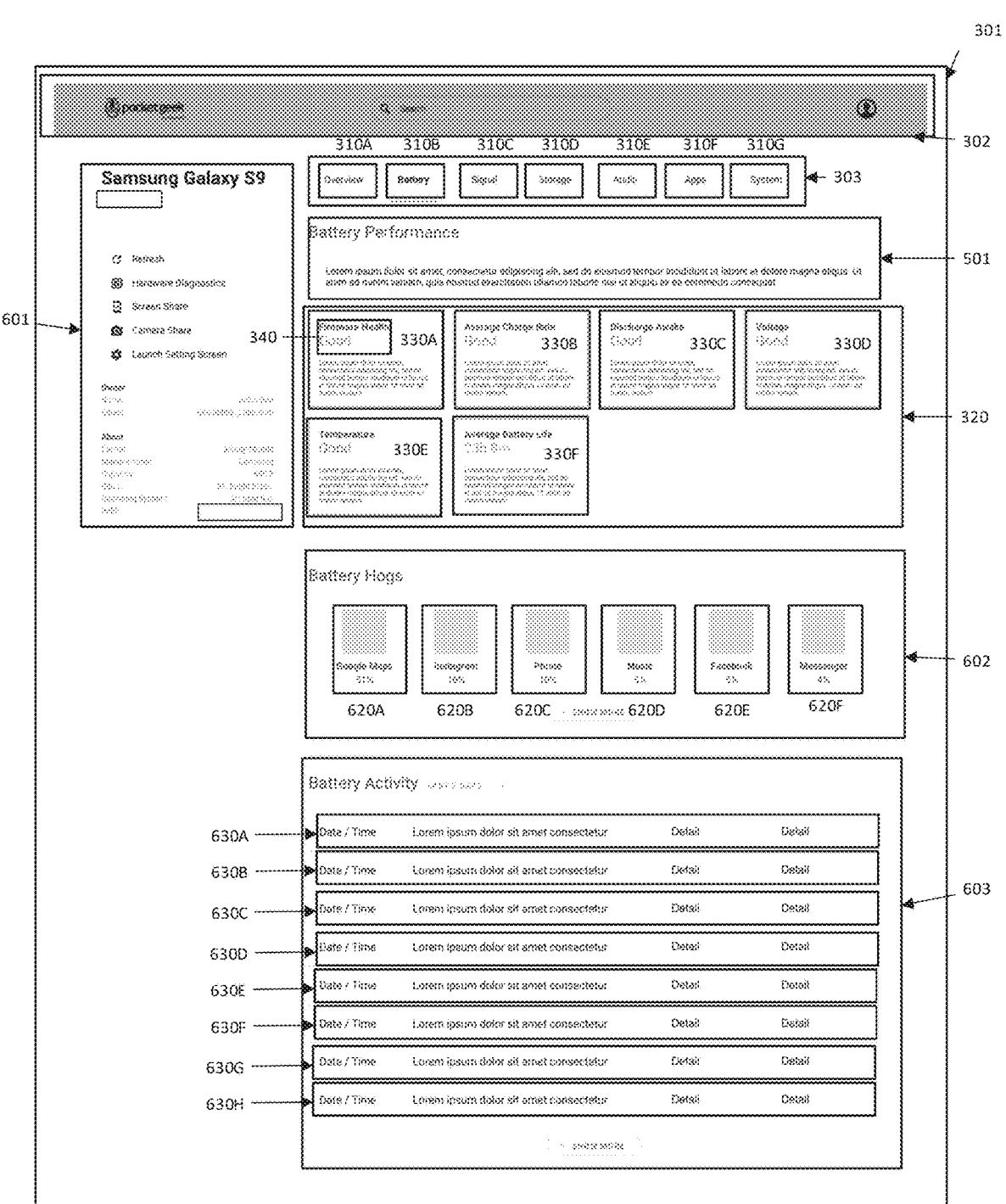
FIG. 6B illustrates an example of the graphical user interface of FIG. 6A for an operational category of "Battery" in accordance with some embodiments discussed herein.

FIG. 6B illustrates an example embodiment of the graphical user interface of FIG. 6A, wherein an operational category of "Battery" has been selected in accordance with some embodiments discussed herein. Referring to FIG. 6B, GUI 301 displays information for the operational category of "Battery," which is indicated as selection by the emphasized operational category icon 310B in the operational category icon area 303. Computing device information area 601 displays data associated with the customer's computing device (e.g., manufacturer of Samsung, model of Galaxy S9, customer phone number, customer name of John Doe, customer email of Example@gmail.com, carrier of Xfinity Mobile, storage capacity of 64 GB, color of Midnight Black, operating system of Android 9.0, and IMEI). Operational sub-category usage information area 602 displays six operational category users 610 for the operational sub-category of "Battery Hogs," which represent mobile device applications that are using the largest amount of the battery as well as the percentage of usage (e.g., "Google Maps" at 51% at 620A). Operational sub-category history area 603 may display eight historical data entries 630 at 630A-630H for the last 7 days. Template text is used in the example embodiment, and one of ordinary skill in the art will appreciate, in light of the present disclosure, that diagnostic indicators, such as diagnostic messages, may be used according to any of the embodiments described herein.

The customer service system 130 may provide additional information to a customer service representative for a timeline and the alerts that have occurred during that time. The customer service representative may, for example, select one of the operational category icons 310 and, in response, GUI 301 may be updated to display a further embodiment of the guided customer service interface. The updated GUI 301 may display a timeline and the alerts that have occurred during that time.

Figure 7A:
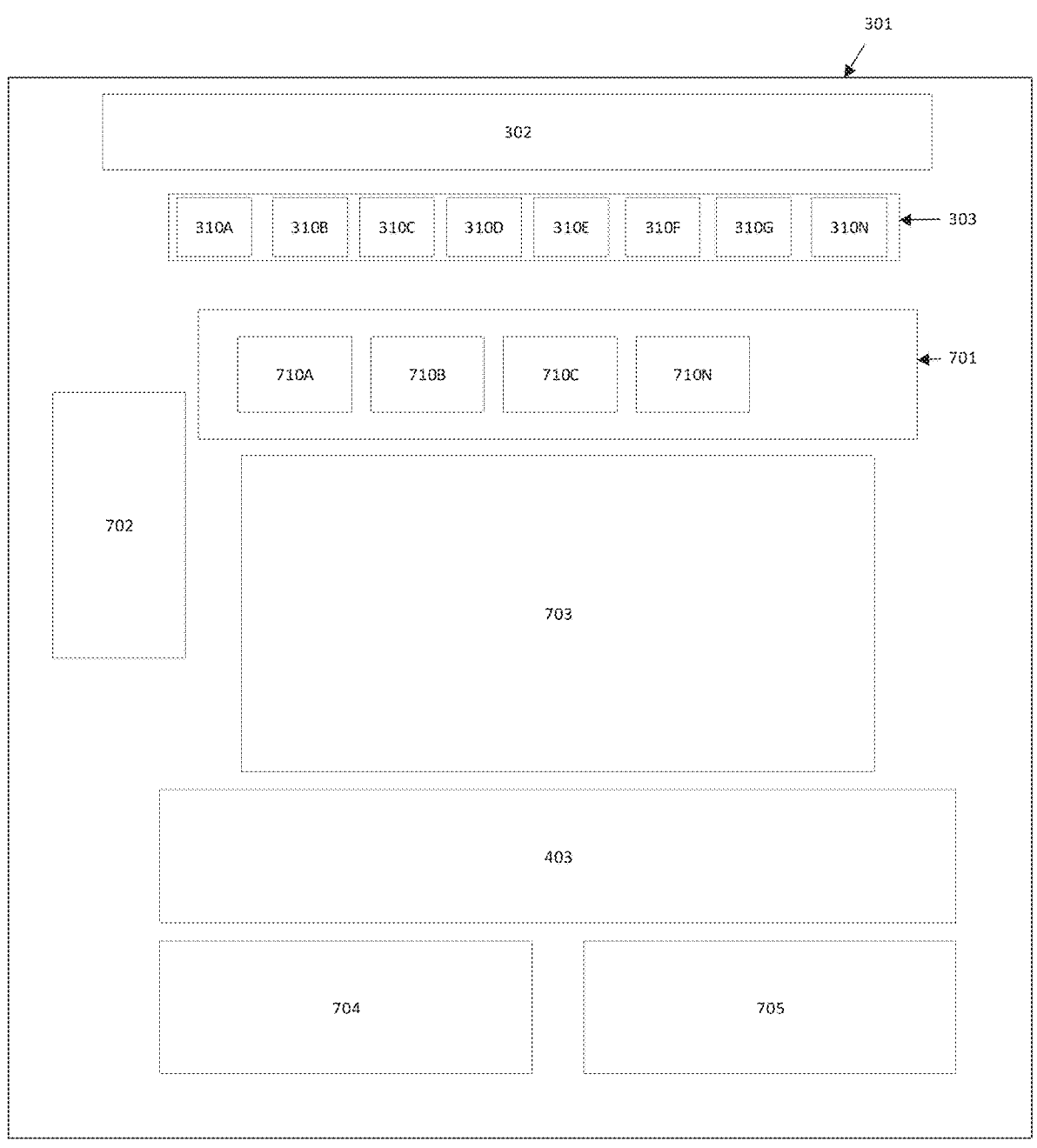
FIG. 7A illustrates an example graphical user interface in accordance with some embodiments discussed herein.

FIG. 7A illustrates an example graphical user interface in accordance with some embodiments discussed herein. Referring to FIG. 7A, GUI 301 may display account area 302, operational category icon area 303, an operational sub-category data comparative visualization area 403, a timeline area 701, a diagnostic indicator summary area 702, a diagnostic indictor timeline area 703, an operational sub-category data area 704, and an operational sub-category data area 705. A display account area 302, operational category icon area 303, an operational sub-category data comparative visualization area 403 are described above. Timeline area 701 may display one or more representations of a time period (e.g., an hour, a day, a week, a month, or a year) 710A, 710B, 710C, . . . , 710N (collectively referred to herein as "timeline representations 710"). The timeline representations 701 may be icons that a customer service representative may select to update the GUI 301 to display information associated with the selected time period (e.g., filter data to within a particular day). Diagnostic indicator summary area 702 may display a summary of diagnostic indicators associated with an operational category of data, which may be for a selected time period (e.g., a day) or for all time periods displayed in the timeline area 701. Diagnostic indictor timeline area 703 may display a diagnostic indicators and diagnostic messages associated with an operational sub-category of data, which may be for a selected time period (e.g., a day) or for all time periods displayed in the timeline area 701. Operational sub-category data area 704 may display the operational sub-category data for the computing device 100 used in operational sub-category data comparative visualization area 403. Operational sub-category data area 705 may display the same data as operational sub-category data area 704 but for either another computing device 110 or a data value for an aggregated data set. As described herein, the GUI may display a visual representation associated with the operational categories, which may include sub-categories, and which may include the operational category icons 310A, 310B, 310C, 310D, 310E, 310F, 310G, . . . , 310N; account area 302; operational category icon area 303; an operational sub-category data comparative visualization area 403; a timeline area 701; a diagnostic indicator summary area 702; a diagnostic indictor timeline area 703; an operational sub-category data area 704; an operational sub-category data area 705; and/or any other visual representations associated with one or more of the operational categories, including one or more sub-categories.

Figure 7B:
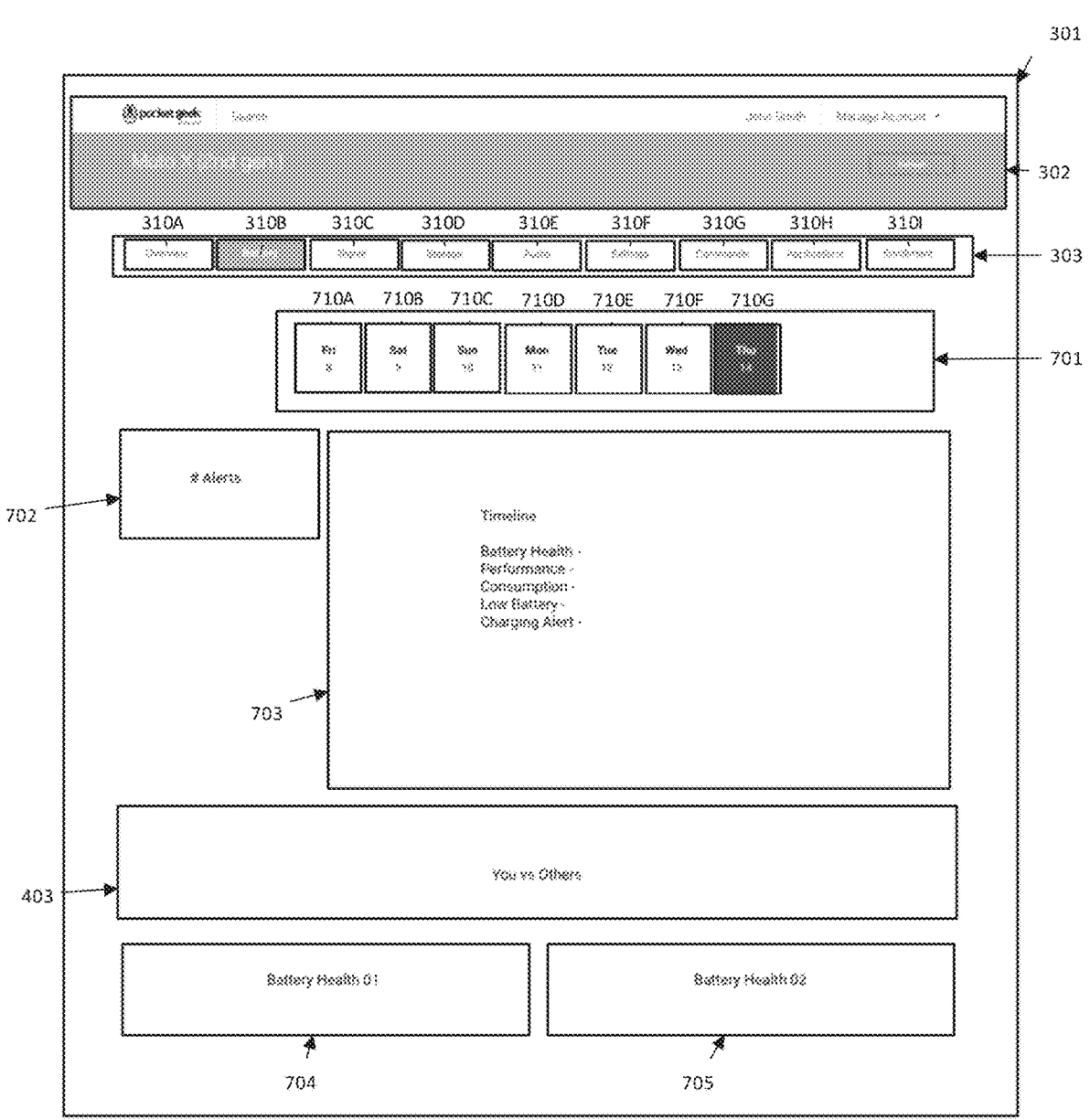
FIG. 7B illustrates an example of the graphical user interface of FIG. 7A for an operational category of "Battery" in accordance with some embodiments discussed herein.

FIG. 7B illustrates an example embodiment of the graphical user interface of FIG. 7A, wherein an operational category of "Battery" has been selected in accordance with some embodiments discussed herein. Referring to FIG. 7B, GUI 301 may display account area 302, operational category icon area 303, an operational sub-category data comparative visualization area 403, a timeline area 701, a diagnostic indicator summary area 702, a diagnostic indictor timeline area 703, an operational sub-category data area 704, and an operational sub-category data area 705. Timeline area 701 displays representations of a 7 days (e.g., Friday the $8^{th}$ (710A), Saturday the $9^{th}$ (710B), Sunday the $10^{th}$ (710C), Monday the $11^{th}$ (710D), Tuesday the $12^{th}$ (710E), Wednesday the $13^{th}$ (710F), and Thursday the $14^{th}$ (710F)). The timeline representations 701 displayed are icons, and the icon for Thursday the $14^{th}$ (710G) is emphasized to indicate it was selected. Diagnostic indicator summary area 702 displays the number of alerts associated Thursday the $14^{th}$ (710G). Diagnostic indictor timeline area 703 displays a timeline for Thursday the $14^{th}$ (710G) for the operational sub-categories of battery health, performance, consumption, low battery, and charging alert. Operational sub-category data area 704 displays the operational sub-category of battery health associated with customer device 100, and operational sub-category data area 705 displays the operational sub-category of battery health associated with another computing device 110.

A customer service system 130 may provide additional information to a customer service representative for details of a timeline for one or more operational sub-categories of data for a timeline. A customer service representative may, for example, select one of the operational category icons 310 and, in response, GUI 301 may be updated to display a further embodiment of the guided customer service interface. An updated GUI 301 may display details of a timeline for one or more operational sub-categories of data for a timeline.

Figure 8A:
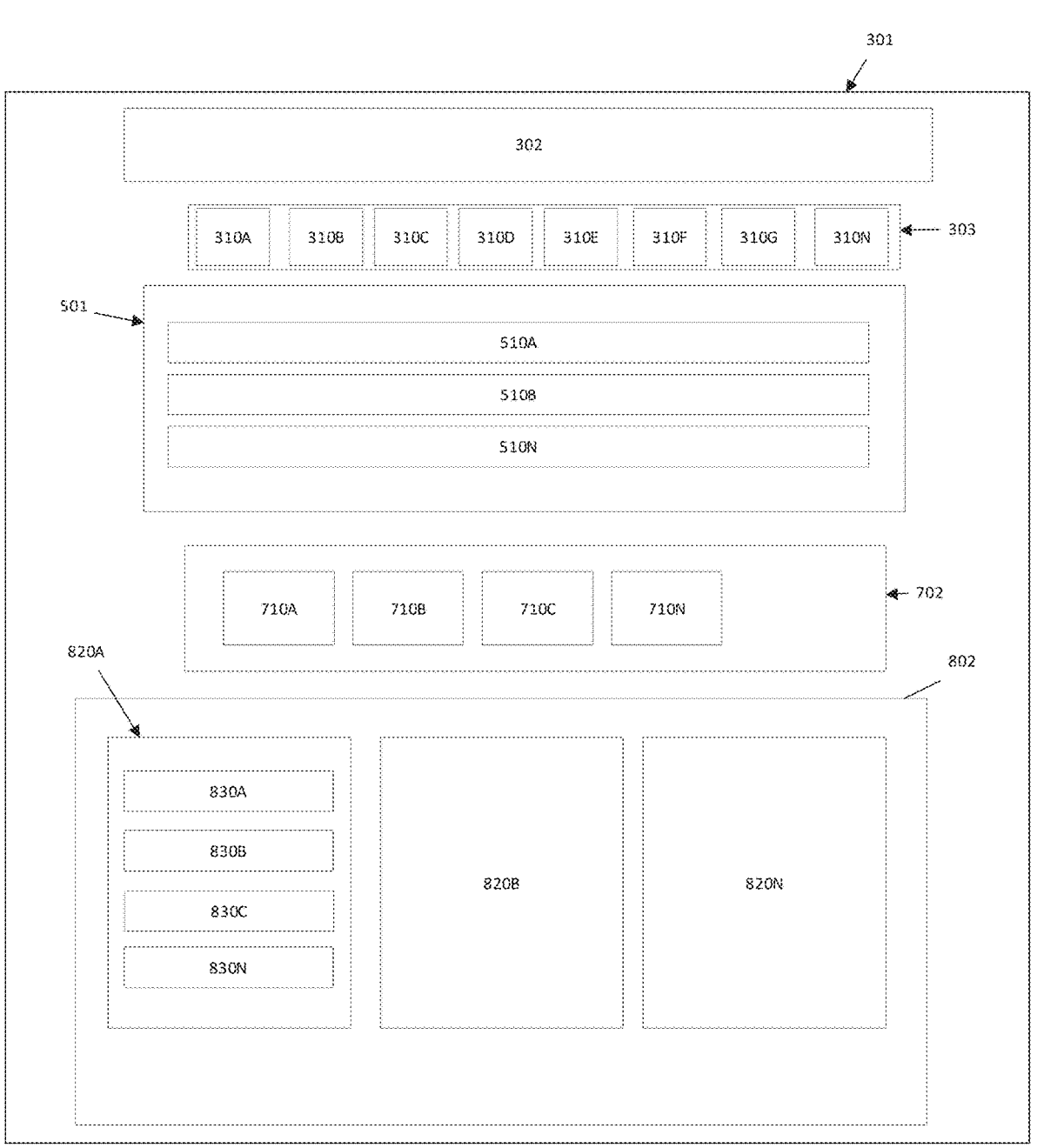
FIG. 8A illustrates an example graphical user interface in accordance with some embodiments discussed herein.

FIG. 8A illustrates an example graphical user interface in accordance with some embodiments discussed herein. Referring to FIG. 8A, GUI 301 may display account area 302, operational category icon area 303, performance prompt area 501, a timeline area 701, and/or an operational category timeline area 802. Operational category timeline area 802 may display one or more operational sub-category timeline area 820A, 820B, . . . , 820N (collectively "operational sub-category timeline areas 820"). Operational sub-category timeline area 802 may display times and historical data values 830A, 830B, 830C, . . . 830N (collectively "operational sub-category times and values 830") for a selected timeline representation 710. As described herein, the GUI may display a visual representation associated with the operational categories, which may include sub-categories, and which may include the operational category icons 310A, 310B, 310C, 310D, 310E, 310F, 310G, . . . , 310N; account area 302; operational category icon area 303; performance prompt area 501; a timeline area 701; an operational category timeline area 802; and/or any other visual representations associated with one or more of the operational categories, including one or more sub-categories.

Figure 8B:
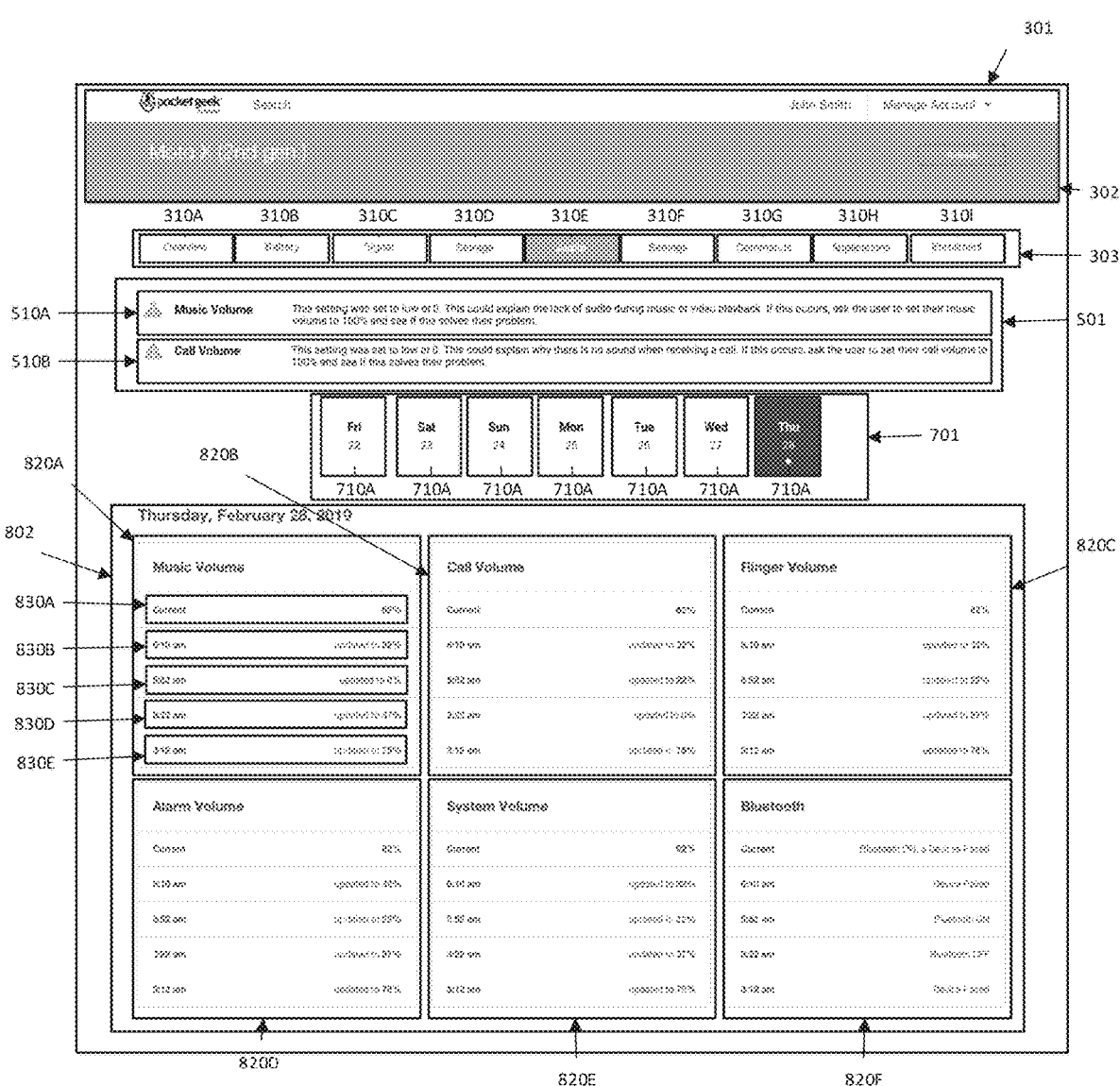
FIG. 8B illustrates an example of the graphical user interface of FIG. 8A for an operational category of "Audio" in accordance with some embodiments discussed herein.

FIG. 8B illustrates an example of the graphical user interface of FIG. 8A, wherein an operational category of "Audio" has been selected in accordance with some embodiments discussed herein. Referring to FIG. 8B, GUI 301 may display account area 302, operational category icon area 303, performance prompt area 501, a timeline area 701, and/or an operational category timeline area 802. In FIG. 8B, timeline area 701 displays representations of a 7 days (e.g., Friday the $22^{nd}$ (710A), Saturday the $23^{rd}$ (710B), Sunday the $24^{th}$ (710C), Monday the $25^{th}$ (710D), Tuesday the $26^{th}$ (710E), Wednesday the $27^{th}$ (710F), and Thursday the $28^{th}$ (710F)). The timeline representations 701 displayed are icons, and the icon for Thursday the $28^{th}$ (710G) is emphasized to indicate it was selected. Operational category timeline area 802 displays the operational category for "Audio" and six operational sub-category timeline areas 820 (e.g., Music Volume at 820A, Call Volume at 820B, Ringer Volume at 820C, Alarm Volume at 820D, System Volume at 820E, and Bluetooth at 820E). Further, in FIG. 8B, each operational sub-category timeline area 820 displays operational sub-category times and values 830. For example, the operational sub-category timeline area 820A for Music Volume displays five operational sub-category times and values 830: time of current and value of 62% (830A); time of 6:10 am and value of 31% (830B); time of 5:52 am and value of 0% (830C); time of 3:22 am and value of 37% (830D); and time of 3:12 am and value of 75% (830E). Further, the operational sub-category times and values 830 are emphasized for times and values that may be associated with a problem identified in the performance state and performance prompts 510A, 510B in performance prompt area 501. For example, both performance prompt 510A and time and value 830A are associated with the operational sub-category of Music Volume in FIG. 8B and each addresses when the Music Volume was set to 0.

In accordance with embodiments discussed here, diagnostic indicators may guide a customer service representative to the problems or issues with a customer's computing device. FIGS. 9-18 depict example flow diagrams of some, but not all, embodiments of the systems and methods described herein.

FIG. 9 illustrates a flow diagram 900 of an example system in accordance with some embodiments discussed herein. Referring to FIG. 9, at step 910, a customer service system may receive a first data set with data values for a plurality of operational categories. As described herein, a first data set with data values for a plurality of operational categories may include data values for a plurality of operational sub-categories. At step 920, a customer service system may determine performance states for a plurality of the operational categories and a diagnostic indicator for the performance states. At step 930, a customer service system may display a graphical user interface with visual representations associated with a plurality of the operational categories with diagnostic indicators. A customer service representative may be guided as to the problems or issues with a customer's computing device by the display of the diagnostic indicators.

In accordance with various embodiments, a customer service system may determine performance states with a comparison of a data set received from a customer's computing device 100 and an aggregated data set received, such as for a plurality of computing devices 110. FIG. 10 illustrates a flow diagram 1000 of an example system in accordance with some embodiments discussed herein. Referring to FIG. 10, at step 1010, a customer service system may receive a first data set with data values associated with a plurality of operational categories. At step 1020, a customer service system may receive an aggregated data set with data values for a plurality of operational categories. As described herein, both a first data and an aggregated data set with data values for a plurality of operational categories may include data values for a plurality of operational sub-categories. At step 1030, a customer service system may determine performance states for a plurality of the operational categories and a diagnostic indicator for the performance states based a comparison of the first data set and the aggregated data set. At step 1040, a customer service system may display a graphical user interface with visual representations of a plurality of the operational categories with diagnostic indicators. A customer service representative may be guided as to the problems or issues with a customer's computing device by the display of the diagnostic indicators.

In accordance with a further embodiment, a customer service system may determine performance states based on threshold or range for a comparison of a data set received from a customer's computing device 100 and an aggregated data set received, such as for a plurality of computing devices 110. FIG. 11 illustrates a flow diagram 1100 of an example system in accordance with some embodiments discussed herein. Referring to FIG. 11, at step 1110, a customer service system may receive a first data set with data values associated with a plurality of operational categories. At step 1120, a customer service system may receive an aggregated data set with data values associated with a plurality of operational categories. As described herein, both a first data and an aggregated data set with data values for a plurality of operational categories may include data values for a plurality of operational sub-categories. At step 1130, a customer service system may identify a threshold or range (e.g., via calculation, predetermined value, etc.) based on the aggregated data set. Determination of a threshold is described further herein. At step 1140, a customer service system may determine performance states for a plurality of the operational categories and a diagnostic indicator for the performance states based a comparison of the first data set and the aggregated data set. At step 1150, a customer service system may display a graphical user interface with visual representations of a plurality of the operational categories with diagnostic indicators. A customer service representative may be guided as to the problems or issues with a customer's computing device by the display of the diagnostic indicators.

In accordance with a further embodiment, a customer service system may determine performance states based on threshold or range for a comparison of a data set received from a customer's computing device 100 and an aggregated data set that the customer service system aggregated from data sets associated with a plurality, such as for a plurality of computing devices 110. FIG. 12 illustrates a flow diagram 1200 of an example system in accordance with some embodiments discussed herein. Referring to FIG. 12, at step 1210, a customer service system may receive a first data set with data values associated with a plurality of operational categories. At step 1220, a customer service system may receive a second data set associated with a plurality of second mobile computing devices with data values associated with a plurality of operational categories. At step 1230, a customer service system may aggregate the second data set to produce an aggregated data set. As described herein, both a first data and an aggregated data set with data values for a plurality of operational categories may include data values for a plurality of operational sub-categories. At step 1240, a customer service system may identify a threshold or range based on the aggregated data set. The determination of a threshold is described further herein. At step 1250, a customer service system may determine performance states for a plurality of the operational categories and a diagnostic indicator for the performance states based a comparison of the first data set and the aggregated data set. At step 1260, a customer service system may display a graphical user interface with visual representations of a plurality of the operational categories with diagnostic indicators. A customer service representative may be guided as to the problems or issues with a customer's computing device by the display of the diagnostic indicators.

In accordance with a further embodiment, a customer service system may determine performance states based a model for a comparison of a data set received from a customer's computing device 100 and an aggregated data set received, such as for a plurality of computing devices 110. FIG. 13 illustrates a flow diagram 1300 of an example system in accordance with some embodiments discussed herein. Referring to FIG. 13, at step 1310, a customer service system may receive a first data set with data values associated with a plurality of operational categories. At step 1320, a customer service system may receive an aggregated data set with data values associated with a plurality of operational categories. As described herein, both a first data and an aggregated data set with data values for a plurality of operational categories may include data values for a plurality of operational sub-categories. At step 1330, a customer service system may train a model based on the aggregated data set. The training of a model using machine learning or AI is described herein. At step 1340, a customer service system may determine performance states for a plurality of the operational categories and a diagnostic indicator for the performance states based on the model. For example, thresholds or ranges may be determined based on the model. At step 1350, a customer service system may display a graphical user interface with visual representations of a plurality of the operational categories with diagnostic indicators. A customer service representative may be guided as to the problems or issues with a customer's computing device by the display of the diagnostic indicators.

In accordance with embodiments discussed here, diagnostic indicators may guide a customer service representative to the problems or issues with a customer's computing device and GUI 301 may display data for operational categories of data and data for operational sub-categories of data associated with the operational categories. FIG. 14 illustrates a flow diagram 1400 of an example system in accordance with some embodiments discussed herein. Referring to FIG. 14, at step 1410, a customer service system may receive a first data set with data values for a plurality of operational categories. As described herein, the first data with data values for a plurality of operational categories may include data values for a plurality of operational sub-categories. At step 1420, a customer service system may determine performance states for a plurality of the operational categories and a diagnostic indicator for the performance states. At step 1430, a customer service system may display a graphical user interface with visual representations of a plurality of the operational categories with diagnostic indicators and, for a first operational category, visual representations of an operational sub-categories with diagnostic indicators. A customer service representative may be guided as to the problems or issues with a customer's computing device by the display of the diagnostic indicators.

Figure 15:
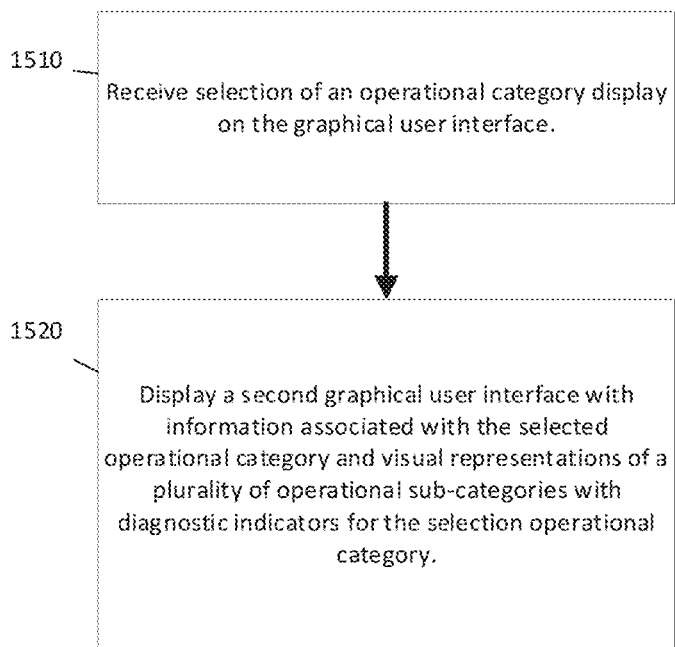
FIG. 15 illustrates a flow diagram of an example system in accordance with some embodiments discussed herein.

In accordance with embodiments discussed here, a customer service representative may, for example, select an operational category on a GUI 301 and the customer service system 130 may receive the selection and update the GUI 301 to display operational sub-category data associated with the operational category selected. FIG. 15 illustrates a flow diagram 1500 of an example system in accordance with some embodiments discussed herein. Referring to FIG. 15, at step 1510, a customer service system may receive selection of an operational category display on the graphical user interface. At step 1520, a customer service system may display a second graphical user interface with information associated with the selected operational category and visual representations of a plurality of operational sub-categories with diagnostic indicators for the selection operational category. A customer service representative that may have been guided as to the problems or issues with a customer's computing device by the display one the GUI 301 may be further guided by the display of operational sub-category data on the updated GUI 301, such as diagnostic indicators for one or more of the operational sub-categories of data.

In accordance with embodiments discussed herein, a customer service system may display performance prompts with diagnostic messages to a customer service representative to guide the customer service representative in talking to a customer, the customer service representative may provide feedback to the system as to the successfulness of the guidance of the diagnostic message, and if the feedback is that the customer's problem or issue is not resolved, a customer service system may update to display additional diagnostic messages. The diagnostic messages may be displayed to a customer service representative with a performance prompt that guides the customer service representative by prompting the customer service representative with the diagnostic message, associated data values for either an operational category of data or an operational sub-category of data, and/or a feedback icon for the customer service representative to provide feedback as to the successful resolution of the customer's problem or issue. A feedback icon may be comprised of one or more dynamic icons, such as a first icon representing a selection that the problem or issue was resolved and a second icon representing a selection that the problem or issue was not resolved. FIG. 16 illustrates a flow diagram 1600 of an example system in accordance with some embodiments discussed herein. Referring to FIG. 16, at step 1610, a customer service system may determine one or more diagnostic messages associated with a performance state. At step 1620, a customer service system may display one or more performance prompts having the diagnostic message(s) and feedback icon(s). At step 1630, a customer service system may receive a selection from the feedback icon(s). The feedback icons may provide the customer service system 130 with feedback from the customer service representative if the diagnostic message may have been successful in resolving a customer's problem or issue. At step 1640, if the received selection from the feedback icon is a successful resolution of the customer's problem or issue, the customer system service may proceed to step 1670, otherwise the customer service system may proceed to step 1650. At step 1650, a customer service system may determine one or more additional diagnostic messages based on the selection from the feedback icon. At step 1660, a customer service system may update the display to display one or more additional performance prompts having the additional diagnostic message(s) and feedback icon(s). At step 1670, a customer service system may update to display to remove diagnostic indicators associated with the successful resolution. In a further example, if the feedback from the customer service representative is always that the customer's problem of issue has not been resolved, a customer service system may determine performance prompts with diagnostic messages that are generic to the customer's device and not specific to an operational category or operational sub-category.

Figure 17:
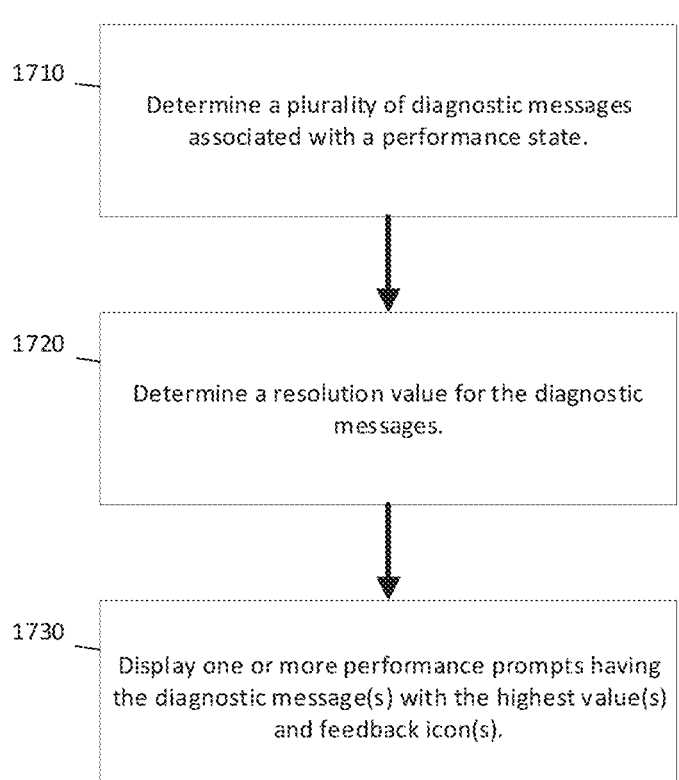
FIG. 17 illustrates a flow diagram of an example system in accordance with some embodiments discussed herein.

In accordance with embodiments discussed herein, the diagnostic messages determined by the customer service system 130 may be associated with a resolution value. A resolution value may be determined by the customer service system 130, and the resolution value may be an estimate (e.g., a percentage) that the guidance in the diagnostic message displayed in a performance prompt will resolve the customer's problems or issues. Further, a customer service system 130 may display the diagnostic messages to the customer service representative in an order, such as the highest resolution value (e.g., the most likely guidance to resolve a customer's problem or issue) to the lowest resolution value (e.g., the least likely guidance to resolve a customer's problem or issue). Additionally, or alternative, a customer service system 130 may only display diagnostic messages that have a resolution above a threshold. The determination of the resolution value may be determined by statistical analysis, machine learning, or AI, which are described herein, based on a data set from the customer's computing device or aggregated data of customer devices 110. FIG. 17 illustrates a flow diagram 1700 of an example system in accordance with some embodiments discussed herein. Referring to FIG. 17, at step 1710, a customer service system may determine a plurality of diagnostic messages associated with a performance state. At step 1720, a customer service system may determine a resolution value for the diagnostic messages. At step 1730, a customer service system may display one or more performance prompts having the diagnostic message(s) with the highest value(s) and feedback icon(s).

In accordance with embodiments discussed herein, a customer service system 130 may establish connection with a customer and/or a customer's computing device 100 to allow the customer service representative to transmit instructions to the customer and/or customer's computing device 100 to resolve the customer's problem or issue based on guidance from the customer service system. For example, a customer service system may establish a transmission connection with the customer's computing device 100 and receive a portion of a data set for the computing device 100 or an update of a data set for the computing device 100. The transmission connection may be, for example, a connection over network 120 that may allow for the transmission of data. Further, a receipt of the portion or update of a data set for the computing device 100 may be triggered by the customer service system requesting the data over the transmission connection. A customer service system 130 may determine one or more diagnostic messages associated with the data set, such as for the portion of the data set recently received or for the data set associated with computing device 100, which may include the portion of the data set recently received. Further, a customer service system may establish a communication connection with the customer which may allow the customer representative and customer to communicate with each other, such as, for example, a phone call, video chat, and/or screen sharing. Further, via a communication connection, the customer service representative may provide or show the customer how to address or resolve a problem or issue. To guide the customer service representative in a communication with the customer, a customer service system 130 may display one or more performance prompts, which may comprise diagnostic messages. Further, a customer service system may transmit instructions, such as via the transmission connection, to the customer's computing device 100 to provide instructions on the computing device 100, such as, for example, setting changes, software updates, and/or firmware updates. In response to providing instructions, a customer service system 130 may receive a responsive update for a first data set, which may be referred as a responsive portion of the first data set.

FIG. 18 illustrates a flow diagram 1800 of an example system in accordance with some embodiments discussed herein. Referring to FIG. 18, at step 1810, a customer service system may establish a transmission connection. At step 1820, a customer service system a customer service system may receive a trigger, which triggers the transmission of a portion of the first data set. At step 1830, a customer service system a customer service system may receive the portion of the first data set. At step 1840, a customer service system a customer service system may determine one or more diagnostic messages associated with a performance state. At step 1850, a customer service system a customer service system may customer service system may establish a communication connection. At step 1860, a customer service system a customer service system may display performance prompt(s). At step 1870, a customer service system a customer service system may transmit a first instruction set associated with the diagnostic message(s). At step 1880, a customer service system a customer service system may receive a responsive portion of the first data set. A customer service representative that may have been guided as to the problems or issues with a customer's computing device by the customer service system 130 display one the performance prompts.

Figure 19A:
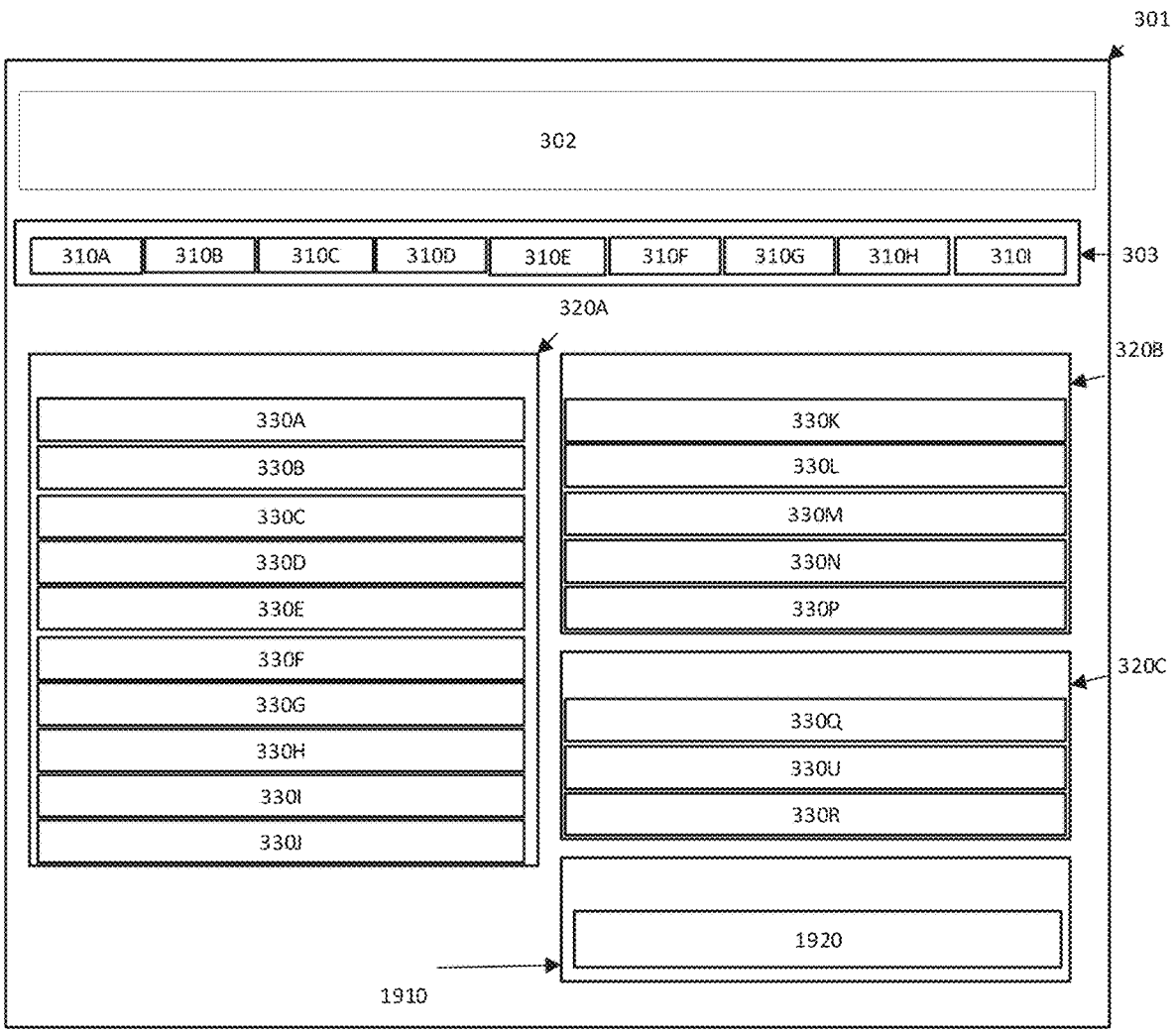
FIG. 19A illustrates an example graphical user interface in accordance with some embodiments discussed herein.

FIG. 19A illustrates an example graphical user interface in accordance with some embodiments discussed herein. Referring to FIG. 19A, GUI 301 may display account area 302, operational category icon area 303, operational category icons 310A-310I, and one or more operational category information areas 320A, 320B, 320C, . . . , 320N, which may further include an operational sub-category information area 330A, 330B, 330C, . . . , 330N. The operational category and sub-category information areas may comprise visualizations of one or more settings of the computing device. In some embodiments, the GUI 301 may permit the customer service representative to modify one or more of the settings from the GUI. In such embodiments, the customer service system may transmit instructions to modify the settings to the customer computing device, which may require the customer service system to request additional permissions and/or confirmation from the customer before the customer's computing device initiates the settings change. GUI 301 may also display a selection area 1910, which may include a screen selection area 1920. The selection area 1910 may include feedback icons or drop down boxes that may allow for a customer service representative to make a selection that may trigger an action on the customer's computing device 100. For example, selection area 1910 may include screen selection area 1920, which may allow for the selection of a screen that might be displayed on customer's computing device 100.

Figure 19B:
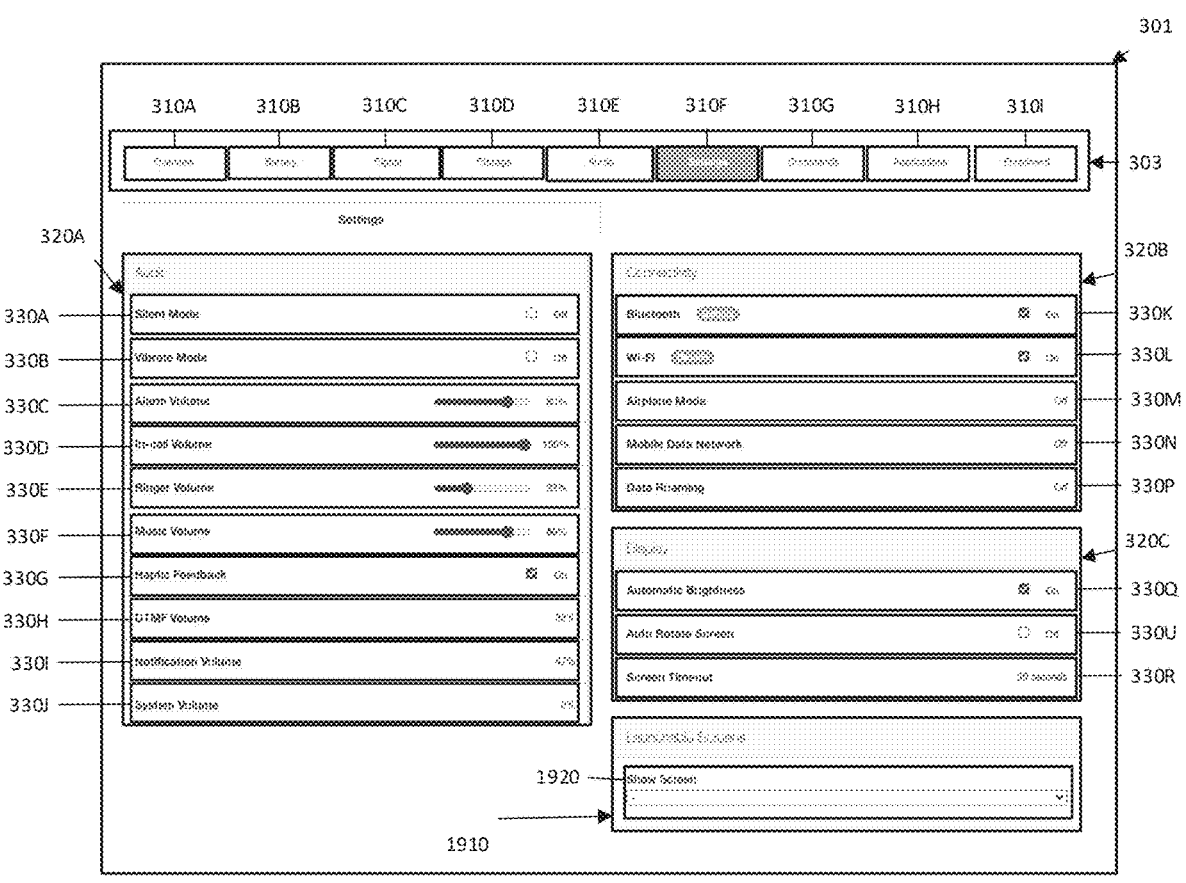
FIG. 19B illustrates an example of the graphical user interface of FIG. 19A for an operational category of "Settings" in accordance with some embodiments discussed herein.

FIG. 19B illustrates an example of the graphical user interface of FIG. 19A, wherein an operational category icon 310F of "Settings" has been selected in accordance with some embodiments discussed herein. Referring to FIG. 19B, GUI 301 displays information for the operational category areas 320A, 320B, and 320C of "Audio," "Connectivity," and "Display," respectively. GUI 301 also displays operational sub-category information areas 330A-330J for operational category 320A, operational sub-category information areas 330K-330P for operational category 320B, and operational sub-category information areas 330Q-330R for operational category 320C. One or more of the information areas associated with the one or more operational categories may be selectable by the customer service representative to modify the settings of the customer device. GUI 301 additionally displays selection area 1910, entitled "Launchable Screens," which including screen selection area 1920. In this example, when a customer service representative selects the screen selection area 1920, one or more available screens for a customer's computing device may be displayed to the customer service representative. The launchable screens may direct the customer's computing device to display a screen (e.g., a menu or interface within the customer's computing device) to allow the user to see a particular set of information or modify a particular setting themselves.

Figure 19C:
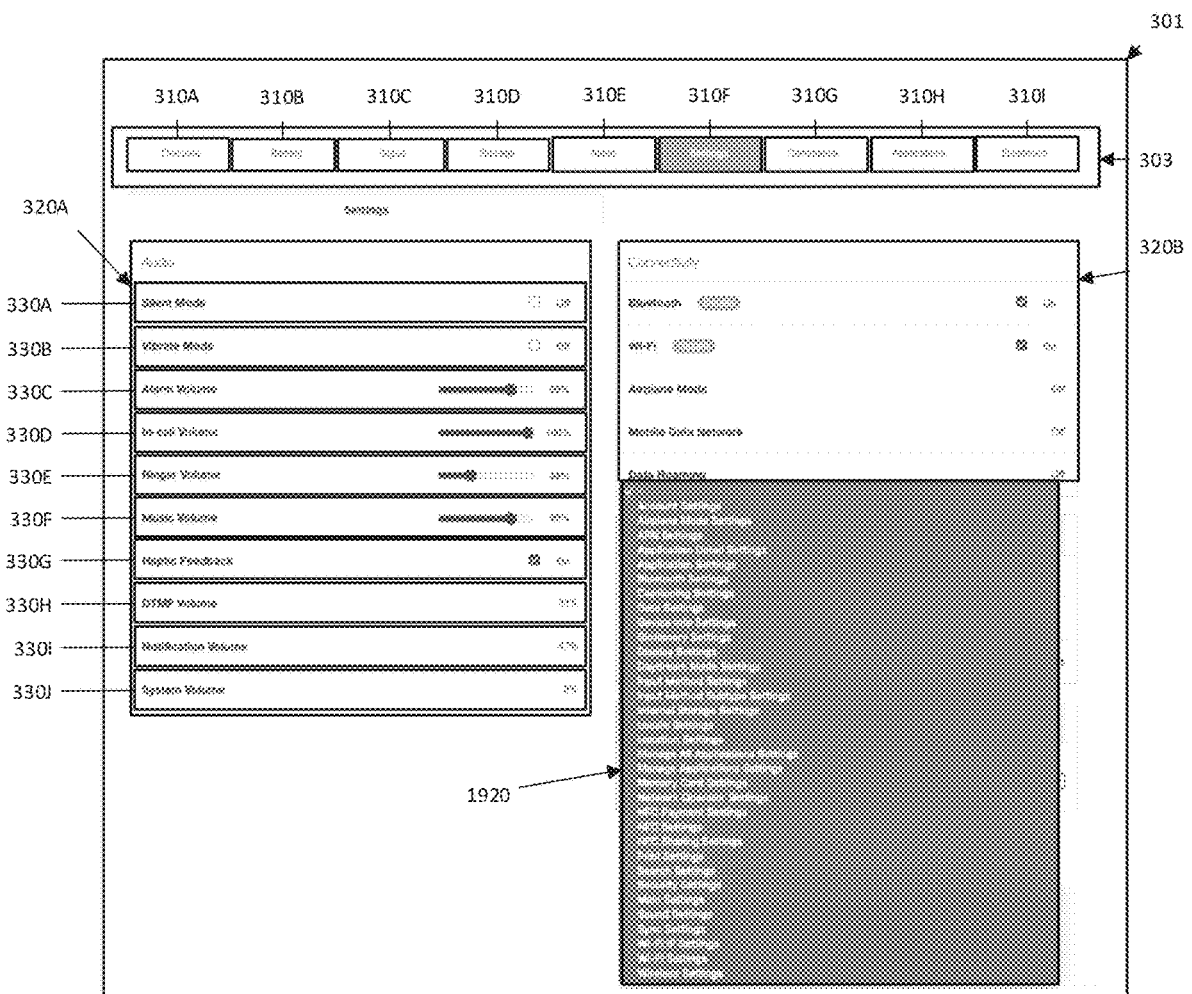
FIG. 19C illustrates an example of the graphical user interface of FIG. 19A for an operational category of "Settings" in accordance with some embodiments discussed herein.

FIG. 19C illustrates an example of the graphical user interface of FIG. 19A, wherein an operational category icon 310F of "Settings" has been selected in accordance with some embodiments discussed herein, and the screen selection area 1920 has also been selected. In FIG. 19C, the selection of screen selection area 1920 has triggered a list of screens a customer service representative may select (e.g., "Account Settings," "Airplane Mode Settings," "APN Settings," "Application Detail Settings," "Application Settings," "Bluetooth Settings," "Captioning Settings," "Date Settings," "Device Info Settings," "Dictionary Settings," "Display Settings," "Daydream Mode Settings," "Input Method Settings," "Input Method Subtype Settings," "Internal Storage Settings," "Locale Settings," "Location Settings," "Manage All Applications Settings," "Manage Application Settings," "Memory Card Settings," "Network Operator Settings," "NFC Payment Settings," "NFC Settings," "NFC Sharing Settings," "Print Settings," "Search Settings," "Security Settings," "Main Settings," "Sound Settings," "Sync Settings," "Wi-Fi IP Settings," Wi-Fi Settings," and "Wireless Settings"). The list of screens may be limited to screens available on a customer's computing device 100, or the list of screens may include screens not available on a customer's computing device 100. In some embodiments, the list of screens may be ordered alphabetically or it may be ranked based upon modeling and data analysis described herein, such as ranking the screens based on what may be most likely to resolve a customer's issue.

In some embodiments, a customer service representative may select a screen to display while assisting a customer resolve an issue. In some embodiments, the selection of a screen may allow the customer service representative to navigate to a screen on a customer's computing device 100, allowing the user to see the screen in real time with the customer service representative, and then subsequently view and/or change a setting on the customer's computing device (e.g., by selecting the setting in the operational categories, by controlling the customer's device remotely, or by instructing the customer to change the settings manually after the customer service representative triggers the launch of the appropriate screen). This feature may be used in conjunction with visualizing the customer's computing device screen on the customer service representative's computing device to allow simultaneous viewing by both parties. In some embodiments, the customer service representative's selection of a screen from screen selection area 1920 may cause the customer's computing device 100 to display the selected screen such that the customer may view the customer service representative's selections and/or changes. In some embodiments, the customer service representative may be able to annotate the screen displayed to the customer or to take a screenshot. Such annotations may include instructions to the customer or indication of an area, setting, or icon the customer service representative wants to draw to the customer's attention (e.g., with an arrow, a change in color, and emphasis of an area). In some embodiments, the computing device may not allow a customer service representative to collect certain data or modify certain settings, and annotations may be helpful in assisting the customer provide information to the customer service representative in order to address a customer's issue. The customer may provide information during a customer service support session, which may include the customer discussing an issue over a communication connection, such as a phone call, audio connection, or video call.

Figure 20A:
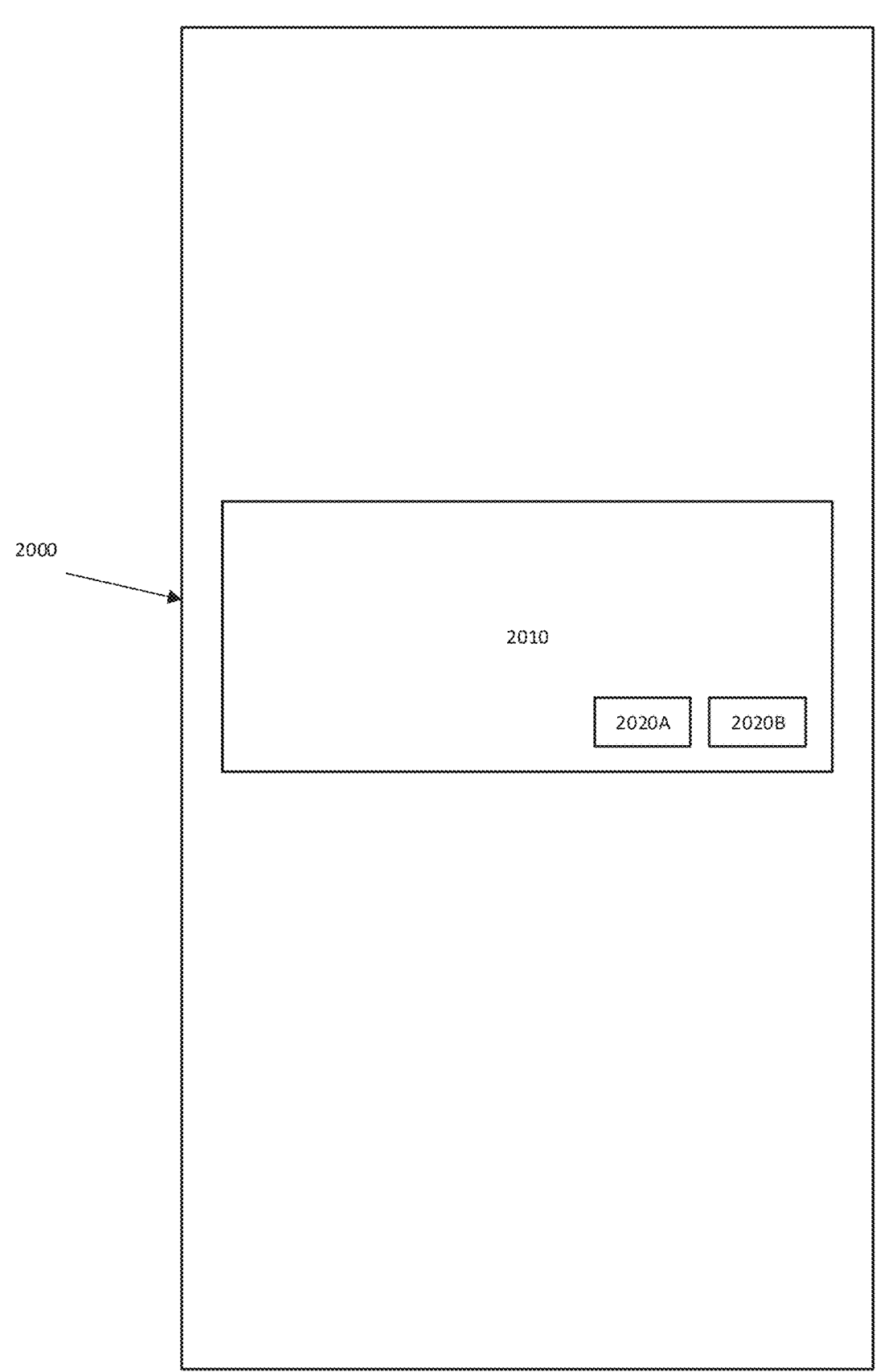
FIG. 20A illustrates an example graphical user interface of a computing device in accordance with some embodiments discussed herein.

In some embodiments, the customer service representative may need a customer's permission, for example, to display a launchable screen or modify a setting as described herein. FIG. 20A illustrates an example display 2000 for a customer's computing device 100 with some embodiments discussed herein. Referring to FIG. 20A, in some embodiments the display 2000 may display a notification area 2010. The notification area 2010 may contain a message and/or permission icon(s). A permission icon may be a feedback icon for a customer to provide permission, which may authorize one or more customer-service-representative-initiated actions to occur on the customer device, such as the actions described in various embodiments herein. Referring to FIG. 20A, in some embodiments there may be more than one permission icon, such as permission icon 2020A and permission icon 2020B.

Figure 20B:
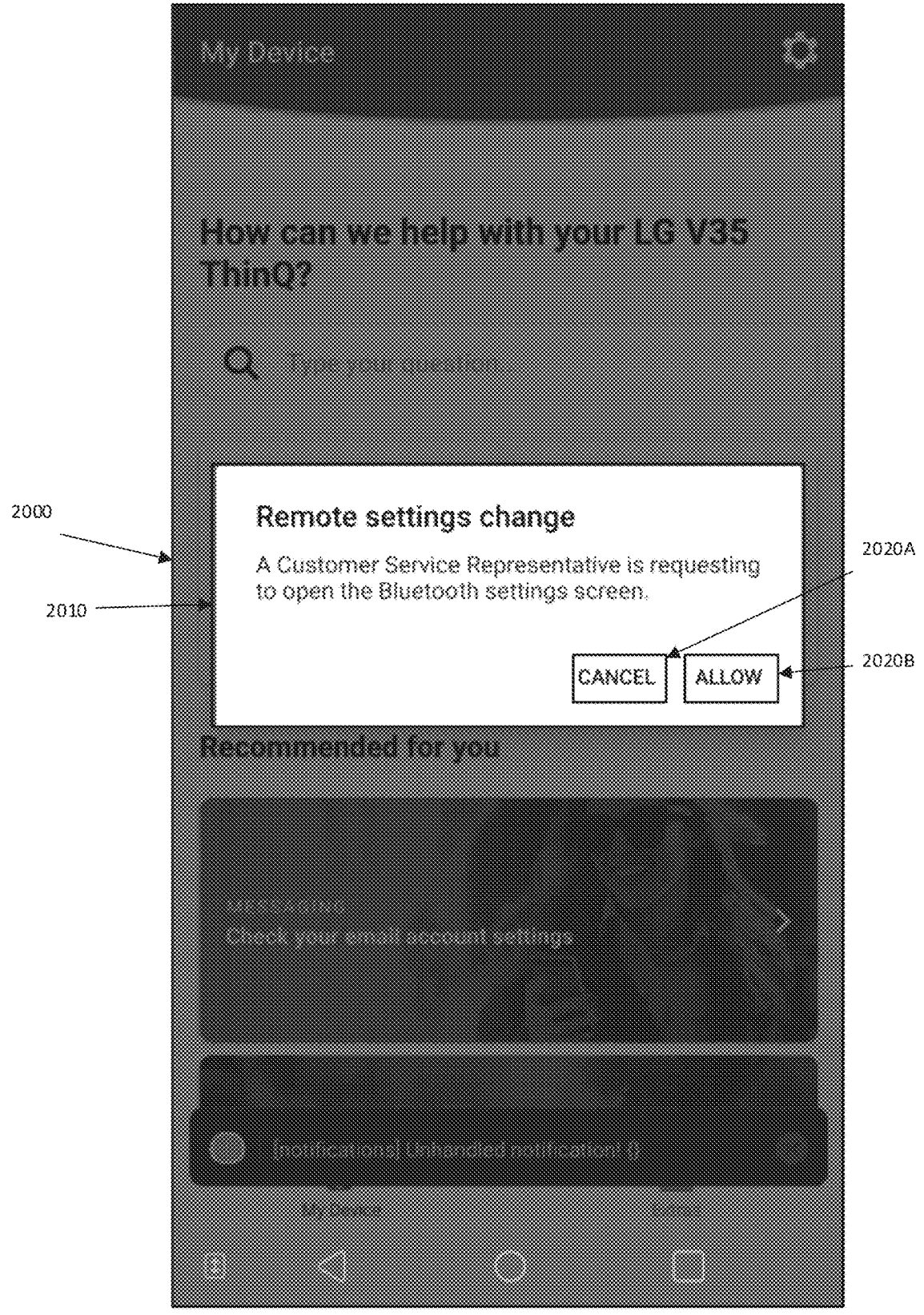
FIG. 20B illustrates an example of the graphical user interface of FIG. 21A in accordance with some embodiments discussed herein.

FIG. 20B illustrates an example of the display 2000 of FIG. 20A in accordance with some embodiments discussed herein. In FIG. 20B, notification area 2010 contains a message (e.g., "Remote setting change. A Customer Service Representative is requesting to open the Bluetooth settings screen.") and two permission icons 2020A and 2020B. Referring to FIG. 20B, permission icon 2020A allows a customer to provide the feedback of denying permission (e.g., "Cancel") and permission icon 2020B allows a customer provide permission (e.g., "Accept"). By providing permission, the customer allows for the customer service representative to, in the embodiment illustrated in FIG. 20B, open a Bluetooth settings screen.

In some embodiments, not depicted, the notification area 2010 may contain multiple messages and may include multiple permission icons, which may allow for the granting of different permissions. For example, a message and an associated permission icon may allow for the customer to choose different screens a customer service representative is interested in for potentially resolving the customer's issue. In such an embodiment, the customer would be providing feedback to the customer service representative in resolving the issue. When multiple messages and/or permission icons may be displayed to a customer, in some embodiments the ordering of the messages and/or the permission icons may, for example, be selected by the customer service representative, be order according to a set hierarchy, or may be ranked or ordered by modeling or machine learning. The permissions requested may be in addition to standard permissions granted to a customer-device-side installation of software associated with the various processes and programs discussed herein. For example, the standard permissions may permit collection of one or more data values for initial transmission to the customer service system in accordance with various embodiments.

Figure 21A:
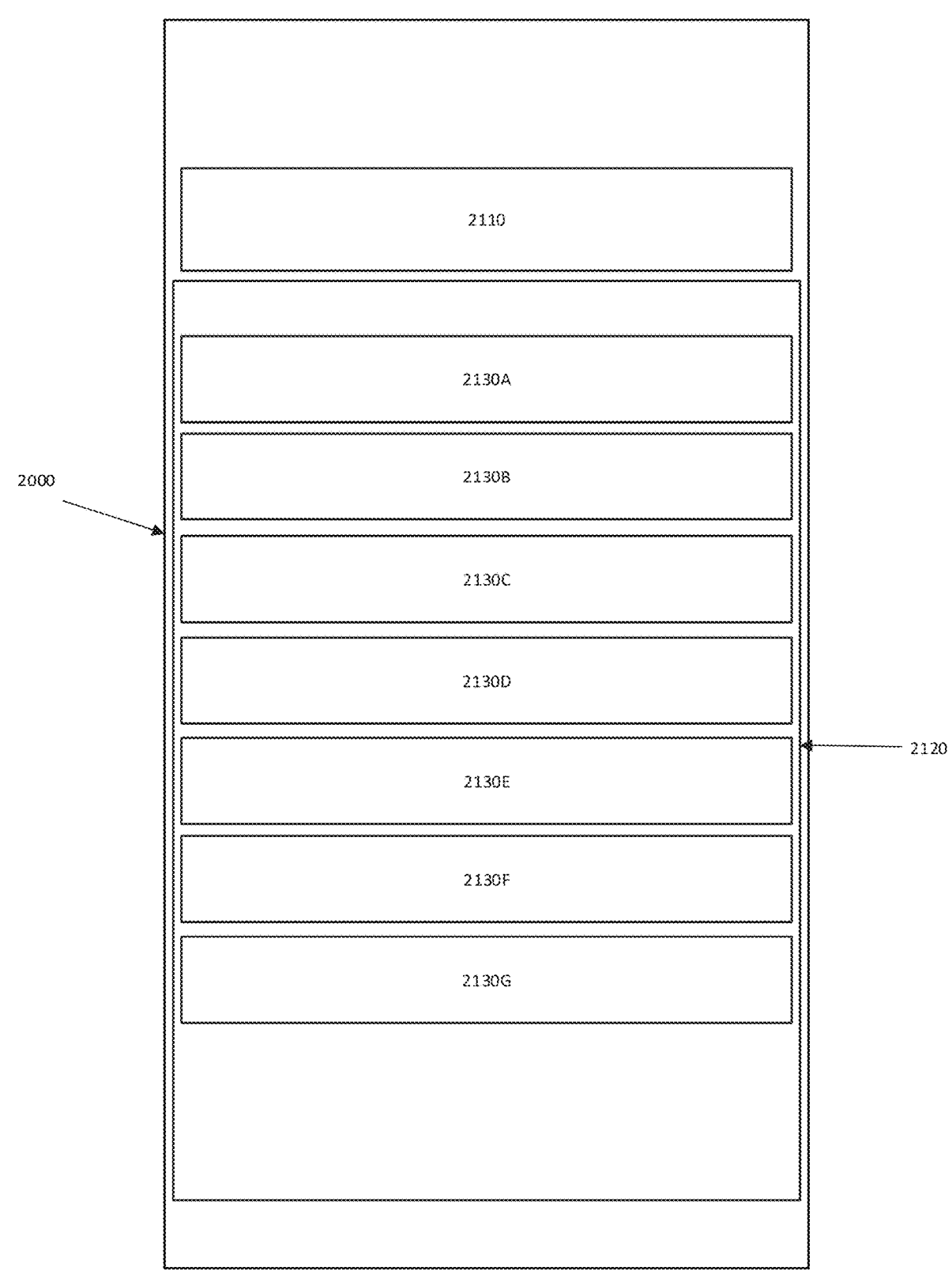
FIG. 21A illustrates an example graphical user interface of a computing device in accordance with some embodiments discussed herein.

In some embodiments, after a customer has granted permission to open a screen, the customer's computing device 100 will open the permitted screen. FIG. 21A illustrates an example display 2000 for a customer's computing device 100 with some embodiments discussed herein. Referring to FIG. 21A, in some embodiments the display 2000 may display the permitted screen. The permitted screen may include a device information area 2210. The device information area 2210 may include an indication of the permitted screen along with other customer computing device 100 information, such as the model of the customer's computing device, an operational category name and setting, and/or an operational sub-category name and setting. Referring to FIG. 21A, there may be a settings area 2220 that includes one or more settings associated with the permitted screen. If the setting of the permitted screen has multiple settings associated with the permitted screen, settings area 2220 may contain sub-setting area(s) 2230.

Figure 21B:
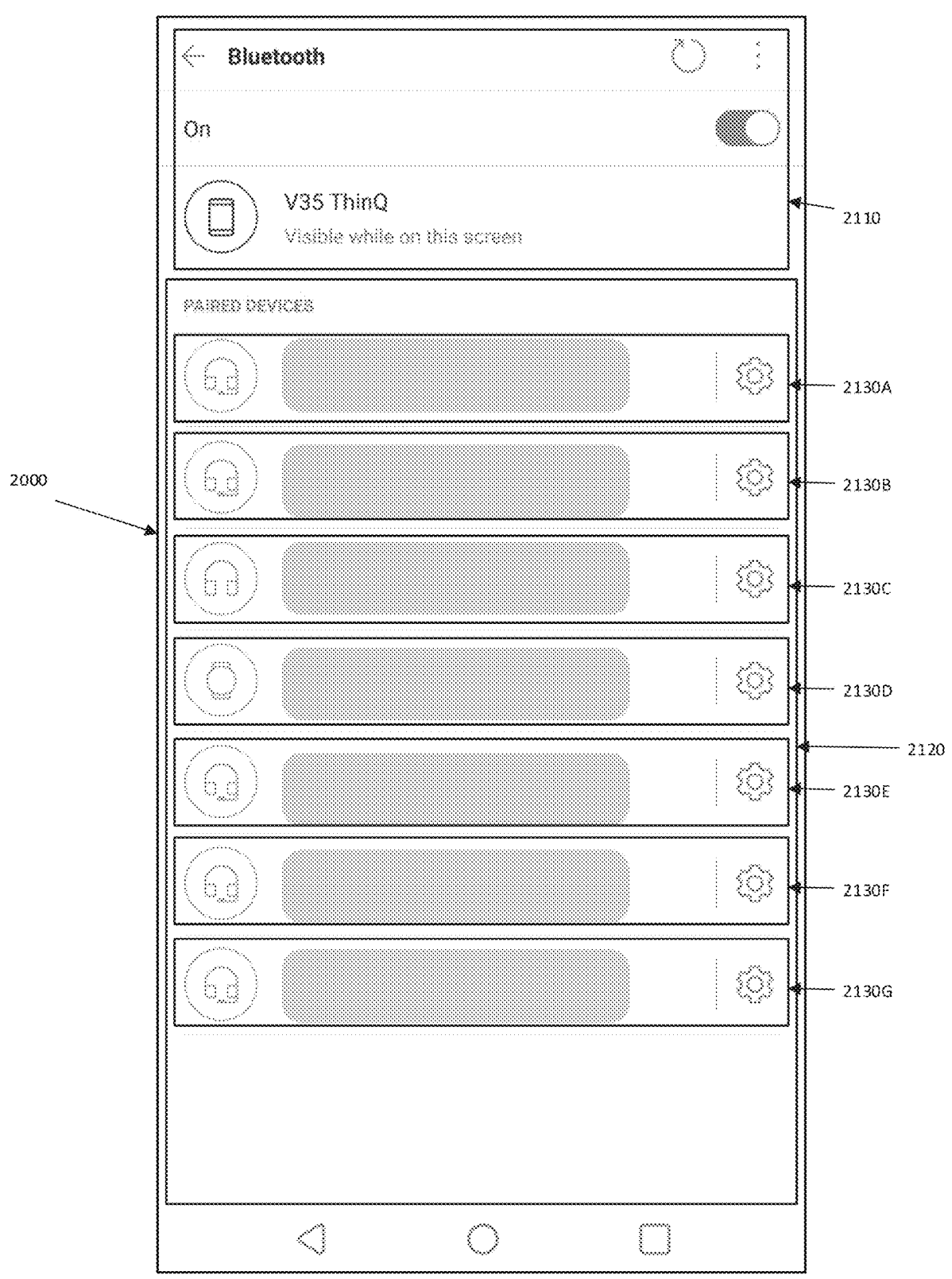
FIG. 21B illustrates an example of the graphical user interface of FIG. 22A in accordance with some embodiments discussed herein.

FIG. 21B illustrates an example of the display 2000 of FIG. 21A in accordance with some embodiments discussed herein. In FIG. 21B, the permitted screen is a Bluetooth settings screen, as is indicated in device information area 2210 of FIG. 21B. This device information area 2210 also allows for the Bluetooth setting to be changed from on to off as well as provide model information regarding the device of FIG. 21B. In some embodiments, the Bluetooth setting may be changed via the customer service representative GUI while the screen is displayed or without displaying the screen. In FIG. 21B, settings area 2220 including multiple sub-settings areas 2230A-G, each of which correspond to a device paired via Bluetooth to the customer's computing device 100. In the embodiment of FIG. 21B, the permission granted by the user may, or may not, allow the customer service representative to collect data about the permitted screen, change settings displayed in the permitted screen, or open further screens from the permitted screen. In some embodiments, if the customer service representative does not have such permissions, the customer may provide such permissions via additional feedback, such as in a notification area 2010, which may include a feedback icon 2020, which are discussed above.

In some embodiments, notification area 2010 and/or feedback icons 2020 may allow a customer to grant permissions or accept setting changes from a customer service representative. In some embodiments, a customer service representative may seek permission to collect data from a customer's computing device 100, and a customer may use feedback icon 2020 to grant permission. In some embodiments, a customer service representative may generate a notification by pushing a settings change to the customer's computing device 100, which may trigger a notification area 2010 allowing the customer to accept or cancel the setting change. In some embodiments, more than one settings change may be pushed to a customer's computing device at the same time.

In some embodiments, the GUI 301 may display a copy of the display 2000 of the customer's computing device 100, which may allow the customer service representative to see what the customer sees on the customer's computing device 100.

In some embodiments, there may be a chat windows in or on display 2000 or notification area 2010, and the customer service representative may provide instructions for how a customer may navigate to a settings screen associated with the customer's issue.

In some further embodiments, the customer service representative may trigger one or more supplemental diagnostic requests in addition to viewing prior and current data from the customer device. For example, a customer service representative may transmit instructions to the customer device to conduct a diagnostic test of one or more hardware and/or software portions of the customer device via direct instruction and/or via the various interaction techniques described herein (e.g., as described in connection with FIGS. 19A-21B). In some embodiments, a customer service representative may cause one or more long term diagnostic tests to be conducted, such as collecting one or more data values on the customer device over a predetermined period of time or until a predetermined stop condition is met. In such embodiments, the long term data values include data not typically collected during the routine operation of the customer device and/or data not typically collected in accordance with the customer service system for a fully functioning device. In such embodiments, the customer service representative may trigger the long term diagnostic test based on and in response to the one or more diagnoses and/or performance prompts discussed herein. The data collected during the long-term diagnostic test may be data which requires additional permissions from the user, which permissions may then be requested, for example as described herein. For example, a long term diagnostic test may collect one or more of app data activity, processor activity; background data; location information (e.g., cellular, WiFi, Bluetooth, and/or GPS location information), etc. In some embodiments, the user-granted permissions may expire at the conclusion of the long term diagnostic test. One or more reports and/or results may be transmitted to the customer and/or the customer service representative following the long term diagnostic test. The customer service support session may be terminated while awaiting results from the long term diagnostic test (e.g., the test may be run longer than a typical support call and may require follow-up). In some embodiments, when a customer service support session was terminated, the results from the long term diagnostic test may be automatically transmitted to the customer support service system upon completion of the long term diagnostic test or may be transmitted to the customer service system during a subsequent customer service support session. In some embodiments, the completion of a long term diagnostic test may trigger an indication to the customer service support system, which may indicate that the test is complete (e.g., indication provided to the customer and/or to the customer service system) or that the data in the test is ready for transmission, or may trigger transmission of the test results.

The subject matter described herein includes, but is not limited to, the following specific embodiments:

1. A method comprising:
   receiving a first data set associated with a first mobile computing device over a first network, wherein the first data set comprises one or more data values associated with the first mobile computing device;
   determining a plurality of performance states for the first mobile computing device, the plurality of performance states comprising at least one performance state for one or more of a plurality of operational categories, wherein at least a first performance state associated with a first operational category comprises a first diagnostic indicator associated with the first mobile computing device; and
   displaying a first graphical user interface on a screen, the first graphical user interface comprising visual representations associated with two or more of the plurality of operational categories including the first operational category, wherein the visual representation associated with the first operational category comprises a first visual representation of the first diagnostic indicator, wherein the first visual representation of the first diagnostic indicator causes the visual representation associated with the first operational category to be visually distinct from a visual representation associated with a second operational category.

2. The method of embodiment 1, wherein the determining of the first performance state associated with the first operational category further comprises:
   identifying a threshold associated with the first operational category; and
   determining the first performance state based on a comparison of the one or more data values to the threshold.

3. The method of embodiment 2 wherein identifying the threshold associated with the first operational category further comprises:
   receiving an aggregated data set associated with a plurality of other mobile computing devices, wherein the aggregated data set comprises one or more data values associated with the plurality of mobile computing devices from the plurality of operational categories, and
   setting the threshold based on a statistical analysis of the aggregated data set for the first operational category.

4. The method of embodiment 3, the threshold is defined below an average or median value of the aggregated data set for the first operational category.

5. The method any one of embodiments 1-4, wherein the determining of the first performance state associated with the first operational category further comprises:
   identifying a range associated with the first operational category; and determining the first performance state based on a comparison of the one or more data values to the range.

6. The method of embodiment 1, wherein the determining of the first performance state associated with the first operational category further comprises:
   receiving an aggregated data set associated with a plurality of other mobile computing devices, wherein the aggregated data set comprises one or more data values associated with the plurality of mobile computing devices from the plurality of operational categories;
   training a model based on the aggregated data set to determine the at least one of the plurality of performance states; and
   determining the first performance state associated with the first operational category by applying the first data set to the model.

7. The method of embodiment 1, further comprising:
   receiving a second data set associated with a plurality of second mobile computing devices, wherein the second data set comprises one or more data values associated with the plurality of second mobile computing devices from the plurality of operational categories;
   aggregating said second data set to produce an aggregated data set; and
   wherein the determining the first performance state associated with the first operational category comprises comparing one or more data values of the first data set associated with the first operational category with one or more data values of the aggregated data set associated with the first operational category.

8. The method of embodiment 7, wherein the comparing one or more data values of the first data set for the first operational category with one or more data values of the aggregated data set for the first operational category further comprises:
   identifying a threshold for the first operational category based on the aggregated data set; and
   determining the first performance state based on a comparison of the one or more data values associated with the first mobile computing device to the threshold.

9. The method of embodiment 8 wherein identifying the threshold for the first operational category based on the aggregated data set further comprises:
   determining an average value or a median value for the first operational category based on the aggregated data set.

10. The method of any one of embodiments 2-10, wherein the comparing one or more data values of the first data set associated with the first operational category with one or more data values of the aggregated data set associated with the first operational category further comprises:

identifying a range associated with the first operational category based on the aggregated data; and determining the first performance state based on a comparison of the one or more data values associated with the first mobile computing device to the range.

11. The method of embodiment 1, wherein the visual representation associated with the first operational category further comprises a visual representation of a plurality of operational sub-categories associated with the first operational category.

12. The method of embodiment 11, wherein the visual representation associated with the plurality of operational sub-categories includes a visual representation associated with a first operational sub-category, wherein the plurality of performance states comprise a performance state associated with the first operational sub-category, wherein the visual representation associated with the first operational sub-category comprises visual representation of a diagnostic indicator associated with the first operational sub-category.

13. The method of embodiment 12, wherein the visual representation of a diagnostic indicator associated with the first operational sub-category is visually represented the same as the first visual representation of the first diagnostic indicator.

14. The method of embodiment 12, wherein the visual representation of a diagnostic indicator associated with the first operational sub-category is visually represented differently than the first visual representation of the first diagnostic indicator.

15. The method of any one of embodiments 1-14, wherein the first visual representation of the first diagnostic indicator comprises a symbol.

16. The method of any one of embodiments 1-15, wherein the first visual representation of the first diagnostic indicator indicates a problem with at least one of the first operational category or the first operational sub-category.

17. The method of any one of embodiments 1-15, wherein the first visual representation of the first diagnostic indicator indicates there are no problems with the first operational category and the first operational sub-category.

18. The method of embodiment 12, wherein:

the plurality of performance states further comprise a second performance state associated with a second operational sub-category, wherein the second performance state associated with the second operational sub-category comprises a second diagnostic indicator;

the visual representation of the plurality of operational sub-categories includes a visual representation of the second operational sub-category comprising a visual representation of the second diagnostic indicator; and the visual representation of the second diagnostic indicator indicates a diagnosis different from the diagnosis indicated by the first diagnostic indicator.

19. The method of any one of embodiments 1-18, further comprising:

in response to receiving a selection of the first operational category, displaying a second graphical user interface comprising a second visual representation associated with the first operational category, the second visual representation associated with the first operational category comprising one or more second diagnostic indicators associated with the first performance state, which provide additional information associated with the first performance state relative to the first diagnostic indicator.

20. The method of embodiment 19, wherein the one or more second diagnostic indicators comprising a diagnostic message comprising a description of one or more problems associated with the first performance state.

21. The method of any one of embodiments 19-20, wherein the second graphical user interface further comprises:

a plurality of historical data from the first data set for the first operational category and a timestamp associated with the historical data.

22. The method of embodiment 21, wherein a portion of the historical data from the first data set comprises one of the second diagnostic indicators associated with the first performance state.

23. The method of any one of embodiments 19-20, wherein the second graphical user interface further comprises:

a plurality of historical data from the first data set for the first operational category, a timestamp associated with the historical data, and a diagnostic indicator associated with the historical data.

24. The method of embodiment 23, wherein the diagnostic indicator associated with the historical data is associated with only a portion of the plurality of historical data indicating a problem associated with the first mobile computing device.

25. The method of embodiment 19, further comprising:

determining one or more diagnostic messages associated with the first performance state; and displaying, on the second graphical user interface, one or more performance prompts comprising the one or more of the diagnostic messages.

26. The method of embodiment 25, wherein the one or more performance prompts comprise one or more programmatically-generated potential solutions to one or more problems of the first computing device associated with the first performance state.

27. The method of any one of embodiments 25-26, further comprising:

displaying, on the second graphical user interface, a feedback icon associated with each of the performance prompts;

determining, in response to receiving a selection of one of the feedback icons, one or more additional diagnostic messages; and updating the display of the second graphical user interface in response to receiving a selection from one of the feedback icons to display the one or more of the additional diagnostic messages.

28. The method of embodiment 27, wherein in an instance in which the selection of the one of the feedback icons indicates a successful resolution to one or more problems associated with the first performance state, the one or more additional diagnostic messages indicates a successful resolution of the problem.

29. The method of embodiment 27, wherein in an instance in which the selection of the one of the feedback icons indicates a successful resolution of one or more problems associated with the first performance state, the method further comprises removing the visual representation of a second diagnostic indicator associated with the one or more problems.

30. The method of any one of embodiments 27-29, wherein in an instance in which the selection of the one of the feedback icons indicates a successful resolution of one or more problems associated with the first performance state, the method further comprises updating a database associated with the diagnostic messages.

31. The method of embodiment 27, wherein in an instance in which the selection of the one of the feedback icons indicates an unsuccessful prompt, the method further comprises displaying a second performance prompt comprising a second diagnostic message.

32. The method of embodiment 27, wherein the determining of the first performance state associated with the first operational category further comprises:

receiving a second data set associated with a plurality of second mobile computing devices, wherein the second data set comprises one or more data values associated with the plurality of second mobile computing devices from the plurality of operational categories;

aggregating said second data set to produce an aggregated data set, wherein the aggregated data set comprises one or more data values associated with the plurality of mobile computing devices from the plurality of operational categories;

wherein the determining of the first performance state associated with the first operational category comprises comparing one or more data values of the first data set for the first operational category with one or more data values of the aggregated data set for the first operational category.

33. The method of any one of embodiments 27-32, wherein the determining one or more additional diagnostic messages further comprises determining a first additional diagnostic message and a second additional diagnostic message, wherein the first additional diagnostic message defines a first diagnostic message resolution value and the second additional diagnostic message defines a second diagnostic message resolution value; and wherein updating the display of the second graphical user interface in response to receiving a selection of one of the feedback icons to display one or more of the additional diagnostic messages further comprises displaying the first additional diagnostic message if the first diagnostic message resolution value is higher than the second diagnostic message resolution value and displaying the second additional diagnostic message if the second diagnostic message resolution value is higher than the first diagnostic message resolution value.

34. The method of embodiment 1, further comprising:

receiving an aggregated data set associated with a plurality of other mobile computing devices, wherein the aggregated data set comprises one or more data values associated with the plurality of other mobile computing devices corresponding to the plurality of operational categories, and updating the display, in response to receiving a selection of one of the one or more of the plurality of operational categories, to display a second graphical user interface displaying information associated with the selected one of the one or more of the plurality of operational categories.

35. The method of embodiment 34, wherein the second graphical user interface further comprises:

displaying a plurality of data from the first data set for the first operational category; and displaying a plurality of data from the aggregated data set for the first operational category.

36. The method of embodiment 34, further comprising:

determining a plurality of comparative performance states for one or more of the plurality of operational categories, wherein at least a first comparative performance state associated with a first operational category comprises a first comparative diagnostic indicator comparing the first mobile computing device with the plurality of other mobile computing devices; and displaying, on the second graphical user interface, a visual representation of the first comparative diagnostic indicator.

37. The method of embodiment 37, further comprising:

determining one or more comparative diagnostic messages associated with the first comparative performance state; and displaying, on the second graphical user interface, one or more performance prompts comprising the one or more of the comparative diagnostic messages.

38. The method of embodiment 37, further comprising:

displaying, on the second graphical user interface, a feedback icon for each of the performance prompts, determining, in response to receiving a selection of one of the feedback icons, one or more additional comparative diagnostic messages; and updating the display of the second graphical user interface in response to receiving a selection from one of the feedback icons to display one or more of the additional comparative diagnostic messages.

39. The method of any one of embodiments 1-20 or 25-38, wherein the determining a plurality of performance states further comprises determining at least one performance state by comparing the most recent data of the first data set in associated with an operational category against historical data from a predetermined period of time prior to a time associated with the most recent data.

40. The method of embodiment 39, wherein the first performance state is determined at least in part by a problem identified in the first data set existing for the predetermined period of time, and wherein the first diagnostic indicator defines an indication of the problem.

41. The method of embodiment 39, where the period of time is one of 7 days, 14 days, 21 days, or 30 days.

42. The method of any one of embodiments 39-41, wherein determining a plurality of performance states further comprises:

identifying a threshold for the first operational category based on the historical data; and determining the first performance state based on a comparison of the first data set to the threshold.

43. The method of embodiment 42, further comprising:

determining one or more diagnostic messages associated with the first performance state; and displaying one or more performance prompts each comprising one of the one or more of the diagnostic messages.

44. The method of embodiment 43, further comprises:

displaying a feedback icon for each of the performance prompts;

determining, in response to receiving a selection of one or of the feedback icons, one or more additional diagnostic messages; and updating the display of the graphical user interface in response to receiving a selection from one of the feedback icons to display one or more of the additional diagnostic messages.

45. The method of any one of embodiments 39-42, wherein determining a plurality of performance states for the first mobile computing device further comprises:

identifying a range for the first operational category based on the historical data; and determining the first performance state based on a comparison of the first data set to the range.

46. The method of any one of embodiments 39-42 or 45, further comprising: determining one or more diagnostic messages associated with the first performance state; and displaying one or more performance prompts each comprising one of the one or more of the diagnostic messages.

47. The method of any one of embodiments 39-42 or 45, further comprises:

displaying a feedback icon for each of the performance prompts;

determining, in response to receiving a selection of one or of the feedback icons, one or more additional diagnostic messages; and updating the display of the graphical user interface in response to receiving a selection from one of the feedback icons to display one or more of the additional diagnostic messages.

48. The method of any one of embodiments 1-24 or 34-45, further comprises:

establishing, upon a communication request from a customer associated with the first mobile computing device, a transmission connection with the customer;

receiving at least a portion of the first data set via the transmission connection;

determining one or more diagnostic messages associated with the first performance state;

establishing a communication connection with the customer, wherein the establishing of the communication connection occurs in connection with displaying the first graphical user interface;

displaying one or more performance prompts each comprising one of the one or more of the diagnostic messages;

transmitting to the first mobile computing device a first instruction set associated with one or more of the one or more diagnostic messages;

receiving from the first mobile computing device a responsive portion of the first data set via the transmission connection, wherein the responsive portion of the first data set is associated with a response from the first mobile computing device processing the first instruction set.

49. The method of any one of embodiments 1-24, 34-42, or 45, wherein the communication connection further comprises a phone call or an audio connection.

50. The method of any one of embodiments 48-49, wherein the portion of the first data set is one of a plurality of portions of the first data set, and the portion of the first data set comprises data values associated with the first mobile computing device from a plurality of operational categories when the transmission connection is established.

51. The method of any one of embodiments 1-50, wherein the first visual representation of the first diagnostic indicator comprises a color.

52. The method of any one of embodiments 1-50, wherein the first visual representation of the first diagnostic indicator comprises a symbol.

53. The method of any one of embodiments 1-50, wherein the first visual representation of the first diagnostic indicator comprises a status message.

54. The method of any one of embodiments 1-50, wherein the first visual representation of the first diagnostic indicator comprises shading the visual representation of the first operational category.

55. The method of any one of embodiments 1, 2, 11-24, 39-42, 45, or 48-54, further comprising determining one or more diagnostic messages associated with the first performance state, wherein the one or more diagnostic messages are determined based upon an aggregated data set associated with a plurality of other mobile computing devices.

56. The method of embodiment 55, wherein the plurality of other mobile computing devices are of a same classification.

57. The method of any one of embodiments 1-24, 34-42, 45, or 48-54, further comprising determining one or more diagnostic messages associated with the first performance state, wherein the one or more diagnostic messages are determined based upon a trained model.

58. The method of any one of embodiments 1-57, wherein the first visual representation of the first diagnostic indicator comprises a modification of the visual representation associated with the first operational category.

59. The method of embodiment 58, wherein the first visual representation of the first diagnostic indicator comprises a first icon defined on an icon representing the first operational category.

60. The method of any one of embodiments 1-59 further comprising a client terminal comprising the screen, wherein the client terminal is remotely located from the first mobile computing device.

61. A method for resolving one or more problems with a mobile device, the method comprising:

receiving a first data set associated with a first mobile computing device over a first network, wherein the first data set comprises one or more data values associated with the first mobile computing device;

determining one or more plurality of performance states for the first mobile computing device; and generating and presenting one or more performance prompts based on at least one of the performance states, the one or more performance prompts including a diagnostic message associated with the performance state.

62. The method of embodiment 61 further comprising receiving, via a graphical user interface, an indication associated with the performance prompt, wherein the indication comprises one of an indication of a successful resolution of a problem associated with the one or more performance states or an indication of an unsuccessful prompt.

63. The method of any one of embodiments 61-62, wherein the one or more performance states are determined by a model.

64. The method of embodiment 63, wherein the model comprises a statistical model.

65. The method of embodiment 63, wherein the model comprises a trained machine learning model, the trained machine learning model being trained based on an aggregated data set from a plurality of other mobile computing devices.

66. The method of any one of embodiments 61-65, wherein the one or more performance states are determined based on an aggregated data set from a plurality of other mobile computing devices.

67. The method of any one of embodiments 61-62, wherein the one or more performance prompts are determined by a model.

68. The method of embodiment 63, wherein the model comprises a statistical model.

69. The method of embodiment 63, wherein the model comprises a trained machine learning model, the trained machine learning model being trained based on an aggregated data set from a plurality of other mobile computing devices.

70. The method of any one of embodiments 61-69 wherein the one or more performance prompts are determined based on an aggregated data set from a plurality of other mobile computing devices.

71. A method comprising:
receiving an input from a user at a first mobile computing device, the input comprising an indication of a request to initiate a support session;
establishing communication between the first mobile computing device and the customer service system and transmitting a first data set from the mobile computing device to the customer service system;
based upon one or more performance prompts generated in response to the first data set, initiating one or more remedial actions on the first mobile computing device.

72. A non-transitory computer readable medium having computer program instructions stored therein, said instructions when executed by a processor are configured for:
receiving a first data set associated with a first mobile computing device over a first network, wherein the first data set comprises one or more data values associated with the first mobile computing device;
determining, via a processor, a plurality of performance states for the first mobile computing device, the plurality of performance states comprising at least one performance state for one or more of a plurality of operational categories, wherein at least a first performance state associated with a first operational category comprises a first diagnostic indicator associated with the first mobile computing device; and
displaying a first graphical user interface on a screen, the first graphical user interface comprising visual representations associated with two or more of the plurality of operational categories including the first operational category, wherein the visual representation associated with the first operational category comprises a first visual representation of the first diagnostic indicator, wherein the first visual representation of the first diagnostic indicator causes the visual representation associated with the first operational category to be visually distinct from a visual representation associated with a second operational category.

73. A customer service system comprising:
a server;
a database configured to communicate with the server;
a client terminal located remotely from a first computing device, wherein the client terminal is configured to communicate with the server and the database;
wherein the server is configured to:
receive a first data set associated with a first mobile computing device over a first network, wherein the first data set comprises one or more data values associated with the first mobile computing device; and
determine a plurality of performance states for the first mobile computing device, the plurality of performance states comprising at least one performance state for one or more of a plurality of operational categories, wherein at least a first performance state associated with a first operational category comprises a first diagnostic indicator associated with the first mobile computing device; and
wherein the client terminal is configured to:
display a first graphical user interface on a screen, wherein the first graphical user interface comprises visual representations associated with two or more of the plurality of operational categories including the first operational category, wherein the visual representation associated with the first operational category comprises a first visual representation of the first diagnostic indicator, wherein the first visual representation of the first diagnostic indicator causes the visual representation associated with the first operational category to be visually distinct from a visual representation associated with a second operational category.

74. A customer service system comprising:
a server;
a database configured to communicate with the server;
a client terminal located remotely from a first computing device, wherein the client terminal is configured to communicate with the server and the database;
wherein the server is configured to perform the steps of any one of embodiments 1-71.

75. A customer service system comprising:
a server;
a database configured to communicate with the server;
a client terminal located remotely from a first computing device, wherein the client terminal is configured to communicate with the server and the database;
wherein the server is configured to:
receive a first data set associated with a first mobile computing device over a first network, wherein the first data set comprises one or more data values associated with the first mobile computing device;
determine one or more plurality of performance states for the first mobile computing device;
generate one or more performance prompts based on at least one of the performance states, the one or more performance prompts including a diagnostic message associated with the performance state; and
wherein the client terminal is further configured to:
display one or more performance prompts based on at least one of the performance states, the one or more performance prompts including a diagnostic message associated with the performance state.

76. A customer service system comprising:
  a server;
  a database configured to communicate with the server;
  a client terminal located remotely from a first computing device, wherein the client terminal is configured to communicate with the server and the database;
wherein the server is configured to:
  receive an input from a user at a first mobile computing device, wherein the input comprises an indication of a request to initiate a support session;
  establish communication with the first mobile computing device and receive a transmission of a first data set from the mobile computing device; and
  based upon one or more performance prompts generated in response to the first data set, initiate one or more remedial actions on the first mobile computing device.

77. An apparatus is provided comprising at least a processor and a memory associated with the processor having computer coded instructions therein, with the computer instructions configured to, when executed by the processor, cause the apparatus to:
  receive a first data set associated with a first mobile computing device over a first network, wherein the first data set comprises one or more data values associated with the first mobile computing device;
  determine, via the processor, a plurality of performance states for the first mobile computing device, the plurality of performance states comprising at least one performance state for one or more of a plurality of operational categories, wherein at least a first performance state associated with a first operational category comprises a first diagnostic indicator associated with the first mobile computing device; and
  display, on a screen, a first graphical user interface on a screen, the first graphical user interface comprising visual representations associated with two or more of the plurality of operational categories including the first operational category, wherein the visual representation associated with the first operational category comprises a first visual representation of the first diagnostic indicator, wherein the first visual representation of the first diagnostic indicator causes the visual representation associated with the first operational category to be visually distinct from a visual representation associated with a second operational category.

78. An apparatus is provided comprising at least a processor and a memory associated with the processor having computer coded instructions therein, with the computer instructions configured to, when executed by the processor, cause the apparatus to perform the steps of any one of embodiments 1-71.

79. An apparatus is provided comprising at least a processor and a memory associated with the processor having computer coded instructions therein, with the computer instructions configured to, when executed by the processor, cause the apparatus to:
  receive a first data set associated with a first mobile computing device over a first network, wherein the first data set comprises one or more data values associated with the first mobile computing device;
  determine, via the processor, one or more plurality of performance states for the first mobile computing device; and
  generate and display one or more performance prompts based on at least one of the performance states, the one or more performance prompts including a diagnostic message associated with the performance state.

80. An apparatus is provided comprising at least a processor and a memory associated with the processor having computer coded instructions therein, with the computer instructions configured to, when executed by the processor, cause the apparatus to:
  receive an input from a user at a first mobile computing device, the input comprising an indication of a request to initiate a support session;
  establish communication with the first mobile computing device and receive a transmission of a first data set from the mobile computing device; and
  based upon one or more performance prompts generated in response to the first data set, initiate one or more remedial actions on the first mobile computing device.

81. A method comprising:
  receiving a first data set associated with a first mobile computing device over a first network, wherein the first data set comprises one or more data values associated with the first mobile computing device;
  determining a plurality of performance states for the first mobile computing device, the plurality of performance states comprising at least one performance state for one or more of a plurality of operational categories;
  identifying one or more thresholds associated with the plurality of performance states;
  determining one or more remedial actions based on a comparison of the plurality of performance states with the one or more thresholds associated with the plurality of performance states;
  establishing communication with the first mobile computing device; and
  causing transmission of the one or more remedial actions to the first mobile computing device.

82. The method of embodiment 81 wherein the one or more remedial actions include one or more changes to a setting of the first mobile device.

83. The method of any one of embodiments 81-82, wherein causing transmission of the one or more remedial actions to the first mobile computing device includes pushing the remedial action to the first mobile device.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:
1. A method comprising:
  initiating a support session between customer service system and a first mobile computing device;
  receiving, at the customer service system, a first data set associated with the first mobile computing device, the first data set being associated with at least one performance state for the first mobile computing device;

displaying, via a display associated with the customer service system, a first graphical user interface comprising visual representations associated with at least one of a plurality of operational categories including a first operational category, wherein a visual representation associated with the first operational category comprises a first visual representation of a first diagnostic indicator indicating a problem associated with the first operational category based on the at least one performance state; and displaying, at the first graphical user interface of the customer service system, one or more performance prompts comprising one or more diagnostic messages providing a first guidance to resolve the problem associated with the first operational category;

displaying, via the display of the customer service system and for each performance prompt, a feedback icon rendered at or adjacent to each of the one or more performance prompts on the first graphical user interface on a screen, wherein a selection via the feedback icon is configured to trigger an indication that the first guidance to resolve the problem associated with the first operational category was unsuccessful;

determining, by the customer service system and in response to an indication that the first guidance was unsuccessful, one or more additional diagnostic messages comprising additional guidance to resolve the problem associated with the first operational category; and in response to the indication that the first guidance was unsuccessful, automatically updating the screen to display the one or more additional diagnostic messages.

2. The method of claim 1 further comprising:

determining the at least one performance state by:

receiving an aggregated data set associated with a plurality of other mobile computing devices, wherein the aggregated data set comprises one or more data values associated with the plurality of other mobile computing devices from the plurality of operational categories;

training a model based on the aggregated data set to determine the at least one performance state; and determining the at least one performance state by applying the first data set to the model.

3. The method of claim 1, wherein the one or more performance prompts comprise one or more programmatically-generated potential solutions to the problem associated with the first operational category.

4. The method of claim 1, further comprising:

determining the at least one performance state by comparing a most recent data of the first data set associated with an operational category against historical data from a predetermined period of time prior to a time associated with the most recent data.

5. The method of claim 1, wherein the screen displaying the first graphical user interface is associated with a customer service representative remote from the first mobile computing device.

6. The method of claim 5, wherein the first guidance to resolve the problem associated with the first operational category is transmitted to a user of the first mobile computing device following displaying the one or more performance prompts at the first graphical user interface on the screen associated with the customer service representative.

7. The method of claim 1, further comprising:

determining one or more diagnostic based at least on a resolution value determined by an artificial intelligence model, wherein the resolution value is an estimate associated with resolution of the problem associated with the first operational category.

8. The method of claim 1, further comprising:

selecting, by a customer service representative via the display of the customer service system, a first screen to display on the first mobile computing device;

causing rendering of the first screen on the display of the customer service system;

causing rendering of the first screen by the first mobile computing device;

receiving, at the customer service system, one or more annotations to the first screen associated with the first guidance; and causing rendering, at both of the display of the customer service system and the first mobile computing device, the one or more annotations to the first screen in real-time.

9. The method of claim 1, wherein displaying one or more performance prompts includes displaying a first performance prompt and a second performance prompt simultaneously; and wherein automatically updating the screen to display the one or more additional diagnostic messages comprises:

removing, when the first performance prompt is associated with the feedback icon associated with indication that the first guidance was unsuccessful, the first performance prompt from the screen;

automatically updating the screen to display a first additional performance prompt including a first additional diagnostic message in place of the first performance prompt to display the first additional performance prompt and the second performance prompt simultaneously.

10. A customer service system comprising:

a server;

a database configured to communicate with the server;

a client terminal located remotely from a first computing device, wherein the client terminal is configured to communicate with the server and the database;

wherein the server is configured to:

initiate a support session between customer service system and a first mobile computing device;

receive, at the customer service system, a first data set associated with the first mobile computing device, the first data set being associated with at least one performance state for the first mobile computing device;

display, via a display associated with the customer service system, a first graphical user interface comprising visual representations associated with at least one of a plurality of operational categories including a first operational category, wherein a visual representation associated with the first operational category comprises a first visual representation of a first diagnostic indicator indicating a problem associated with the first operational category based on the at least one performance state; and display, at the first graphical user interface of the customer service system, one or more performance prompts comprising one or more diagnostic messages providing a first guidance to resolve the problem associated with the first operational category;

display, via the display of the customer service system and for each performance prompt, a feedback icon rendered at or adjacent to each of the one or more performance prompts on the first graphical user interface on a screen, wherein a selection via the feedback icon is configured to trigger an indication that the first guidance to resolve the problem associated with the first operational category was unsuccessful;

determine one or more additional diagnostic messages comprising additional guidance to resolve the problem associated with the first operational category; and in response to the indication that the first guidance was unsuccessful, automatically update the screen to display the one or more additional diagnostic messages.

11. The customer service system of claim 10, wherein the server is further configured to determine the at least one performance state by:

receive an aggregated data set associated with a plurality of other mobile computing devices, wherein the aggregated data set comprises one or more data values associated with the plurality of other mobile computing devices from the plurality of operational categories;

train a model based on the aggregated data set to determine the at least one performance state; and determine the at least one performance state by applying the first data set to the model.

12. The customer service system of claim 10, wherein the one or more performance prompts comprise one or more programmatically-generated potential solutions to the problem associated with the first operational category.

13. The customer service system of claim 10, wherein the server is further configured to determine the at least one performance state by comparing a most recent data of the first data set associated with an operational category against historical data from a predetermined period of time prior to a time associated with the most recent data.

14. The customer service system of claim 10, wherein the screen to display the first graphical user interface is associated with a customer service representative remote from the first mobile computing device.

15. The customer service system of claim 14, wherein the server is further configured to:

transmit the first guidance to resolve the problem associated with the first operational category to a user of the first mobile computing device following display of the one or more performance prompts at the first graphical user interface on the screen associated with the customer service representative.

16. The customer service system of claim 10, wherein the server is further configured to:

determine the one or more diagnostic messages based at least on a resolution value determined by an artificial intelligence model, wherein the resolution value is an estimate associated with resolution of the problem associated with the first operational category.

17. A customer service apparatus is provided comprising at least a processor and a memory associated with the processor having computer coded instructions therein, with the computer coded instructions configured to, when executed by the processor, cause the customer service apparatus to:

initiate a support session with a first mobile computing device;

receive, at the customer service apparatus, a first data set associated with the first mobile computing device, the first data set being associated with at least one performance state for the first mobile computing device;

display, via a display associated with the customer service apparatus, a first graphical user interface comprising visual representations associated with at least one of a plurality of operational categories including a first operational category, wherein a visual representation associated with the first operational category comprises a first visual representation of a first diagnostic indicator indicating a problem associated with the first operational category based on the at least one performance state; and display, at the first graphical user interface of the customer service apparatus, one or more performance prompts comprising one or more diagnostic messages providing a first guidance to resolve the problem associated with the first operational category;

display, via the display of the customer service apparatus and for each performance prompt, a feedback icon rendered at or adjacent to each of the one or more performance prompts on the first graphical user interface on a screen, wherein selection via the feedback icon is configured to trigger an indication that the first guidance to resolve the problem associated with the first operational category was unsuccessful;

determine one or more additional diagnostic messages comprising additional guidance to resolve the problem associated with the first operational category; and in response to the indication that the first guidance was unsuccessful, automatically update the screen to display the one or more additional diagnostic messages.

18. The customer service apparatus of claim 17, wherein the customer service apparatus is further configured to cause the customer service apparatus to:

determine the at least one performance state by:

receive an aggregated data set associated with a plurality of other mobile computing devices, wherein the aggregated data set comprises one or more data values associated with the plurality of other mobile computing devices from the plurality of operational categories;

train a model based on the aggregated data set to determine the at least one performance state; and determine the at least one performance state by applying the first data set to the model.

19. The customer service apparatus of claim 17, wherein the one or more performance prompts comprise one or more programmatically-generated potential solutions to the problem associated with the first operational category.

20. The customer service apparatus of claim 17, wherein the customer service apparatus is further configured to cause the customer service apparatus to:

determine the at least one performance state by comparing a most recent data of the first data set associated with an operational category against historical data from a predetermined period of time prior to a time associated with the most recent data.

21. The customer service apparatus of claim 17, wherein the customer service apparatus is further configured to cause the customer service apparatus to:

transmit the first guidance to resolve the problem associated with the first operational category to a user of the first mobile computing device following display of the one or more performance prompts at the first graphical user interface on the screen associated with a customer service representative.

22. The customer service apparatus of claim 17, wherein the customer service apparatus is further configured to cause the customer service apparatus to:

determine one or more diagnostic messages based at least on a resolution value determined by an artificial intelligence model, wherein the resolution value is an estimate associated with resolution of the problem associated with the first operational category.

\*   \*   \*   \*   \*